United States Patent
Nakamura et al.

(10) Patent No.: US 12,549,851 B2
(45) Date of Patent: Feb. 10, 2026

(54) IMAGE PICKUP APPARATUS, CONTROL METHOD OF IMAGE PICKUP APPARATUS, AND STORAGE MEDIUM

(71) Applicant: CANON KABUSHIKI KAISHA, Tokyo (JP)

(72) Inventors: Shun Nakamura, Kanagawa (JP); Yoshihito Tamaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 9 days.

(21) Appl. No.: 18/801,989

(22) Filed: Aug. 13, 2024

(65) Prior Publication Data
US 2025/0097576 A1 Mar. 20, 2025

(30) Foreign Application Priority Data
Sep. 15, 2023 (JP) ................................. 2023-150071

(51) Int. Cl.
*H04N 23/67* (2023.01)
*H04N 23/695* (2023.01)

(52) U.S. Cl.
CPC ......... *H04N 23/672* (2023.01); *H04N 23/695* (2023.01)

(58) Field of Classification Search
CPC .. H04N 23/667; H04N 23/673; H04N 23/672; H04N 23/67; H04N 23/695
USPC ........................................................ 348/349
See application file for complete search history.

(56) References Cited

U.S. PATENT DOCUMENTS

| | | | | |
|---|---|---|---|---|
| 8,274,561 B2* | 9/2012 | Jodan | ..................... | H04N 23/51 348/151 |
| 9,124,779 B2* | 9/2015 | Kono | ..................... | H04N 7/183 |
| 9,674,432 B2* | 6/2017 | Masugi | ................. | G06F 1/1686 |
| 10,051,174 B2* | 8/2018 | Miyazawa | ............. | H04N 23/73 |
| 10,334,157 B2* | 6/2019 | Oshima | .................. | H04N 23/66 |
| 10,757,322 B2* | 8/2020 | Oshima | .................... | H04N 7/18 |
| 10,764,569 B2* | 9/2020 | Moroda | ............... | H04N 23/695 |
| 10,873,694 B2 | 12/2020 | Nakamura | | |
| 11,226,544 B2* | 1/2022 | Iinuma | ................... | H04N 23/54 |
| 2003/0030742 A1* | 2/2003 | Ike | ....................... | H04N 23/661 348/E5.045 |
| 2008/0158355 A1* | 7/2008 | Jodan | ..................... | H04N 23/51 348/143 |
| 2012/0300116 A1* | 11/2012 | Nakamoto | ........... | H04N 23/634 348/E5.042 |
| 2016/0334638 A1* | 11/2016 | Wagner | ................ | G03B 17/561 |

(Continued)

FOREIGN PATENT DOCUMENTS

JP 2020-003730 A 1/2020

OTHER PUBLICATIONS

U.S. Appl. No. 18/794,294, filed Aug. 5, 2024 (First Named Inventor: Yoshihito Tamaki).

*Primary Examiner* — Pritham D Prabhakher
(74) *Attorney, Agent, or Firm* — Venable LLP

(57) ABSTRACT

An image pickup apparatus includes an imaging unit configured to photoelectrically convert an optical image formed by an optical system including a focus lens and to output image data, and a processor configured to control the focus lens, acquire information on a change start of an imaging direction from a pivoting driver configured to perform pivoting drive for at least one of a pan direction or a tilt direction, and drive the focus lens to a predetermined position using the change start of the imaging direction as a trigger.

22 Claims, 35 Drawing Sheets

(56) References Cited

U.S. PATENT DOCUMENTS

| | | | | |
|---|---|---|---|---|
| 2017/0155832 A1* | 6/2017 | Oshima | ............... | H04N 23/611 |
| 2018/0343445 A1* | 11/2018 | Moroda | ............... | H04N 23/667 |
| 2019/0191100 A1* | 6/2019 | Nakamura | ............ | H04N 23/675 |
| 2019/0306410 A1* | 10/2019 | Oshima | ................. | H04N 23/61 |
| 2020/0409241 A1* | 12/2020 | Iinuma | ................. | H04N 23/663 |
| 2021/0003906 A1* | 1/2021 | Iinuma | ................. | G03B 17/56 |
| 2021/0014427 A1* | 1/2021 | Honjo | ................. | H04N 23/695 |
| 2024/0022822 A1* | 1/2024 | Kimura | ............... | H04N 23/672 |

* cited by examiner

IMAGE PICKUP APPARATUS, CONTROL METHOD OF IMAGE PICKUP APPARATUS, AND STORAGE MEDIUM

BACKGROUND

Technical Field

One of the aspects of the embodiments relates to an image pickup apparatus, a control method for an image pickup apparatus, and a storage medium.

Description of Related Art

Image pickup apparatuses have conventionally been known in which an imaging unit is mounted on a gimbal which is pivotable in each of the pan, tilt, and roll directions. Such image pickup apparatuses can perform imaging while suppressing a manual shake caused by a user. Furthermore, by changing an orientation of the imaging unit, for example by pivoting (or rotating) the pan axis, the user can switch an imaging direction between a selfie mode and a non-selfie mode while keeping holding the gimbal. Since the state of an object rapidly changes when the imaging direction is switched, quick focusing may be performed in response to the object change in order to smoothly transition to imaging after the imaging direction is switched.

Japanese Patent Laid-Open No. 2020-003730 discloses a method of acquiring an angular velocity in at least one of the three axial directions of the gimbal and performing autofocus (AF) in a case where a state in which the angular velocity is equal to or lower than a predetermined value continues for a predetermined time. The method disclosed in Japanese Patent Laid-Open No. 2020-003730 can improve stability during normal imaging, but cannot accelerate focusing after the imaging direction is switched in a case where the axis of the gimbal is pivoted to switch the imaging direction. In addition, in switching the imaging direction, the state of an object to be imaged next cannot be accurately determined until the switching of the imaging direction is completed. Thus, for example, even if the AF is performed during the switching of the imaging direction, an expected focusing state is not necessarily achieved after the imaging direction is switched, and smooth transition to imaging is not available after the imaging direction is switched.

SUMMARY

An image pickup apparatus according to one aspect of the disclosure includes an imaging unit configured to photoelectrically convert an optical image formed by an optical system including a focus lens and to output image data, and a processor configured to control the focus lens, acquire information on a change start of an imaging direction from a pivoting driver configured to perform pivoting drive for at least one of a pan direction or a tilt direction, and drive the focus lens to a predetermined position using the change start of the imaging direction as a trigger. A control method corresponding to the above image pickup apparatus also constitutes another aspect of the disclosure. A storage medium storing a program that causes a computer to execute the above control method also constitutes another aspect of the disclosure.

Further features of the disclosure will become apparent from the following description of embodiments with reference to the attached drawings.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

First Embodiment

Figure 1:
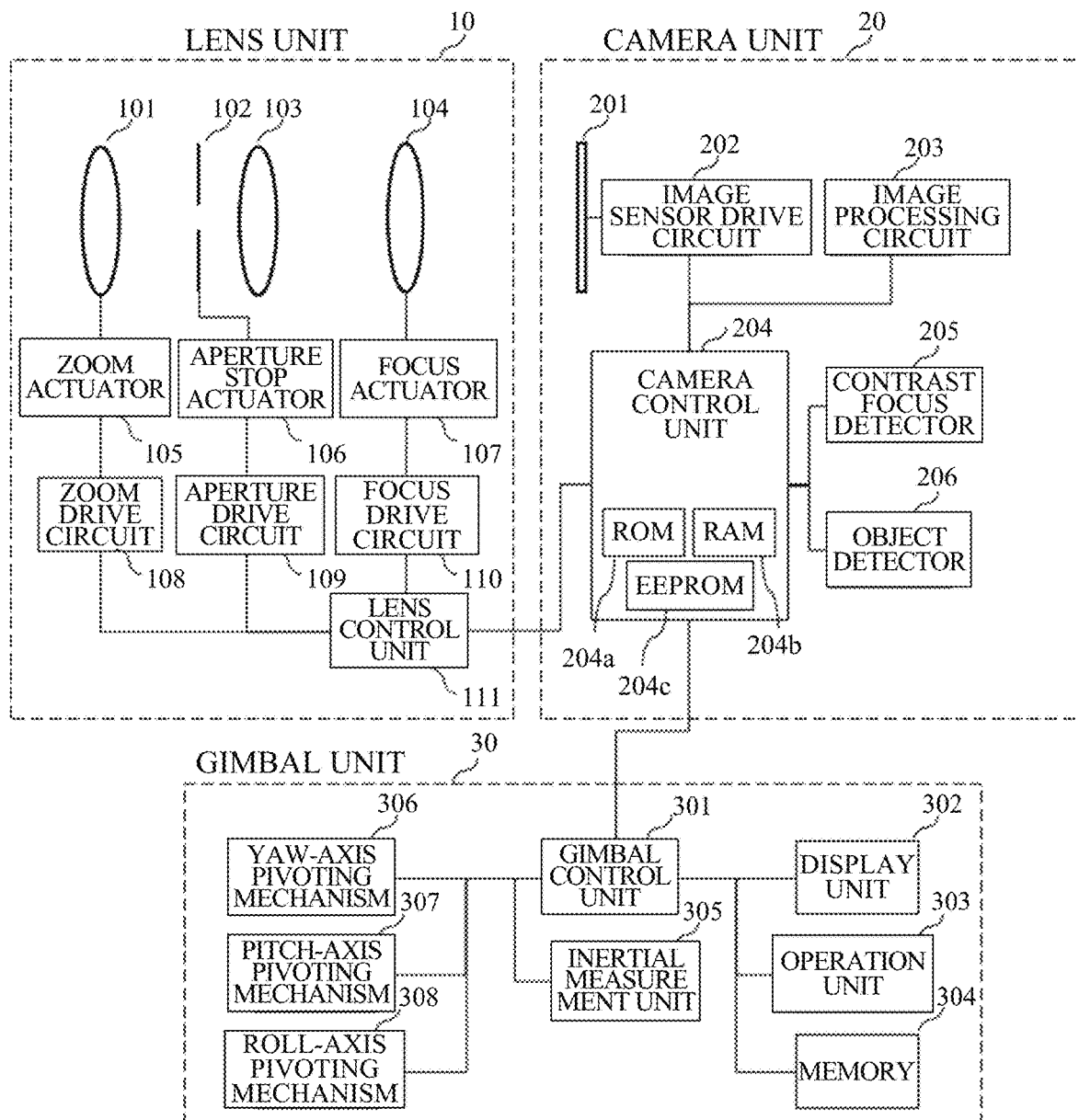
FIG. 1 is a block diagram of an image pickup apparatus according to first, third, fourth and sixth embodiments.

A description will now be given of a first embodiment according to this disclosure.
Configuration of Image Pickup Apparatus FIG. 1 is a block diagram illustrating an example of a functional configuration of a digital camera as an example of an image pickup apparatus according to this embodiment. The digital camera according to this embodiment is a lens integrated type camera and includes a lens unit (lens apparatus) 10 that includes an optical system (imaging optical system) and a camera unit (image pickup apparatus body) 20. The digital camera according to this embodiment is a gimbal integrated type camera, and the lens unit 10 and the camera unit 20 are mounted on a gimbal unit 30. In this embodiment, the lens unit 10, the camera unit 20, and the gimbal unit 30 are integrated, but at least one of them may be detachable.

The lens unit 10 has an optical system (first lens unit 101, an aperture stop (diaphragm) 102, a second lens unit 103, a focus lens unit (focus lens) 104), and a drive/control system. Thus, the lens unit 10 includes the focus lens 104 and is an imaging lens configured to form an optical image of an object.

The first lens unit 101 is disposed at a tip of the lens unit 10 and is held so as to be movable in an optical axis direction. The aperture stop 102 has a function to adjust a light amount during imaging. The aperture stop 102 and the second lens unit 103 are integrally movable in the optical axis direction and move in association with the first lens unit 101 to achieve a zoom function. The focus lens 104 is also movable in the optical axis direction, and an object distance (in-focus distance) which the lens unit 10 focuses on changes according to its position. By controlling a position of the focus lens 104 in the optical axis direction, focusing is performed to adjust the in-focus distance of the lens unit 10.

The drive/control system includes a zoom actuator 105, an aperture stop actuator 106, a focus actuator 107, a zoom drive circuit 108, an aperture stop drive circuit 109, a focus drive circuit 110, and a lens control unit 111. The zoom drive circuit 108 drives the first lens unit 101 and the second lens unit 103 in the optical axis direction using the zoom actuator 105 to control an angle of view of the optical system in the lens unit 10. The aperture stop drive circuit 109 drives the aperture stop 102 using the aperture stop actuator 106 to control an aperture diameter of the aperture stop 102 and opening/closing operation of the aperture stop 102. The focus drive circuit 110 drives the focus lens 104 in the optical axis direction using the focus actuator 107 to change the in-focus distance of the optical system in the lens unit 10. The focus drive circuit 110 detects a current position of the focus lens 104 using the focus actuator 107.

The lens control unit 111 controls the zoom drive circuit 108, the aperture stop drive circuit 109, and the focus drive circuit 110. The lens control unit 111 communicates with a camera control unit (controller) 204. For example, the lens control unit 111 detects the position of the focus lens 104 and notifies the camera control unit 204 of focus lens position information. The lens control unit 111 controls the zoom drive circuit 108, the aperture stop drive circuit 109, and the focus drive circuit 110 in response to a processing command of the camera control unit 204.

The camera unit 20 includes an image sensor 201 and controls the entire camera including the lens unit 10 and the gimbal unit 30. The image sensor 201 consists of a Complementary Metal-Oxide-Semiconductor (CMOS) image sensor and peripheral circuits, and m pixels in a horizontal direction and n pixels in a vertical direction (where m and n are integers equal to or greater than 2) are arranged. The image sensor 201 is an imaging unit which photoelectrically converts an optical image formed by the optical system in the lens unit 10 and outputs image data (imaging signal).

Figure 2A:
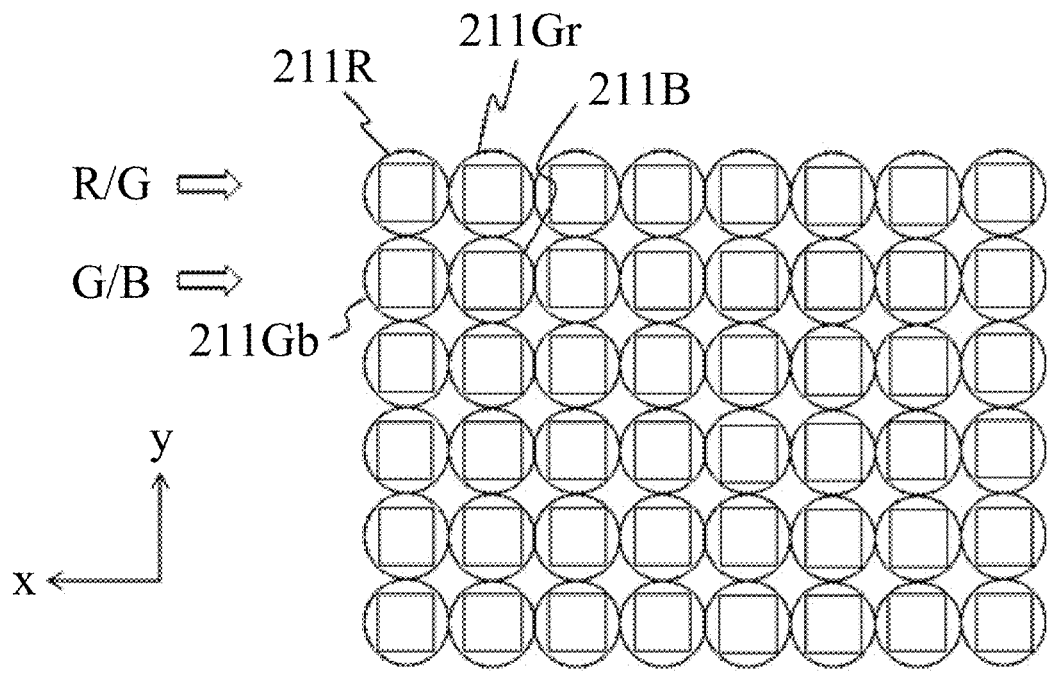
FIGS. 2A and 2B are plan views of light-receiving pixels according to the first and third to sixth embodiments viewed from a lens unit side.
Figure 2B:
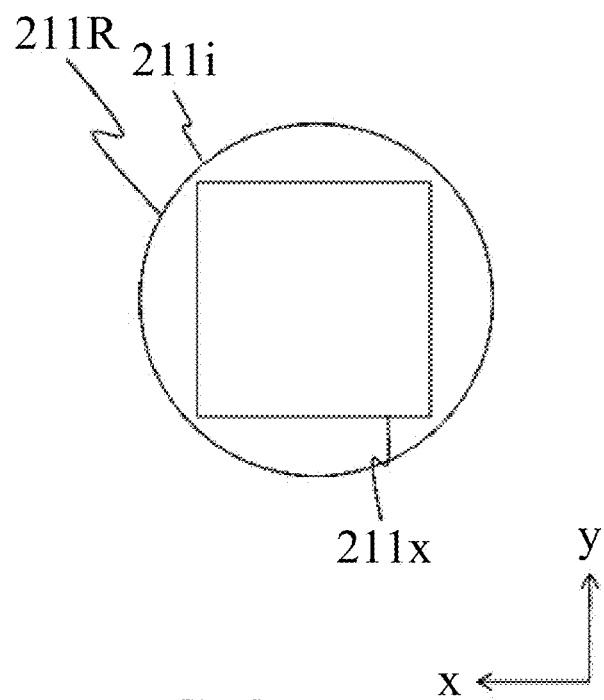

FIG. 2A illustrates an example of an imaging pixel array of the image sensor 201 in this embodiment, and illustrates an area of six vertical rows (Y direction) and eight horizontal columns (X direction) of a two-dimensional C-MOS area sensor observed from the lens unit 10 side. The image sensor 201 includes color filters in a Bayer array, with red (R) and green (G) color filters arranged alternately from left to right in odd-numbered rows of pixels, and green (G) and blue (B) color filters arranged alternately from left to right in even-numbered rows of pixels. The pixel 211R will be described with reference to FIG. 2B. A circle 211*i* represents an on-chip microlens, and a rectangle 211X disposed inside the on-chip microlens is a photoelectric converter. The pixel 211Gr, the pixel 211Gb, and the pixel 211B have the same configuration.

An image sensor drive circuit 202 controls an operation of the image sensor 201, performs an A/D conversion for an acquired image signal, and transmits it to the camera control unit 204. An image processing circuit 203 generates contrast AF data, and display and record image data from image data output by the image sensor 201. In addition, the image processing circuit 203 performs typical image processing for the image data acquired by the image sensor 201, such as gamma conversion, white balance adjustment, color interpolation, and compression encoding, which are performed in the digital camera.

The camera control unit 204 performs all calculations and controls relating to the camera unit 20, and controls the image sensor drive circuit 202 and the image processing circuit 203. The camera control unit 204 requests the lens control unit 111 for a request to acquire a focus lens position, a request to drive the aperture stop, the focus lens, and the zoom lens at a predetermined drive amount, and a request to acquire optical information unique to the lens unit 10. The camera control unit 204 includes a built-in Read Only Memory (ROM) 204*a*, a Random Access Memory (RAM) 204*b*, and a built-in Electrically Erasable Programmable Read-Only Memory (EEPROM) 204*c*. The ROM 204*a* stores a program which controls camera operations. The RAM 204*b* stores variables. The EEPROM 204*c* stores various parameters and various setting information on the camera unit 20 set by the user.

The camera control unit 204 receives control commands for the lens control unit 111, and processing commands from the user at an operation unit 303 via a gimbal control unit 301 of the gimbal unit 30 in order to change operations of the image sensor drive circuit 202 and the image processing circuit 203. The camera control unit 204 displays an imaging signal on a display unit 302 or records the imaging signal in a memory 304 via the gimbal control unit 301.

A contrast focus detector 205 performs focus detection processing using signal data acquired by the image processing circuit 203. The contrast focus detector 205 generates a focus signal in which a predetermined frequency component is extracted, by introducing a luminance signal generated by the image processing circuit 203 into a band pass filter (BPF). For the focus signal, the contrast focus detector 205 detects a line peak value for each horizontal line within a predetermined imaging range. Furthermore, the contrast focus detector 205 integrates the line peak value for each horizontal line in the vertical direction within the predetermined imaging range, and generates an integral evaluation value. The camera control unit 204 performs AF by adjusting a position of the focus lens 104 via the lens control unit 111 so as to search for a peak position where the integral evaluation value becomes large.

An object detector 206 performs an object detection based on the image data acquired by the image processing circuit 203. This embodiment utilizes the object detection that estimates where a target object is located in image data, and the camera control unit 204 uses this to select a focusing result of the contrast focus detector 205 so that the camera control unit 204 can drive the focus lens 104 via the lens control unit 111. The object to be detected may be, for example, a person's face and his eye contained in it, a torso of an animal and its face and eye contained in it, or an entire vehicle and characteristic part contained in it (such as a driver of the vehicle or cockpit). In addition, the object detector 206 detects an object that exists at a position designated by the user within an imaging screen (image) via a touch operation by the user on the display unit 302 or the like.

The gimbal unit 30 is a pivoting driver configured to perform pivoting drive (or rotational drive) in at least one of a pan direction and a tilt direction. The gimbal unit 30 includes the gimbal control unit 301, the display unit 302, the operation unit 303, the memory 304, an inertial measurement unit 305, a yaw-axis pivoting mechanism 306, a pitch-axis pivoting mechanism 307, and a roll-axis pivoting mechanism 308.

The gimbal control unit 301 controls an operation of each unit of the gimbal unit 30. The gimbal control unit 301 communicates information with the camera control unit 204, and provides information for changing the operations of the image sensor drive circuit 202 and the image processing circuit 203. The gimbal control unit 301 controls the zoom drive circuit 108, the aperture stop drive circuit 109, and the focus drive circuit 110 via the lens control unit 111 and the camera control unit 204. The gimbal control unit 301 receives an imaging signal from the camera control unit 204, and displays it on the display unit 302 and records it in the memory 304.

The display unit 302 includes an liquid crystal display (LCD) and the like, and displays information on an imaging mode of the camera, a preview image before imaging and a confirmation image after imaging, and an image illustrating a focus state during the focus detection. The display unit 302 has a touch operation function, and the camera is operable, for example, by directly touching the display unit 302. The operation unit 303 includes a power switch, a focusing start switch, an imaging trigger switch, a zoom operation switch, a gimbal operation switch, and the like. The memory 304 is a removable flash memory and records captured images. The inertial measurement unit 305 has an acceleration sensor and a gyro sensor, and detects accelerations of the entire camera apparatus including the lens unit 10, the camera unit 20, and the gimbal unit 30 in three axial directions: forward/backward, left/right, and up/down. The inertial measurement unit 305 detects angular velocities in three axial directions of a yaw axis, a pitch axis, and a roll axis.

The yaw-axis pivoting mechanism 306 has a yaw axis motor configured to drive the lens unit 10 and the camera unit 20 in a yaw axis direction. The pitch-axis pivoting mechanism 307 has a pitch axis motor configured to drive the lens unit 10 and the camera unit 20 in a pitch axis direction. The roll-axis pivoting mechanism 308 has a roll axis motor configured to drive the lens unit 10 and the camera unit 20 in a roll axis direction.

The gimbal control unit 301 controls the yaw-axis pivoting mechanism 306, the pitch-axis pivoting mechanism 307, and the roll-axis pivoting mechanism 308 in order to suppress a manual shake caused by the user during imaging. In addition, when the user issues a drive command for the yaw-axis pivoting mechanism 306, the pitch-axis pivoting mechanism 307, or the roll-axis pivoting mechanism 308 in response to the operation of the gimbal operation switch of the operation unit 303, the gimbal control unit 301 performs a control according to the command. The gimbal control unit 301 controls the yaw-axis pivoting mechanism 306, the pitch-axis pivoting mechanism 307, and the roll-axis pivoting mechanism 308 for framing in order to accommodate an object detected by the object detector 206 within the imaging screen.

Figure 3A:
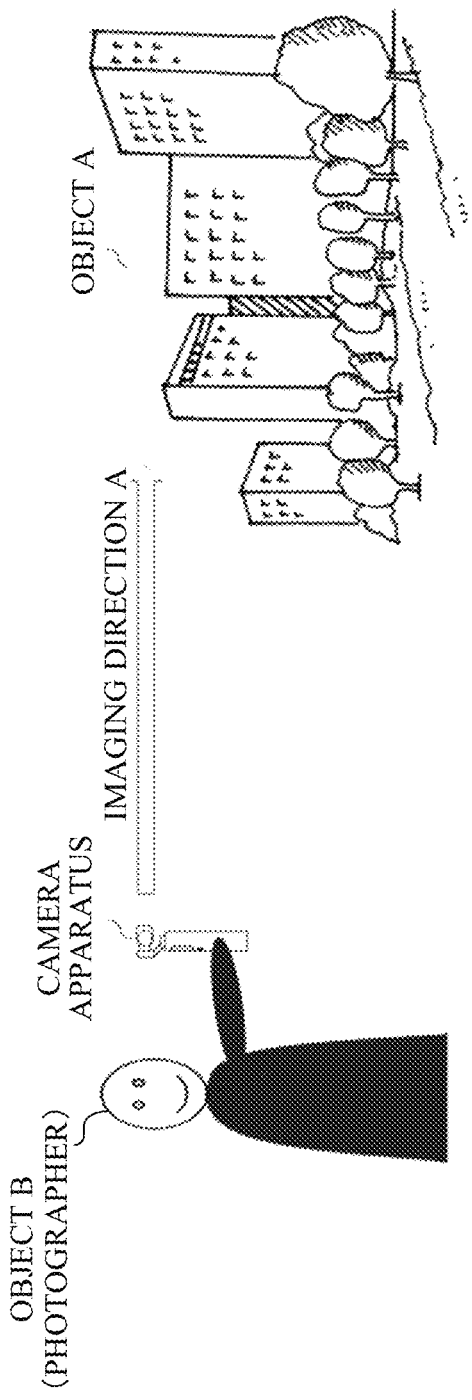
FIGS. 3A and 3B illustrate an imaging state when an imaging direction is changed according to each embodiment.
Figure 3B:
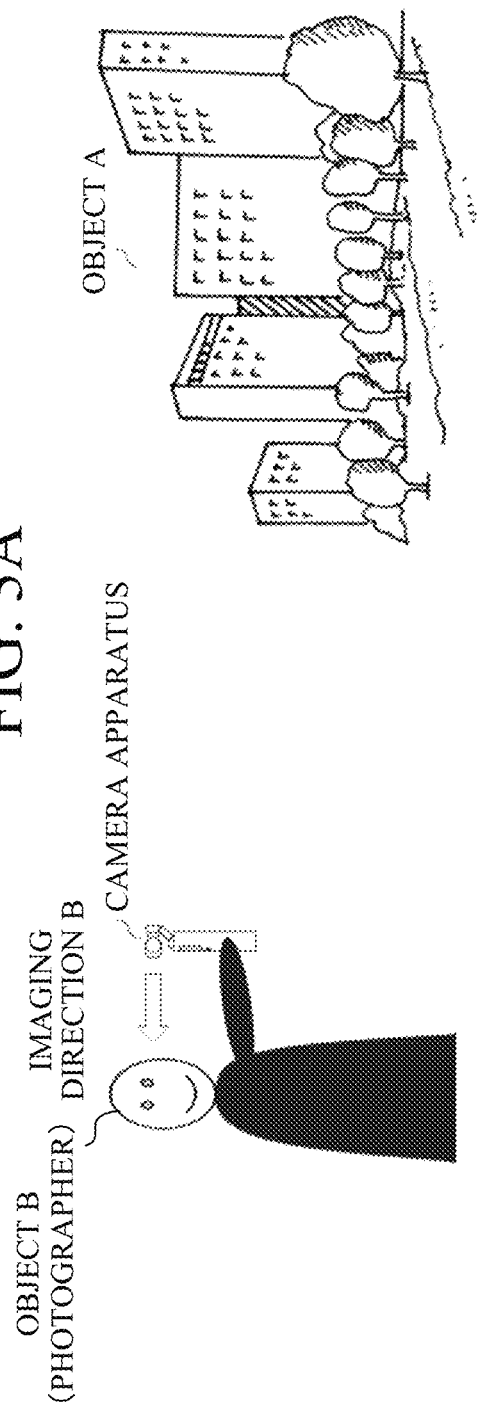

As illustrated in FIGS. 3A and 3B, the operation of the operation unit 303 or the display unit 302 is used as a trigger to control the yaw-axis pivoting mechanism 306 or the pitch-axis pivoting mechanism 307, and the imaging direction (imaging direction by the image sensor 201) is changed while the user is holding the camera. For example, in FIG. 3A, the user is imaging a distant object A in an imaging direction A. In this state, the user can rotate the yaw-axis pivoting mechanism 306 by operating the operation unit 303 or the display unit 302. In FIG. 3B, the user can change the imaging direction while holding the camera apparatus in an imaging direction B of the user (object B). Operation examples for changing the imaging direction include pressing a switch button of the imaging direction on the operation unit 303, touching a switch icon of the imaging direction on a touch panel of the display unit 302, and the like, but other forms are also possible.

Details of Various Processing Performed by Camera Unit 20

Figure 4:
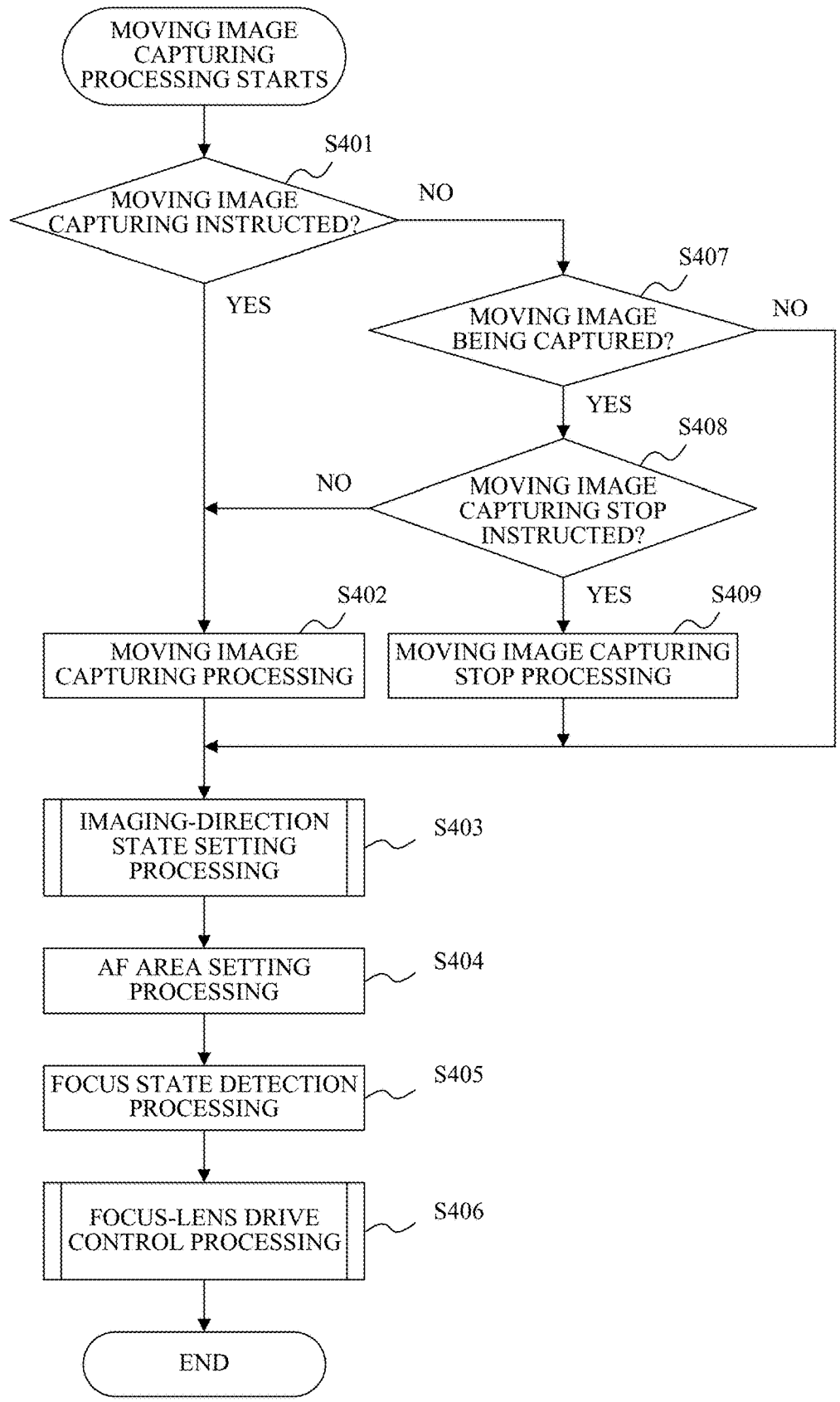
FIG. 4 is a flowchart illustrating moving image capturing processing according to the first to sixth embodiments.

In the camera unit 20, the camera control unit 204 performs the following processing according to an imaging processing program, which is a computer program. FIG. 4 is a flowchart illustrating a procedure of moving image capturing processing, where S stands for step. The camera control unit 204 executes various types of moving image capturing controls and AF control by repeatedly performing the moving image capturing processing. In this embodiment, only the moving image capturing processing will be described, but this embodiment is also applicable to still image capturing processing.

In S401, the camera control unit 204 determines whether or not an instruction to start moving image capturing (moving image capturing instruction) has been input via the gimbal control unit 301 by a touch operation to an operation unit such as the operation unit 303 or the display unit 302. The moving image capturing instruction is notified when a moving image capturing switch on the operation unit 303 is pressed or when a moving image capturing icon on the display unit 302 is pressed during non-moving image capturing. In a case where the moving image capturing instruction has been notified, the flow proceeds to S402, and in a case where the moving image capturing instruction has not been notified, the flow proceeds to S407.

In S402, the camera control unit 204 performs the moving image capturing processing, records a moving image in the memory 304 via the gimbal control unit 301, and the flow proceeds to S403. In S403, the camera control unit 204 performs imaging-direction state setting processing, and the flow proceeds to S404. The imaging-direction state setting processing will be described in detail later.

In S404, the camera control unit 204 performs AF area setting processing, and the flow proceeds to S405. The AF area setting processing sets a position of an object within the imaging screen to be autofocused. In a case where the object detector 206 is detecting an object, an AF area is set based on a position and size of a detected object, and the AF area is updated when the position and size of the detected object change. In a case where the object detector 206 is not detecting an object, the user sets a fixed AF area by a touch operation to the operation unit 303 or the display unit 302, or sets a plurality of AF areas within the screen.

In S405, the camera control unit 204 causes the contrast focus detector 205 to perform focus state detection processing. The camera control unit 204 performs processing to acquire integral evaluation value information to be used for AF, and the like, and the flow proceeds to S406. In S406, the camera control unit 204 executes focus-lens drive control processing, and ends the moving image capturing processing. The focus-lens drive control processing will be described in detail later.

In S407, the camera control unit 204 determines whether or not the moving image capturing is being performed. In a case where the moving image capturing is in progress, the flow proceeds to S408, and in a case where the moving image capturing is not in progress, the flow proceeds to S403. In S408, the camera control unit 204 determines whether or not an instruction to stop the moving image capturing (moving image capturing stop instruction) has been input by a touch operation to the operation unit 303 or the display unit 302 via the gimbal control unit 301. The moving image capturing stop instruction is notified when the moving image capturing switch on the operation unit 303 is pressed or when the moving image capturing icon on the display unit 302 is pressed during the moving image capturing. In a case where the camera control unit 204 has been notified of the moving image capturing stop instruction, the flow proceeds to S409. In a case where the camera control unit 204 has not been notified of the moving image capturing stop instruction, the flow proceeds to S402 to continue the moving image capturing processing. In S409, the camera control unit 204 performs processing to stop the moving image capturing via the gimbal control unit 301, and stops recording the moving image (video) in the memory 304, and the flow proceeds to S403.

Figure 5:
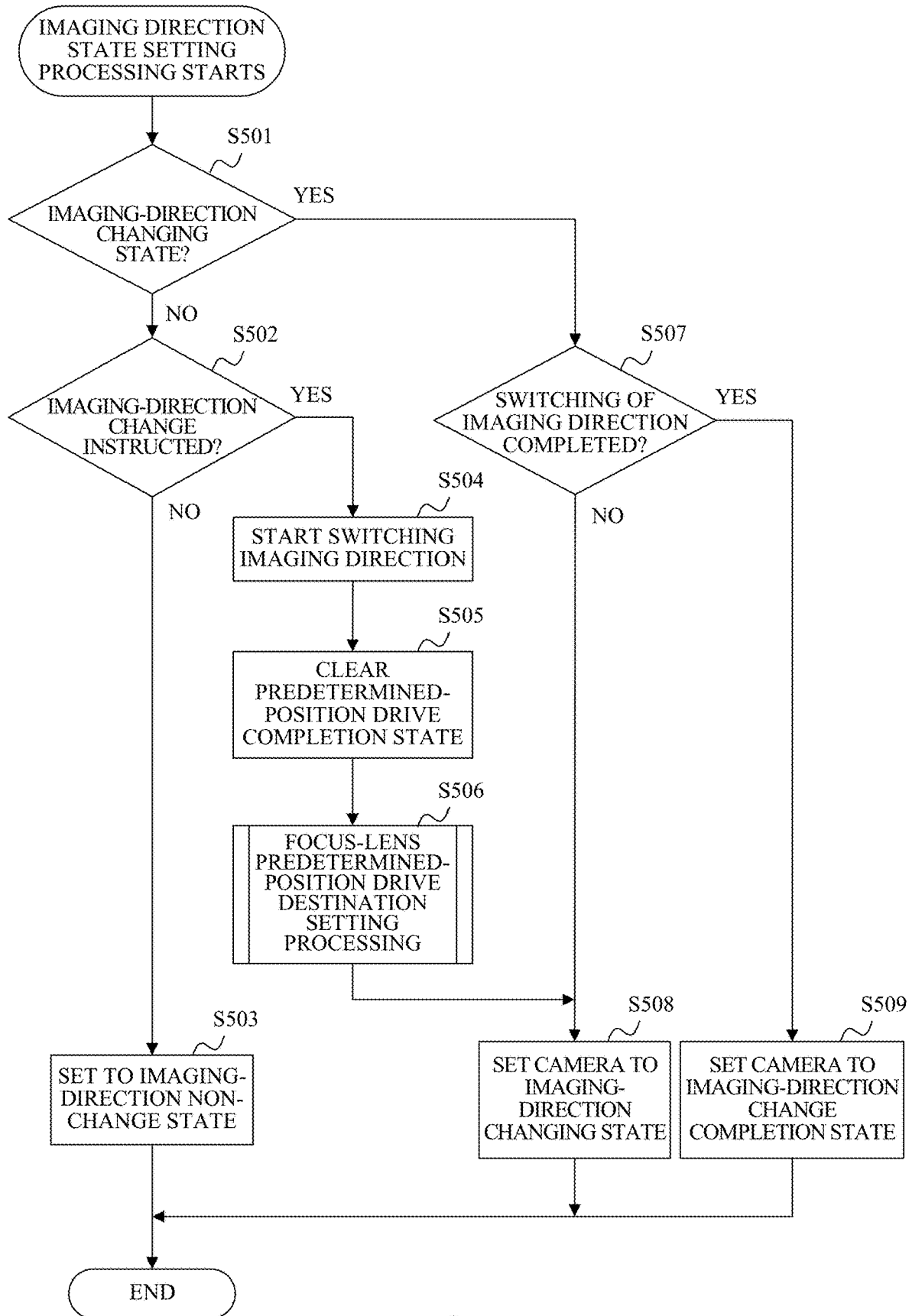
FIG. 5 is a flowchart illustrating setting processing of the imaging direction state according to the first, second, and fourth to sixth embodiments.

Referring now to FIG. 5, a description will be given of the imaging-direction state setting processing performed by the camera control unit 204 in S403 illustrated in FIG. 4. FIG. 5 is a flowchart illustrating the imaging-direction state setting processing.

In S501, the camera control unit 204 determines whether or not the imaging direction is being changed. The phrase "the imaging direction is being changed" has been explained with reference to FIGS. 3A and 3B, and refers to a state in which the imaging direction is being changed by pivoting the yaw-axis pivoting mechanism 306 or the pitch-axis pivoting mechanism 307 using the gimbal control unit 301. That is, this is a state in which the state in FIG. 3A is being switched to the state in FIG. 3B, or a state in which the state in FIG. 3B is being switched to the state in FIG. 3A. In a case where the imaging direction is not being changed, the flow proceeds to S502, and in a case where the imaging direction is being changed, the flow proceeds to S507. In the following description of the embodiment, the yaw-axis pivoting mechanism 306 is basically configured to pivot, but the pitch-axis pivoting mechanism 307 may be configured to pivot instead.

In S502, the camera control unit 204 determines whether or not there is an instruction to change the imaging direction. As described with reference to FIGS. 3A and 3B, examples of the instruction to change the imaging direction include pressing the switch button of the imaging direction on the operation unit 303, touching the switch icon of the imaging direction on the touch panel of the display unit 302, and the like. In a case where there is no instruction to change the imaging direction, the flow proceeds to S503. In a case where there is the instruction to change the imaging direction, the flow proceeds to S504.

In S503, the camera control unit 204 sets the camera to an imaging-direction non-change state, and ends the imaging-direction state setting processing. In S504, the camera control unit 204 receives the instruction to change the imaging direction (information (instruction) on starting changing the imaging direction), and starts switching the imaging direction (changing the imaging direction), and the flow proceeds to S505. In S505, the camera control unit 204 clears a predetermined-position drive completion state, and the flow proceeds to S506. The predetermined-position drive completion state is information for determination in the focus-lens drive control processing, which will be described later with reference to FIG. 7, and will be described in detail later. In S506, the camera control unit 204 performs focus-lens predetermined-position drive destination setting processing, and the flow proceeds to S508. The focus-lens predetermined-position drive destination setting processing will be described in detail later.

In S507, to which the flow proceeds in a case where the imaging direction is being changed in S501, the camera control unit 204 determines whether or not the change in the imaging direction has been completed. In a case where the change in the imaging direction has not been completed, the flow proceeds to S508, and in a case where the change in the imaging direction has been completed, the flow proceeds to S509. In S508, the camera control unit 204 sets the camera to an imaging-direction changing state, and ends the imaging-direction state setting processing. In S509, the camera control unit 204 sets the camera to an imaging-direction change completion state, and ends the imaging-direction state setting processing. Each imaging direction state set in FIG. 5 is information for determination in the focus-lens drive control processing described later with reference to FIG. 7, and details will be described later.

Figure 6:
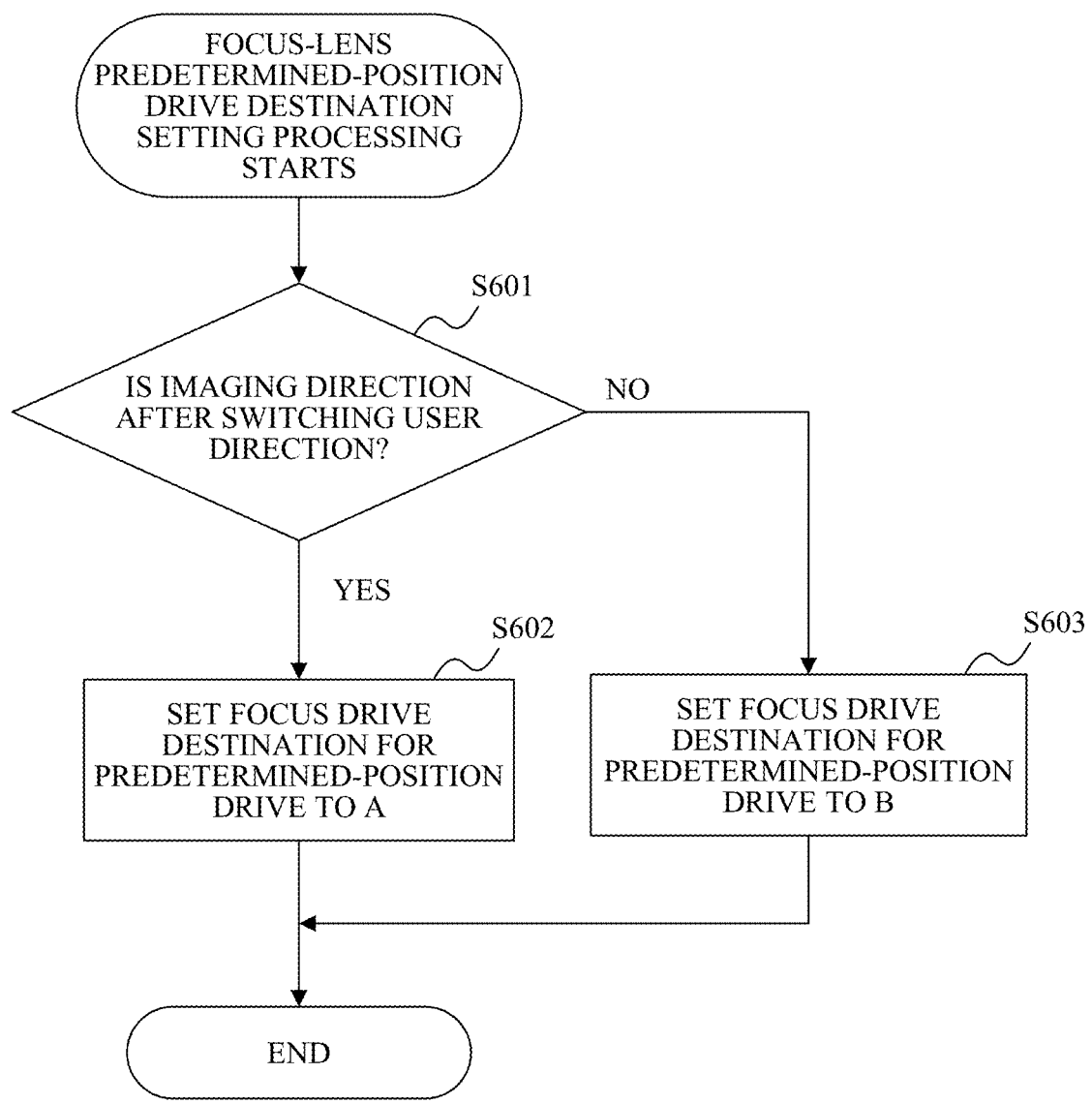
FIG. 6 is a flowchart illustrating setting processing of a focus-lens predetermined-position drive destination according to the first to third and fifth embodiments.

Referring now to FIG. 6, a description will be given of the focus-lens predetermined-position drive destination setting processing performed by the camera control unit 204 in S506 of FIG. 5. FIG. 6 is a flowchart illustrating the focus-lens predetermined-position drive destination setting processing.

In S601, the camera control unit 204 determines whether or not the imaging direction after switching is a user direction (photographer direction). In a case where the imaging direction is the user direction, the flow proceeds to S602, and in a case where the imaging direction is not the user direction, the flow proceeds to S603. As an example of determining whether or not the imaging direction is the user direction, it can be determined whether or not the imaging direction is the same as the direction in which the display unit is located, as illustrated in FIG. 3B.

In S602, the camera control unit 204 sets the focus drive destination for the predetermined-position drive to A, and ends the focus-lens predetermined-position drive destination setting processing. In S603, the camera control unit 204 sets the focus drive destination for the predetermined-position drive to B, and ends the focus-lens predetermined-position drive destination setting processing.

The predetermined-position drive is one of the operations in the focus-lens drive control processing described later with reference to FIG. 7, and is an operation that drives the focus lens 104 to a predetermined drive destination without using the integral evaluation value for the AF described above.

As for a positional relationship between the focus drive destinations A and B of the predetermined-position drive, the focus lens position is set so that an object which B can focus on is closer to infinity than an object which than A can focus on. Details of the operation will be described later, but in a case where the imaging direction is the user direction, i.e., in a case where the focus drive destination is A, it is likely that the user will be imaged, that is, it is likely that there is a focus lens position that can focus on an object distance of about a person's arm's length. On the other hand, in a case where the imaging direction is not the user direction, that is, in a case where the focus drive destination is B, any imaging target is likely, but it is likely that a person, object, landscape, etc. other than the user will be imaged. Therefore, it is likely that there is a focus lens position that can focus on an object on the infinity side of the focus drive destination A.

In this way, a method of setting the focus position drive destination in the focus-lens predetermined-position drive destination setting processing may set the focus lens position that is most likely to be close to a position that can be in focus, by assuming the state of the imaging direction after switching. As a specific example of the focus lens drive destinations A and B, A is set to a focus lens position corresponding to an object distance of 1 meter, and B is set to a focus lens position corresponding to an object distance of 3 meters.

Figure 7:
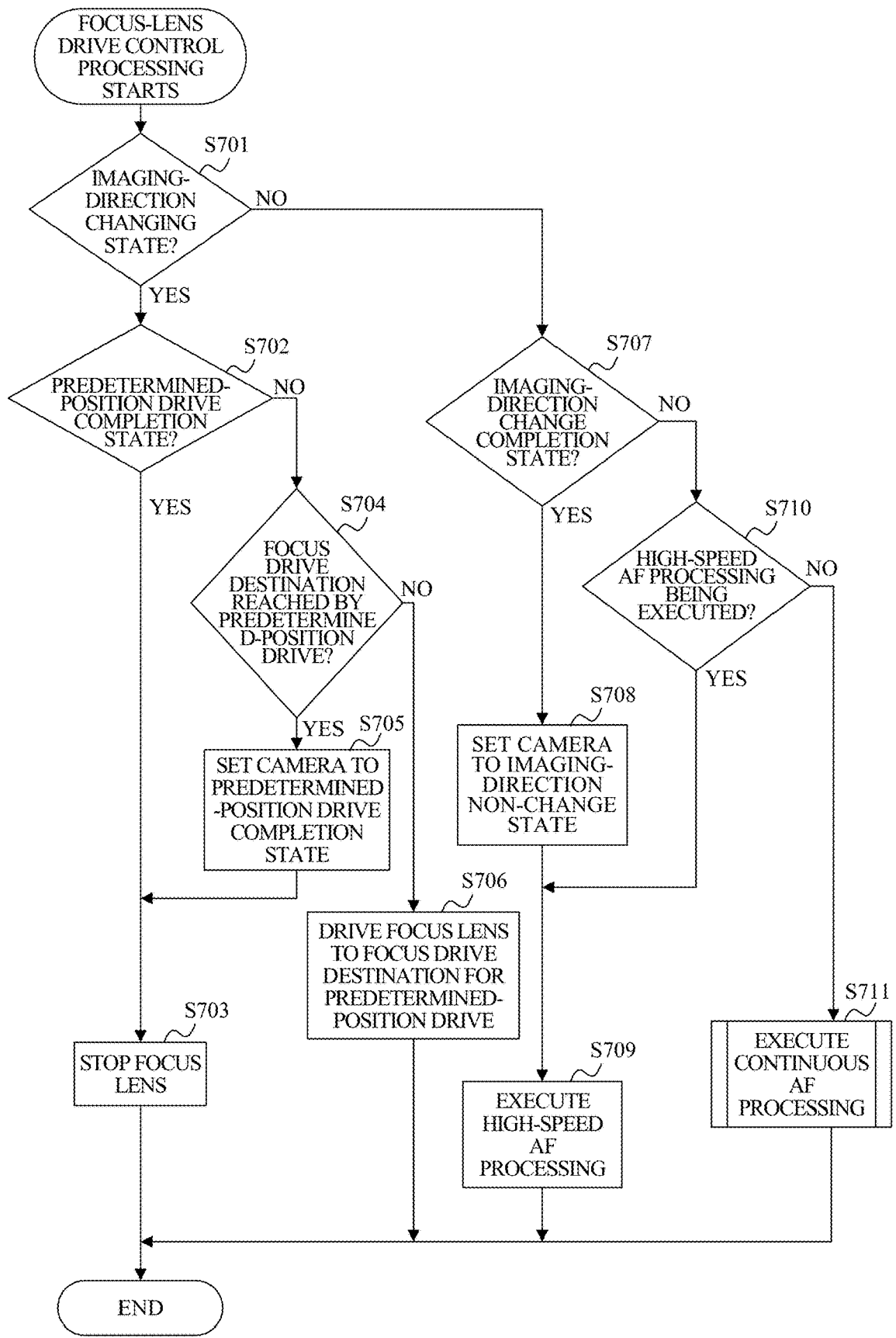
FIG. 7 is a flowchart illustrating focus-lens drive control processing according to the first, fifth and sixth embodiments.

Referring now to FIG. 7, a description will be given of the focus-lens drive control processing performed by the camera control unit 204 in S406 of FIG. 4. FIG. 7 is a flowchart illustrating the focus-lens drive control processing.

In S701, the camera control unit 204 determines whether or not the camera in the imaging-direction changing state. In a case where the camera is in the imaging-direction changing state, the flow proceeds to S702, and in a case where the camera is not in the imaging-direction changing state, the flow proceeds to S707. In S702, the camera control unit 204 determines whether or not the camera is in the predetermined-position drive completion state. In a case where the camera is in the predetermined-position drive completion state, the flow proceeds to S703, and in a case where the camera is not in the predetermined-position drive completion state, the flow proceeds to S704. In S703, the camera control unit 204 stops the focus lens and ends the focus-lens drive control processing.

In S704, the camera control unit 204 determines whether or not the focus lens has reached the focus drive destination by the predetermined-position drive. In a case where the focus lens has reached the focus drive destination by the predetermined-position drive, the flow proceeds to S705, and in a case where the focus lens has not yet reached the focus drive destination by the predetermined-position drive, the flow proceeds to S706. In S705, the camera control unit 204 sets the camera to the predetermined-position drive completion state, and the flow proceeds to S703. The camera control unit 204 stops the focus lens in S703. In S706, the camera control unit 204 controls the focus lens to be driven to the focus drive destination for the predetermined-position drive, and ends the focus-lens drive control processing.

In a case where the camera is not in the imaging-direction changing state in S701, that is, in S707, to which the flow proceeds in a case where the camera is in the imaging-direction non-change state or in the imaging-direction change completion state, the camera control unit 204 determines whether or not the camera is in the imaging-direction change completion state. In a case where the camera is in the imaging-direction change completion state, the flow proceeds to S708. In a case where the camera is not in the imaging-direction change completion state, i.e., in a case where the camera is in the imaging-direction non-change state, the flow proceeds to S710. In S708, the camera control unit 204 sets the camera to the imaging-direction non-change state, and the flow proceeds to S709. In S709, the camera control unit 204 executes high-speed AF processing and ends the focus-lens drive control processing. The high-speed AF processing performs focusing with an emphasis on achieving in-focus quickly.

In S710, to which the flow proceeds in a case where the camera is in the imaging-direction non-change state in S707, the camera control unit 204 determines whether or not the high-speed AF processing in S709 is being executed. In a case where the high-speed AF processing is being executed, the flow proceeds to S709 to continue the high-speed AF processing, and in a case where the high-speed AF processing is not being executed, the flow proceeds to S711.

In S711, the camera control unit 204 executes continuous AF processing and ends the focus-lens drive control processing. A detailed description of the continuous AF processing will be given later. Unlike the concept of the high-speed AF processing in S709, for recording during moving image capturing, focusing is suppressed or focusing that is not too fast is performed.

Figure 8:
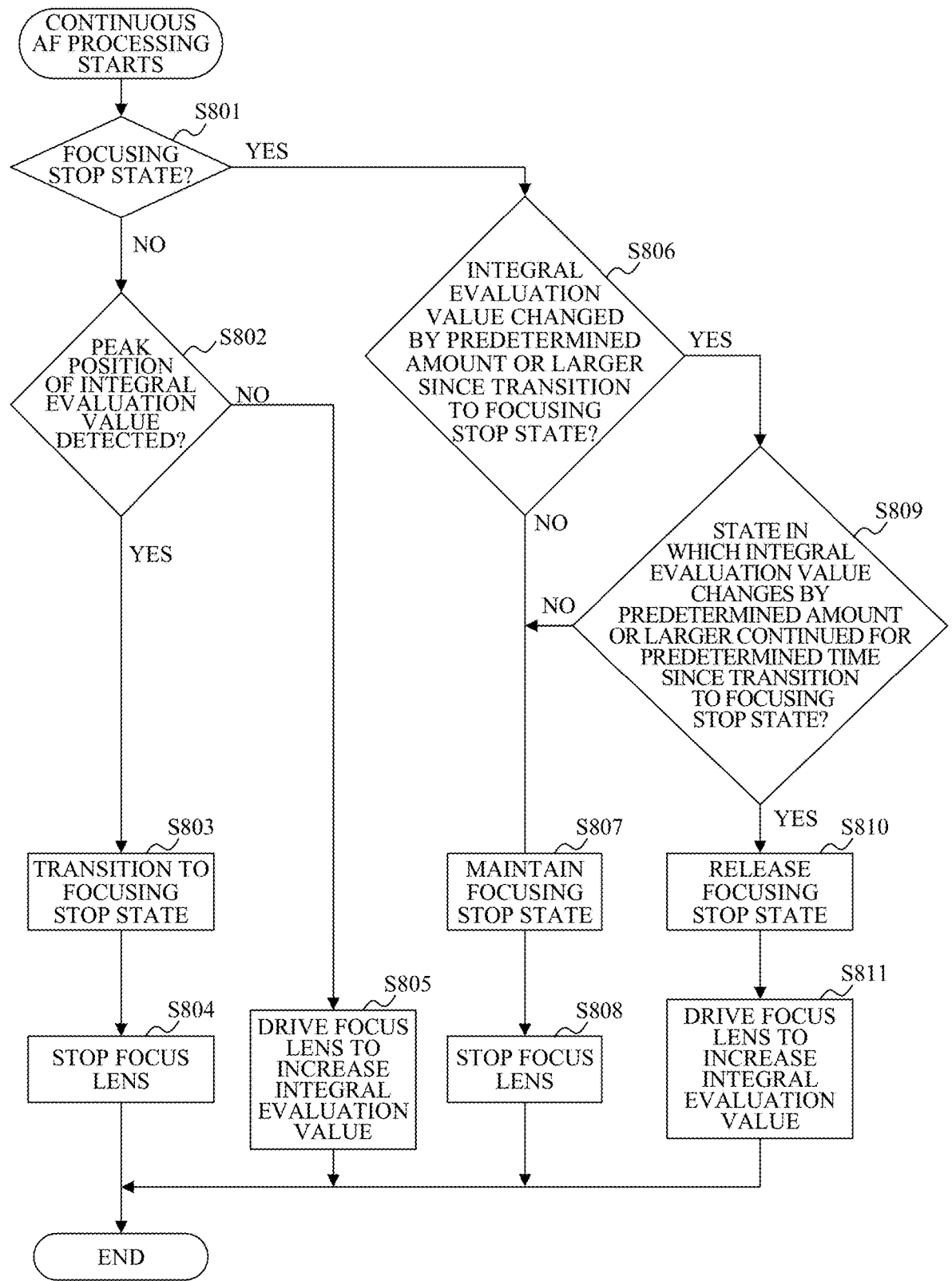
FIG. 8 is a flowchart illustrating continuous AF processing according to the first and third to sixth embodiments.

Referring now to FIG. 8, a description will be given of the continuous AF processing performed by the camera control unit 204 in S711 of FIG. 7. FIG. 8 is a flowchart illustrating the continuous AF processing.

In S801, the camera control unit 204 determines whether or not the camera is in a focusing stop state. In a case where the camera is not in the focusing stop state, the flow proceeds to S802, and in a case where the camera is in the focusing stop state, the flow proceeds to S806. In S802, the camera control unit 204 determines whether or not a peak position of the integral evaluation value generated by the contrast focus detector 205 has been detected. In a case where the peak position of the integral evaluation value is detected, i.e., in a case where the focus lens position assumed to be a focus position is detected, the flow proceeds to S803. In a case where the peak position of the integral evaluation value is not detected, the flow proceeds to S805.

In S803, the camera control unit 204 transitions to the focusing stop state and the flow proceeds to S804. At this time, the integral evaluation value at the time of transition to the focusing stop state is stored and used in the processing described later. In S804, the camera control unit 204 performs a control to stop the focus lens, and ends the continuous AF processing.

In S805, the camera control unit 204 has not detected the peak position of the integral evaluation value, i.e., has not detected the focus lens position that is assumed to be the in-focus position, so drives the focus lens in a direction of increasing the integral evaluation value. The camera control unit 204 continues to control the focus lens to search for the in-focus position of the focus lens, and ends the continuous AF processing.

In S806, the camera control unit 204 refers to the integral evaluation value that was stored in the transition to the focusing stop state in S803, and determines whether or not a change of a predetermined amount or larger has occurred from the latest integral evaluation value. In a case where there is such a change, the image degradation may occur due to a change in a distance between the user and the object since the previous transition to the focusing stop state, or an imaging target may change to a different object. In this way, it is determined whether or not the integral evaluation value has not changed by a predetermined amount or more since the transition to the focusing stop state, and in a case where it has not changed, the flow proceeds to S807, and in a case where it has changed, the flow proceeds to S809.

In S807, the integral evaluation value has changed only a little since the transition to the focusing stop state, the camera control unit 204 determines that no image degradation has occurred and maintains the focusing stop state, and the flow proceeds to S808. In S808, the camera control unit 204 performs the control to stop the focus lens similarly to S804, and ends the continuous AF processing.

In S809, after determining in S806 that the integral evaluation value has changed by the predetermined amount or more since the transition to the focusing stop state, the camera control unit 204 further determines whether or not this state has continued for a predetermined time. In a case where the change in the integral evaluation value is equal to or larger than the predetermined amount and this state continues for the predetermined time, the flow proceeds to S810; otherwise, the flow proceeds to S807 and the focusing stop state is continued.

In S810, the camera control unit 204 releases the focusing stop state, and the flow proceeds to S811. The camera control unit 204 determines that the integral evaluation value has changed by the predetermined amount or more since the transition to the focusing stop state, and then determines that this state has continued for the predetermined time. Thereby, the camera control unit 204 determines that image degradation has occurred or the object has changed, and performs AF. In S811, the camera control unit 204 drives the focus lens in the direction of increasing the integral evaluation value, similarly to S805. The camera control unit 204 continues to control the focus lens to search for the in-focus position of the focus lens, and ends the continuous AF processing.

A detailed description will now be given of the characteristic of this embodiment. The function of changing the imaging direction has been described with reference to FIGS. 3A and 3B. A description will now be given of the problem with AF at this time. In a case where the imaging direction is switched from the imaging direction A in FIG. 3A to the imaging direction B in FIG. 3B, and in a case where the imaging direction is switched from the imaging direction B to the imaging direction A, a change in an object to be imaged occurs in either case. In particular, in a case where a large change in object distance occurs as a result of the switching, unless the focus lens is also moved in accordance with the change in object distance, defocus occurs after the imaging direction is switched. However, in a system that performs AF based on an imaging signal from the image sensor 201, the object to be imaged and object distance after the imaging direction is switched cannot be detected until the imaging direction is switched. That is, in order to perform AF on the object to be imaged after the imaging direction is switched, it is necessary to wait until the imaging direction is switched. The user wishes to quickly acquire an in-focus state after the imaging direction is switched, because the user becomes ready to perform imaging.

Figure 9A:
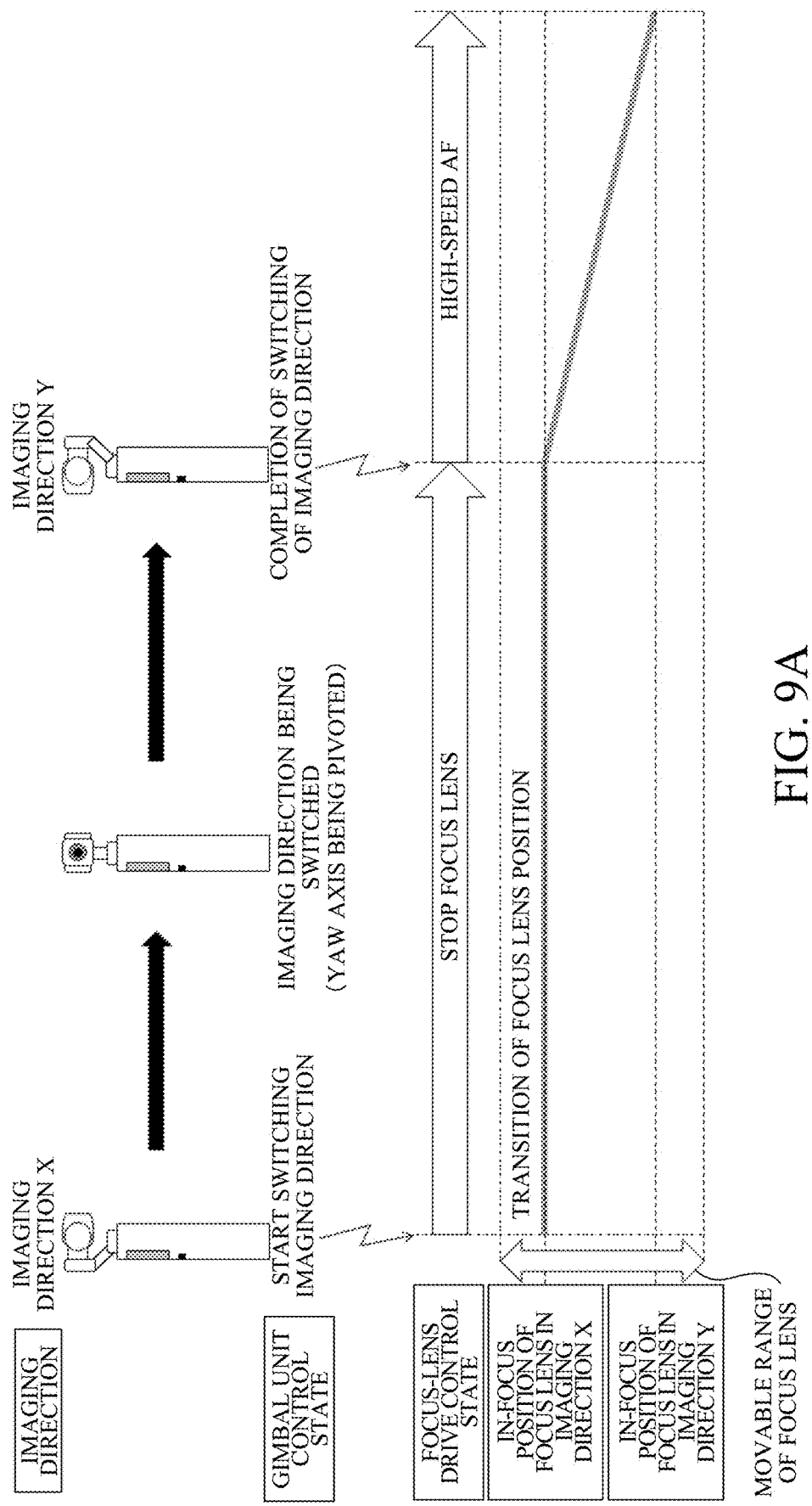
FIG. 9A illustrates time-series states when the imaging direction is changed according to a comparative example.
Figure 9B:
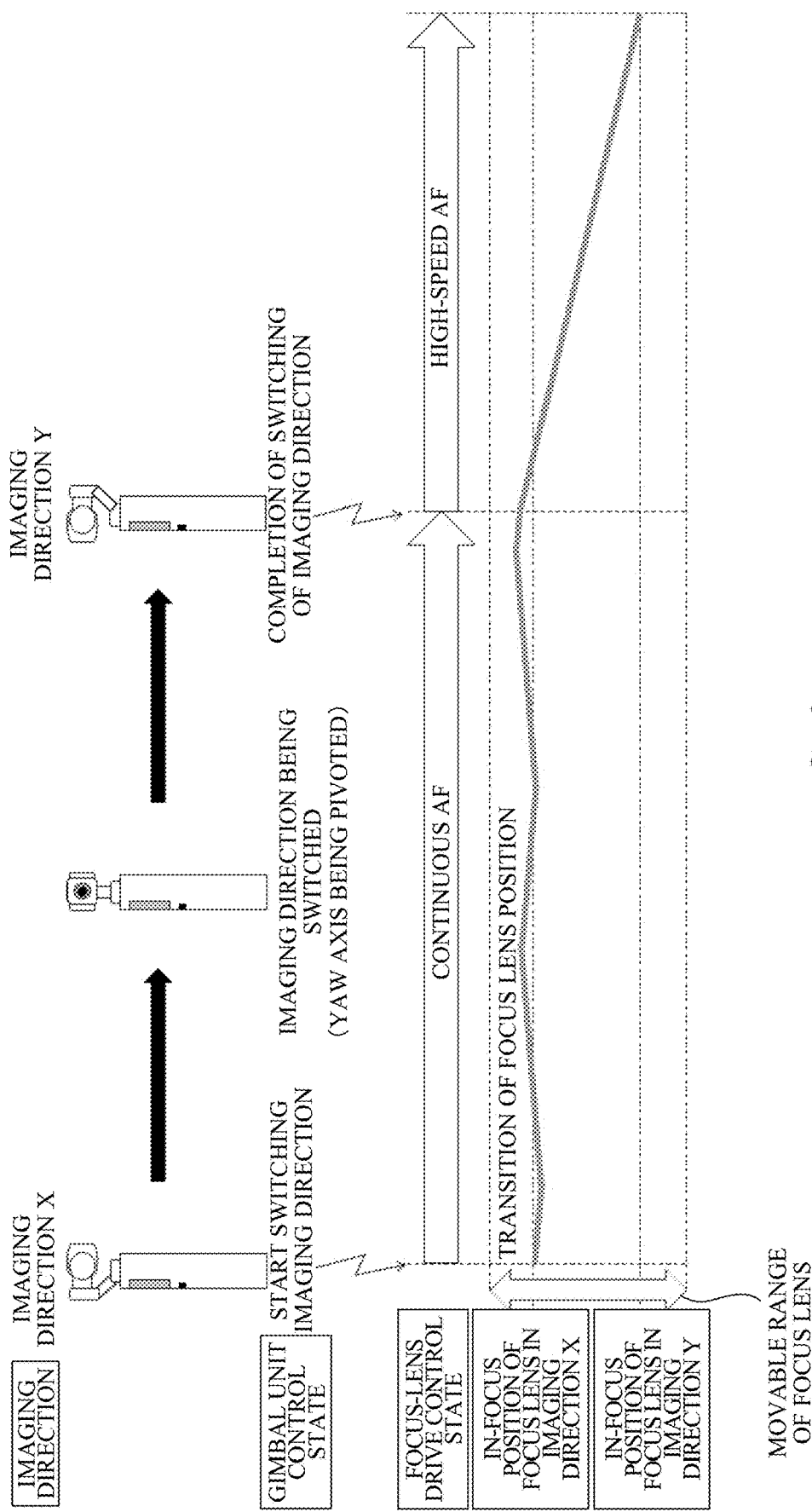
FIG. 9B illustrates time-series states when the imaging direction is changed as a comparative example.

FIGS. 9A and 9B illustrate examples of time-series states when the imaging direction is changed similarly to FIGS. 3A and 3B. These states are examples of an imaging direction, a state of the camera apparatus, a control state of the gimbal unit, a focus lens drive control state, a position and movable range of the focus lens that are in the in-focus state in each of the imaging directions X and Y, and a transition of the focus lens position. Hereinafter, drawings in the same format as those of FIGS. 9A and 9B will be used.

In FIGS. 3A and 3B, the imaging direction A is a direction on the far side, that is, a direction in which the display unit 302 is not located, and the imaging direction B is a user direction, that is, a direction in which the display unit 302 is located. The imaging directions X and Y in FIGS. 9A and 9B may be replaced with either of the imaging directions A and B in FIGS. 3A and 3B. For example, the imaging directions X and Y in FIGS. 9A and 9B may correspond to the imaging directions A and B or B and A in FIGS. 3A and 3B, respectively.

FIGS. 9A and 9B illustrate an example of the problem in a case where this embodiment is not applied. In a state of the imaging direction X, the gimbal control state changes over time from switching the imaging direction (yaw axis pivoting) to completion of switching the imaging direction, triggered by the operation to start switching imaging direction, and then changes to a state of the imaging direction Y. The graph illustrates the drive control state of the focus lens and the transition of the focus lens position at that time.

In the example of FIG. 9A, the focus lens drive control state is set to a focus lens stop state from the switching start of the imaging direction to the switching completion, and the focus lens drive control state is set to a high-speed AF state after the switching of the imaging direction is completed. In a case where the driving of the focus lens is controlled as in this example, when the switching from the imaging direction X to the imaging direction Y is completed, the focus lens position is an in-focus position in the imaging direction X before the imaging direction is switched. That is, the focus lens position is far from the in-focus position in the imaging direction Y, and it is assumed that an image degradation of an object captured in the imaging direction Y is large. Thereafter, high-speed AF is performed to the object captured in the imaging direction Y, but since a moving stroke of the focus lens is long and it takes time to achieve the in-focus state, there is a problem in that the imaging start in the imaging direction Y delays.

FIG. 9B differs from FIG. 9A in that the focus lens drive control state is a continuous AF state from the switching start of the imaging direction to the switching completion. In a case where the driving of the focus lens is controlled as in this example, when the switching from the imaging direction X to the imaging direction Y is completed, the focus lens can be driven by AF. However, the object captured in the imaging direction Y cannot be captured within the angle of view unless the switching of the imaging direction is almost completed, and thus the focus lens cannot always be driven to a position suitable for the state of the imaging direction Y. As illustrated in FIG. 9B, when the switching of the imaging direction is completed, the focus lens position may be farther from the object captured in the imaging direction Y. In such a case, as explained in FIG. 9A, the high-speed AF is then used to focus on the object captured in the imaging direction Y. However, the moving stroke of the focus lens is long and it takes time to achieve the in-focus state, and there is a problem in that the imaging start in the imaging direction Y delays. A description will be given of an improvement example by applying this embodiment to the problem described with reference to FIGS. 9A and 9B.

Figure 10A:
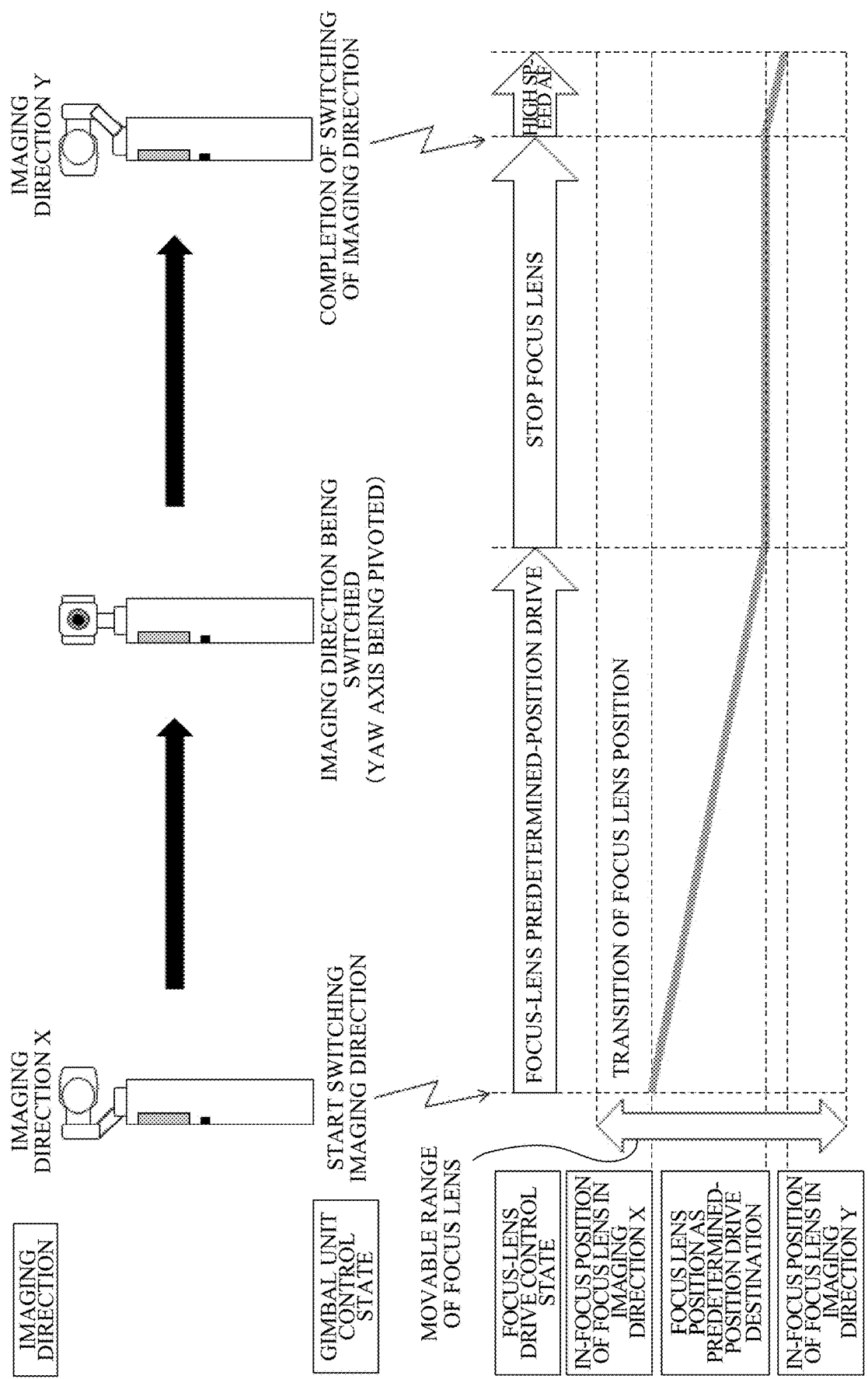
FIG. 10A illustrates time-series states when the imaging direction is changed according to the first embodiment.
Figure 10B:
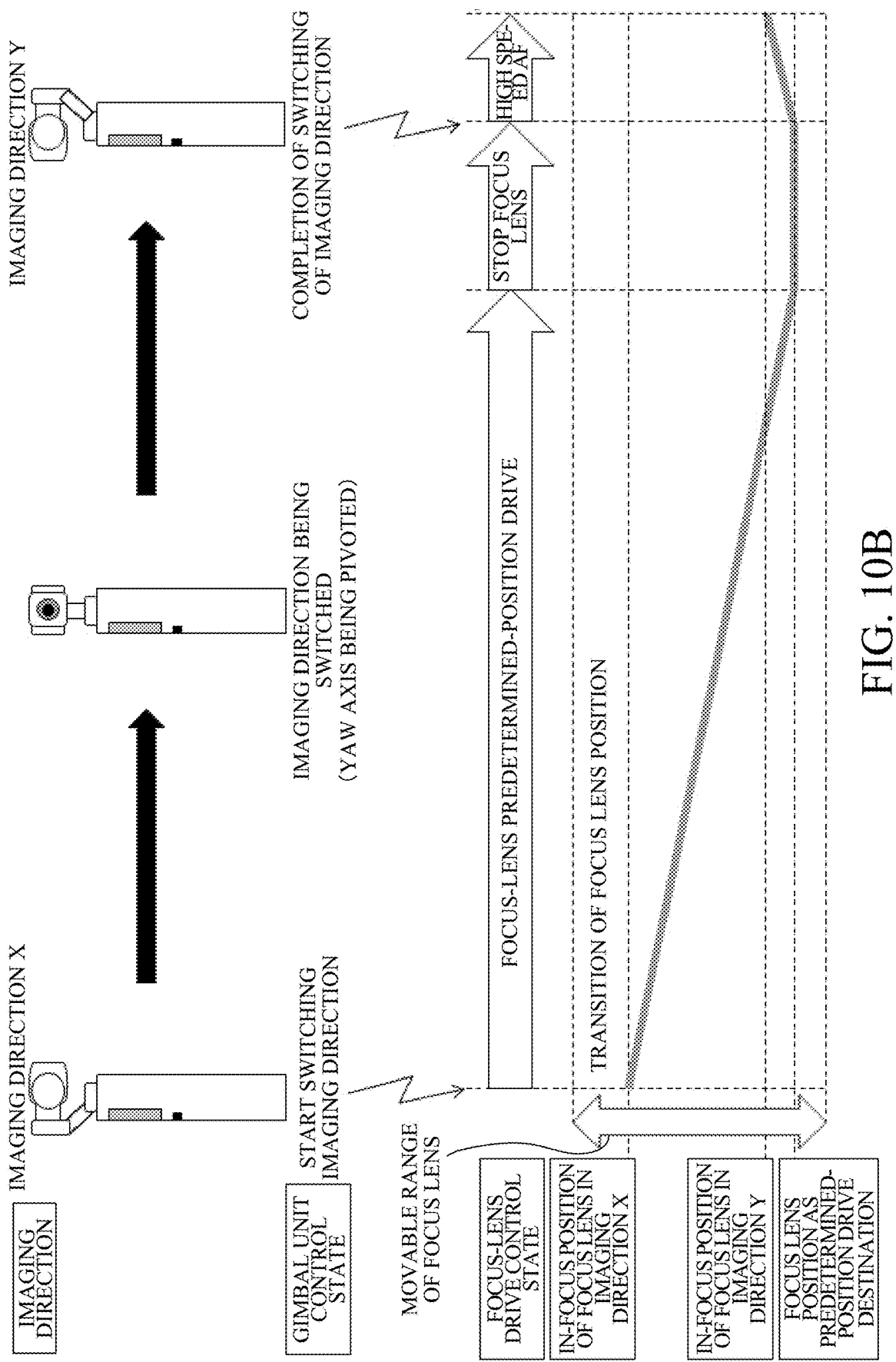
FIG. 10B illustrates time-series states when the imaging direction is changed according to the first embodiment.

FIGS. 10A and 10B illustrate time-series states when the imaging direction is changed in this embodiment. In FIGS. 10A and 10B, unlike FIGS. 9A and 9B, as the focus lens drive control state, the focus-lens predetermined-position drive is performed just after the switching of the imaging direction starts. A difference between FIGS. 10A and 10B is whether the focus lens position at the predetermined-position drive destination has not passed or has passed the in-focus position of the focus lens in the imaging direction Y.

The focus-lens predetermined-position drive receives the instruction to change the imaging direction in S502 of FIG. 5, and determines the focus drive destination for the predetermined-position drive in S506, that is, by the focus-lens predetermined-position drive destination setting processing in FIG. 6. Moreover, in the focus-lens drive control processing of FIG. 7, as the focus lens drive when it is determined in S701 that the camera is in the imaging-direction changing state, after the determinations of S702 and S703, the focus lens is controlled to be driven to a focus drive destination for the predetermined-position drive in S706.

Thereafter, in FIGS. 10A and 10B, the predetermined-position drive of the focus lens is completed before the switching of the imaging direction is completed, and the focus lens drive control state is the focus lens stop state until the switching of the imaging direction is completed. In FIG. 7, in a case where the focus lens has reached the focus drive destination by the predetermined-position drive in S704, the predetermined-position drive completion state is set in S705, and the focus lens is controlled to stop in S703. In a case where the camera is in the imaging-direction changing state in S701, since the predetermined-position drive is completed in S702, the focus lens stop state is maintained in S703. Thereafter, in FIGS. 10A and 10B, the high-speed AF is executed after the switching of the imaging direction is completed. In S701 of FIG. 7, it is determined that the camera is not in the imaging-direction changing state, and in S707, the camera is in the imaging-direction change completion state, so the high-speed AF processing is executed in S709 via S708.

The idea behind this control is that, as explained with reference to FIG. 6, in a case where the imaging direction is the user direction, it is likely that the user will be imaged, that is, it is likely that there is a focus lens position that can focus on an object distance of about a person's arm's length. On the other hand, in a case where the imaging direction is not the user direction, any imaging target is likely, but it is likely that a person, object, landscape, etc. other than the user will be imaged. The focus drive destination A or B for the predetermined-position drive corresponding to each switching destination of the imaging direction is set, and the focus lens is controlled to be previously moved to the corresponding focus lens position during the switching of the imaging direction. When the switching of the imaging direction is completed, it is highly likely that the focus lens has been moved to a focus lens position close to the in-focus position of the object captured in the imaging direction Y. By starting the high-speed AF from that point, the moving stroke of the focus lens can become shorter than that in FIGS. 9A and 9B, and the focus lens can reach the in-focus position in a shorter time. Thereby, the user can be ready for imaging in a shorter time when switching the imaging direction is executed.

FIG. 10A illustrates a case where the focus lens position as the predetermined-position drive destination does not pass the in-focus position in the imaging direction Y. The predetermined-position drive merely moves the focus lens to a focus lens position for an object that is expected to be imaged after the switching of the imaging direction is completed, and it is supposed that the focus lens may pass the in-focus position in the imaging direction Y, as illustrated in FIG. 10B. Even in such a case, the idea is similar to that of FIG. 10A, and the focus lens can be moved to a focus lens position close to the in-focus position of the object captured in the imaging direction Y when the switching of the imaging direction is completed. In both of FIGS. 10A and 10B, the moving stroke of the focus lens during the AF after the switching of the imaging direction is completed can be shortened, and the focus lens can reach the in-focus position in a shorter time.

Figure 11A:
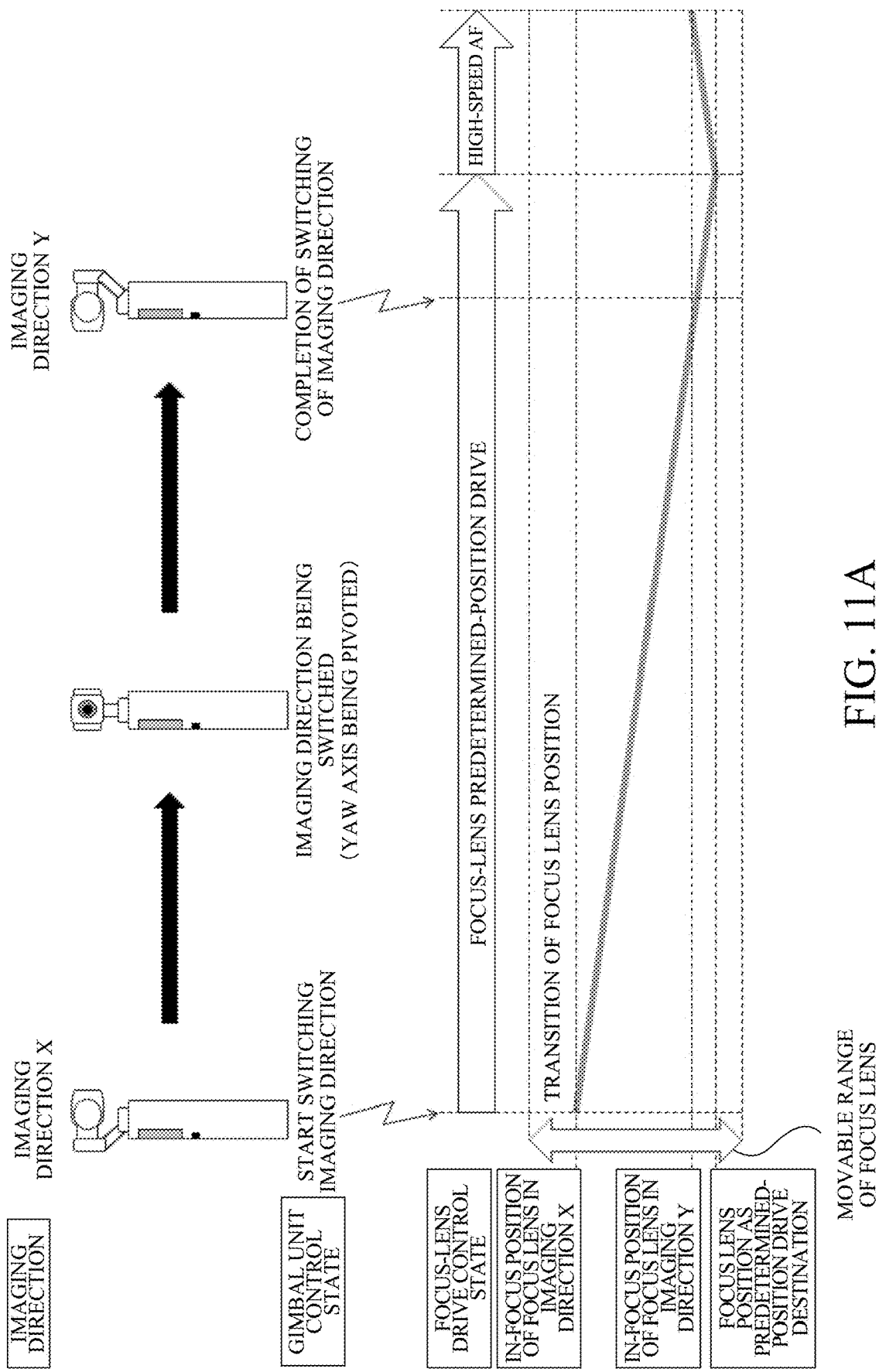
FIG. 11A illustrates time-series states when the imaging direction is changed according to a comparative example and the first embodiment.
Figure 11B:
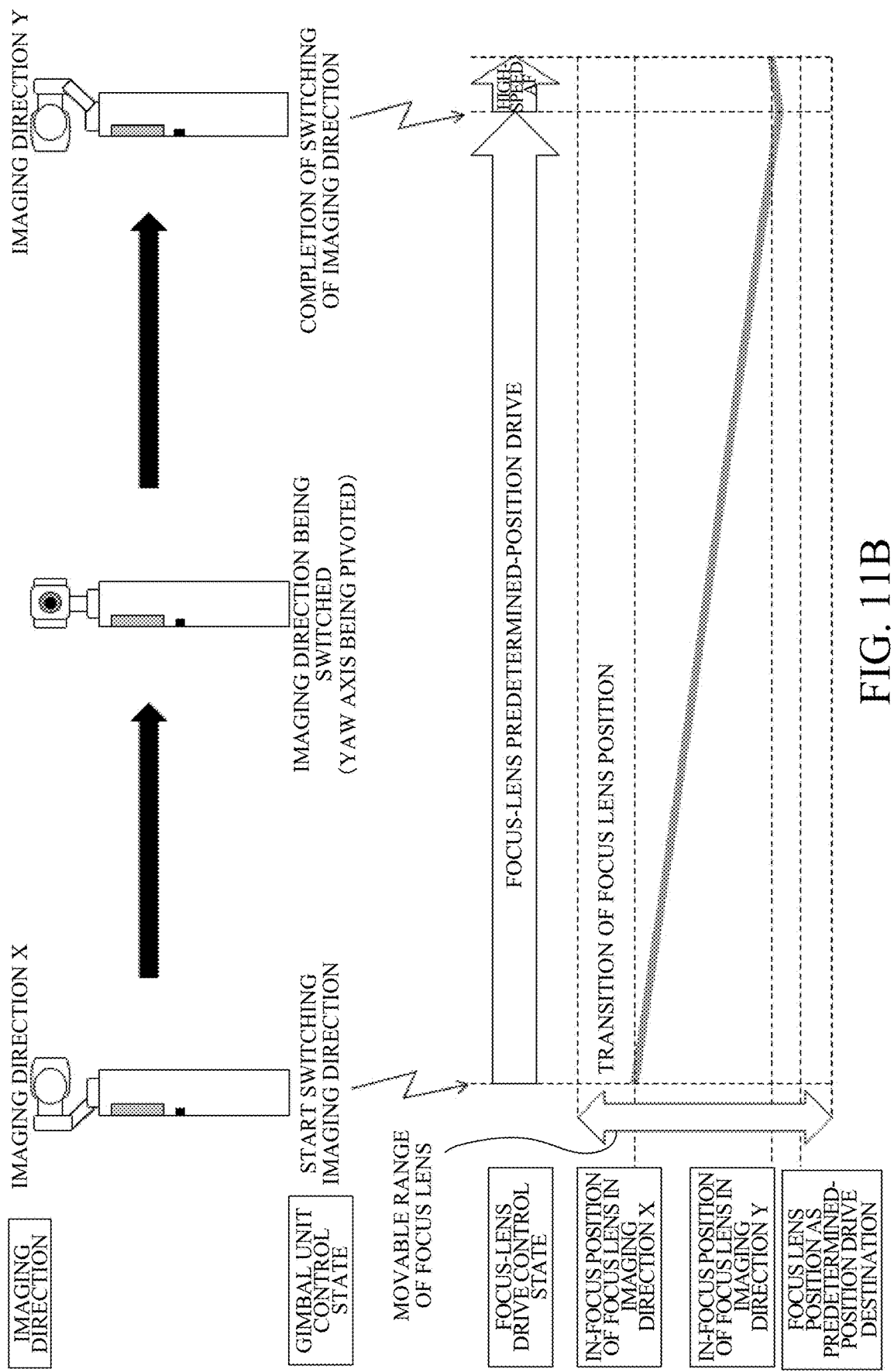
FIG. 11B illustrates time-series states when the imaging direction is changed according to a comparative example and the first embodiment.

FIGS. 11A and 11B illustrate another example of time-series states when the imaging direction is changed. The focus-lens predetermined-position drive is performed just after the switching of the imaging direction starts, similarly to FIGS. 10A and 10B. However, FIGS. 11A and 11B illustrate a case where the focus lens cannot reach the focus lens position as the predetermined-position drive destination when the switching of the imaging direction is completed. Such a case occurs, for example, in a case where a pivoting speed of the yaw-axis pivoting mechanism 306 in the gimbal unit 30 is fast, in a case where the drive speed at which the focus lens 104 can be driven is slow, or in a case where a driving stroke of the focus lens to be driven is long.

FIGS. 11A and 11B illustrate a case where the drive speed of the focus lens is lower than that of FIGS. 9A, 9B, 10A, and 10B. FIG. 11A illustrates a problem example to which this embodiment is not partially applied, and represents a case in which, even when the switching of the imaging direction is completed, the predetermined-position drive continues to the focus lens position as the predetermined-position drive destination, and is then switched to the high-speed AF. As described above, when the switching of the imaging direction is completed, the object captured in the imaging direction Y can be autofocused, and thus AF may be originally used. However, in FIG. 11A, even though AF can be used after the switching of the imaging direction is completed, extra focus lens drive is performed because the AF is performed after the focus lens is moved to the focus lens position as the predetermined-position drive destination.

On the other hand, FIG. 11B illustrates an example to which this embodiment is applied, which solves the problem of FIG. 10A. In FIG. 11B, when the switching of the imaging direction is completed, although the focus lens has not reached the focus lens position as the predetermined-position drive destination by the predetermined-position drive, the predetermined-position drive is switched to the high-speed AF.

As described above, the purpose of the predetermined-position drive is to move the focus lens to a focus lens position as close as possible to the object captured in the imaging direction Y after the switching of the imaging direction is completed. Even if the focus lens has not yet reached the expected predetermined-position drive destination, the above purpose is achieved to some extent. As described above, AF can be used for the object captured in the imaging direction Y when the switching of the imaging direction is completed, so the AF may be used at that point, and the high-speed AF is used when the switching of the imaging direction is completed. This control can suppress unnecessary focus lens movement, and enables the focus lens to reach the in-focus position in a short time and the user to start imaging more quickly in a case where the switching of the imaging direction is executed.

In the flow of implementing the control illustrated in FIG. 11B, first, in S701 of FIG. 7, it is determined that the camera is in the imaging-direction changing state. Thereafter, it is determined in S702 that the camera is not in the predetermined-position drive completion state, it is determined in S704 that the focus lens has not reached the focus drive destination by the predetermined-position drive, and the focus lens is controlled to be driven to the focus drive destination for the predetermined-position drive in S706. After the predetermined-position drive is performed, in FIG. 11B, no determination is made in S704 as to whether or not the focus lens has reached the focus drive destination by the predetermined-position drive, the camera is in the imaging-direction change completion state in S509 of FIG. 5, and it is determined in S701 of FIG. 7 that the camera is not in the imaging-direction changing state.

Thereafter, it is determined in S707 that the camera is in the imaging-direction change completion state, the camera is set to the imaging-direction non-change state in S708, and the high-speed AF processing is executed in S709. Thereafter, unless the camera is set to the imaging-direction changing state again in S508 of FIG. 5, the camera is set to the imaging-direction non-change state in S503. Therefore, after the determinations of S701 and S707 of FIG. 7, in a case where the high-speed AF processing is being performed in S710, the high-speed AF processing is performed in S709. In a case where the high-speed AF processing is completed in S710, the flow proceeds to continuous AF processing in S711, and as described above, for recording during moving image capturing, unnecessary focusing is suppressed or focusing is performed at a speed that is not too high.

As described above, in this embodiment, in the function of switching the imaging direction by pivoting the axis of the gimbal, the focus lens is controlled to be driven to a predetermined position, as a trigger of the switching start of the imaging direction. The focus lens drive destination when the focus lens is driven to the predetermined position is determined based on an object distance which is likely to be imaged after the imaging direction is switched. By the predetermined-position drive, the focus lens is previously driven to a focus lens position that is assumed to be likely to be imaged after the imaging direction is switched, during switching of the imaging direction. Thereafter, when the switching of the imaging direction is completed, the object after the switching of the imaging direction is captured, and AF is ready, a control to execute the AF drive is performed.

In this embodiment, high-speed AF may be performed just after the switching of the imaging direction is completed, so as to quickly achieve the in-focus state. Depending on the pivoting speed of the gimbal axis, the drivable speed of the focus lens, and the length of the stroke over which the focus lens is to be driven by the predetermined-position drive, the predetermined-position drive may not be completed before the switching of the imaging direction is completed. In that case, when the switching of the imaging direction is completed, a control is made to stop the predetermined-position drive and to start AF. Due to this control, when the imaging direction switching function is executed, the focus lens can more quickly reach the in-focus position after the imaging direction is switched, and the user can more quickly start imaging.

Second Embodiment

A description will now be given of a second embodiment according to the present disclosure. A description of a configuration similar to that of the first embodiment will be omitted.

Configuration of Image Pickup Apparatus

Figure 12:
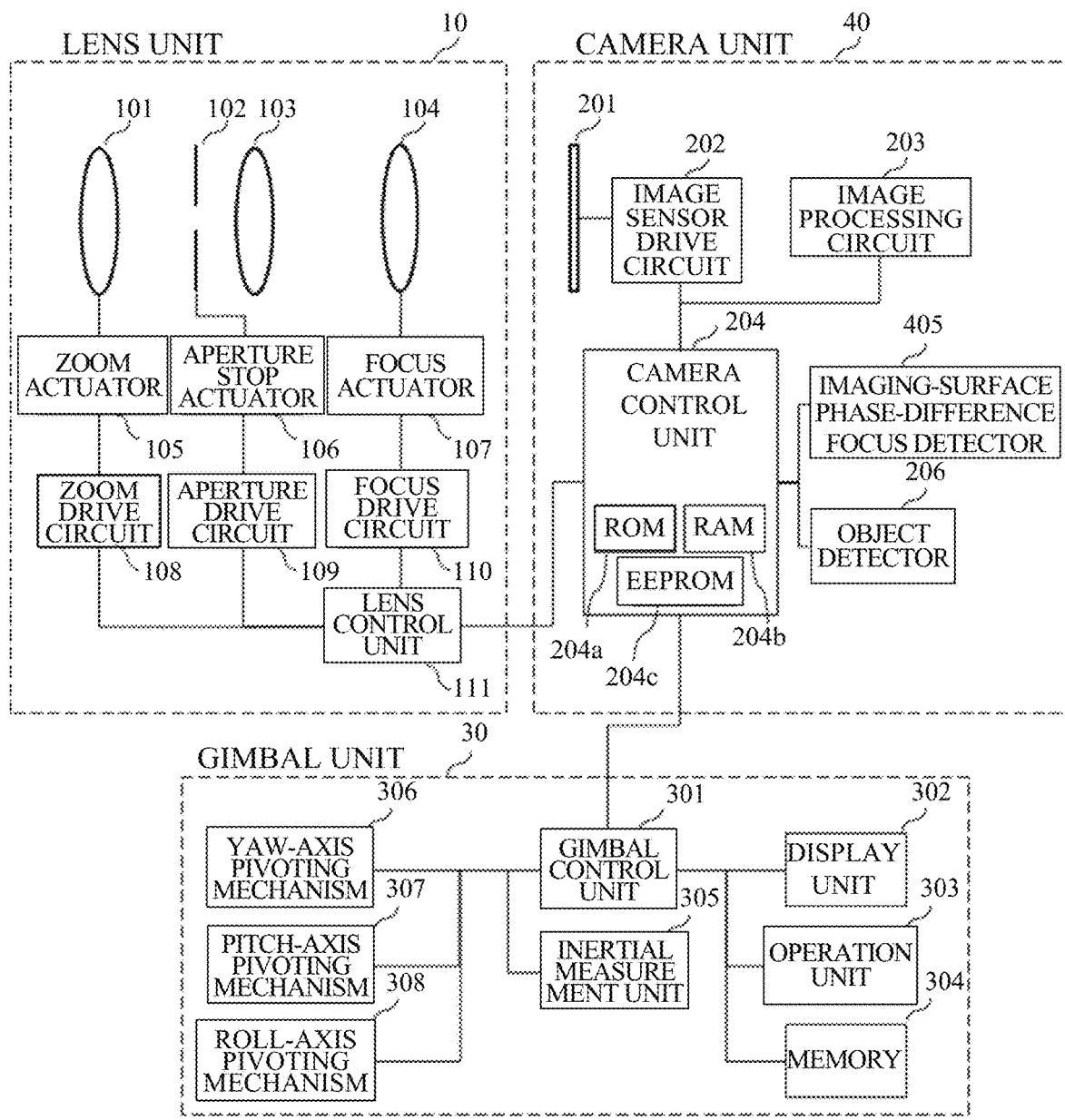
FIG. 12 is a block diagram of an image pickup apparatus according to the second embodiment.

FIG. 12 is a block diagram illustrating an example functional configuration of a digital camera as an example of an image pickup apparatus according to this embodiment. The lens unit 10 and its internal configuration in FIG. 12 are similar to the lens unit 10 and its internal configuration in FIG. 1, and thus a detailed description thereof will be omitted. The gimbal unit 30 and its internal configuration in FIG. 12 are similar to the gimbal unit 30 and its internal configuration in FIG. 1, and thus a detailed description thereof will be omitted. Reference numerals 204, 204a, 204b, 204c, and 206 of the camera unit 40 in FIG. 12 are similar to reference numerals 204, 204a, 204b, 204c, and 206 of the camera unit 20 in FIG. 1, respectively, so a detailed description thereof will be omitted.

The image sensor 201 in this embodiment illustrated in FIG. 12 has a pupil dividing function and can perform a phase-difference AF using image data. The image sensor drive circuit 202 performs an A/D conversion and other processing on data for the phase-difference AF, in addition to the operations of the image sensor drive circuit 202 in FIG. 1. The image processing circuit 203 generates data for the phase-difference AF, in addition to the operation of the image processing circuit 203 in FIG. 1. The camera unit 40 in FIG. 12 has an imaging-surface phase-difference focus detector 405, instead of the contrast focus detector 205 in FIG. 1.

The imaging-surface phase-difference focus detector 405 performs focus detection processing by a phase-difference detecting method using focus detection data obtained by the image processing circuit 203. More specifically, the image processing circuit 203 generates, as the focus detection data, image data for each pair formed by light beams passing through two pairs of pupil areas. The imaging-surface phase-difference focus detector 405 detects a focus shift amount based on a shift amount between each pair of image data. In this way, the imaging-surface phase-difference focus detector 405 according to this embodiment performs a phase-difference AF (imaging-surface phase-difference AF) based on an output of the image sensor 201 without using a dedicated AF sensor.

Details of Imaging-Surface Phase-Difference Focus Detector 405

Figure 13A:
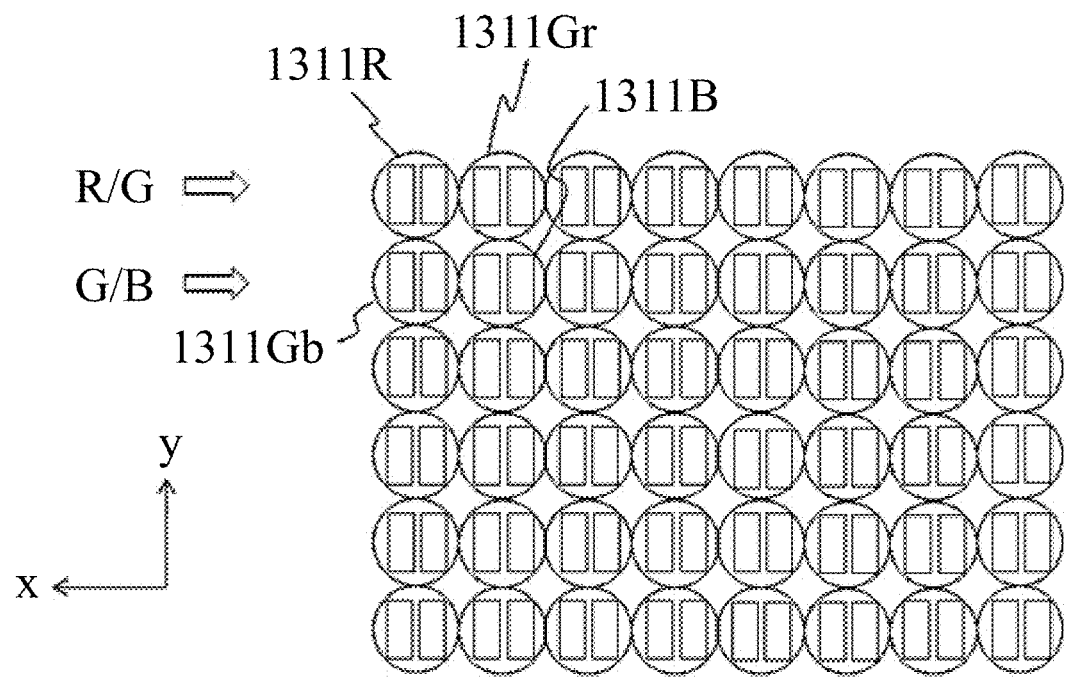
FIGS. 13A and 13B are plan views of light-receiving pixels according to the second embodiment viewed from a lens unit side.

A detailed description will be given of the operation of the imaging-surface phase-difference focus detector 405. FIG. 13A illustrates an imaging pixel array of the image sensor 201 in this embodiment, and illustrates a range of six vertical rows (Y direction) and eight horizontal columns (X direction) of a two-dimensional C-MOS area sensor, viewed from the lens unit 10 side. The image sensor 201 includes color filters in a Bayer array, with red (R) and green (G) color filters arranged alternately from left to right in odd-numbered rows of pixels, and green (G) and blue (B) color filters arranged alternately from left to right in even-numbered rows of pixels.

Figure 13B:
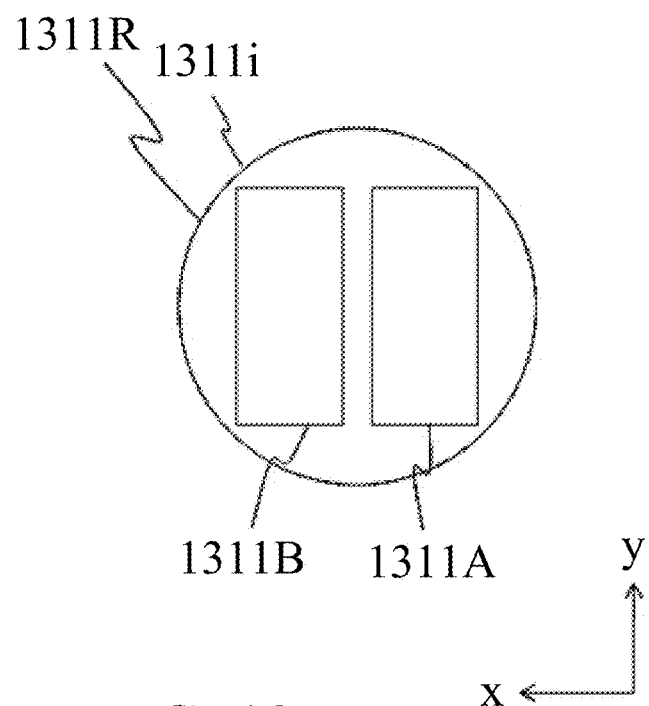

A pixel 1311R will be described with reference to FIG. 13B. A circle represents an on-chip microlens 1311i, and a plurality of rectangles disposed inside the on-chip microlens are photoelectric converters 1311A and 1311B. A similar configuration is used for a pixel 1311Gr, a pixel 1311Gb, and a pixel 1311B.

The image sensor 201 according to this embodiment has pixels (1311R, 1311Gr, 1311Gb, and 1311B) in which the photoelectric converter of the imaging pixel is divided into two in the X direction. A photoelectric conversion signal in the individual photoelectric converter can be used as data for phase-difference AF, or can be used to generate a parallax image which form a three-dimensional image. The sum of the photoelectric conversion signals can be used as normal image data.

A description will now be given of a pixel signal in the phase-difference AF. In this embodiment, the microlens 1311i in FIG. 13B and the divided photoelectric converters 1311A and 1311B perform a pupil division of a light beam emitted from an imaging optical system. The photoelectric converters 1311A and 1311B in FIG. 13B are used as a pair. Thereby, the focus detection can be performed based on an image shift amount (phase difference) in the X direction.

A description will be given of the phase-difference AF by the focus detection based on the image shift amount in the X direction. In FIG. 13B, signals from the photoelectric converters 1311A arranged in the plurality of pixels 1311R within a predetermined range arranged in the same pixel row are used as an A image for AF. Signals from the photoelectric converters 1311B are used as a B image for AF. The outputs of the photoelectric converters 1311A and 1311B use a pseudo luminance (Y) signal calculated by summing up the outputs of green, red, blue, and green included in the unit array of the color filter. However, the A and B images for AF may be organized for each of the colors of red, blue, and green. Detecting a relative image shift amount between the pair of image signals, which are the A image and the B image for AF generated in this way, through a correlation calculation can detect prediction that is a correlation degree between the pair of image signals. The camera control unit 204 can detect a defocus amount of a predetermined area by multiplying the prediction by a conversion coefficient. The sum of the outputs of the photoelectric converters 1311A and 1311B forms one pixel (output pixel) of an output image.

Figure 14:
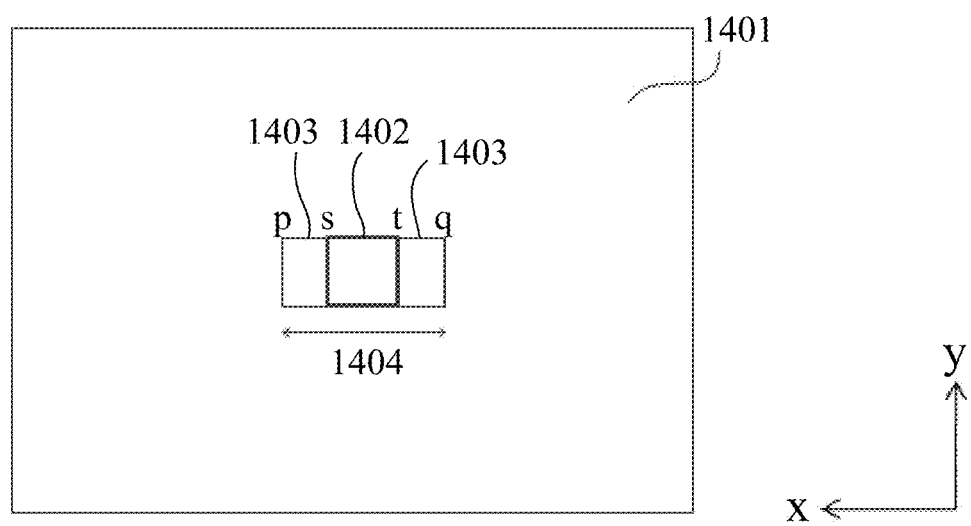
FIG. 14 explains an AF area for focus detection processing based on a phase difference according to the second embodiment.

A detailed description of the focus detection processing. FIG. 14 illustrates an example of an AF area 1402 on a pixel array 1401 of the image sensor 201 in this embodiment in the focus detection processing.

Shift areas 1403 on both sides of the AF area 1402 are areas for the correlation calculation. Therefore, an area 1404 which is a combination of the AF area 1402 and the shift areas 1403 is a pixel area for the correlation calculation. In FIG. 14, p, q, s, and t each represent coordinates in the X direction, with p and q representing the X coordinates of the start and end points of the pixel area 1404, and s and t representing the X coordinates of the start and end points of the AF area 1402.

Figure 15A:
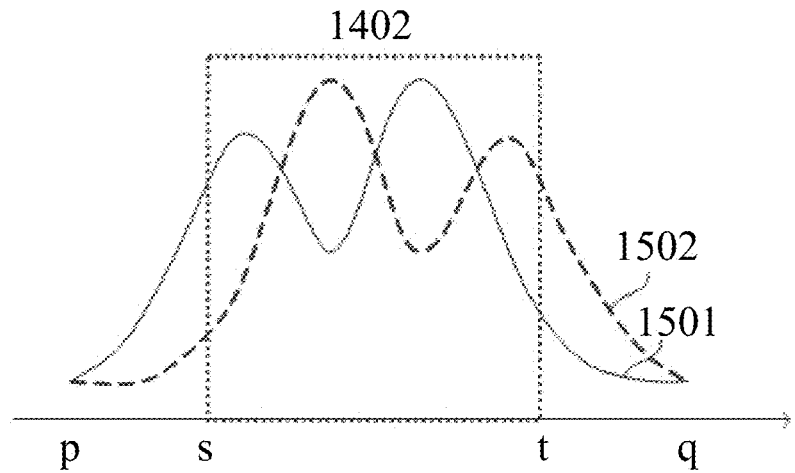
FIGS. 15A to 15C illustrate a pair of image signals obtained from the AF area illustrated in FIG. 14.
Figure 15B:
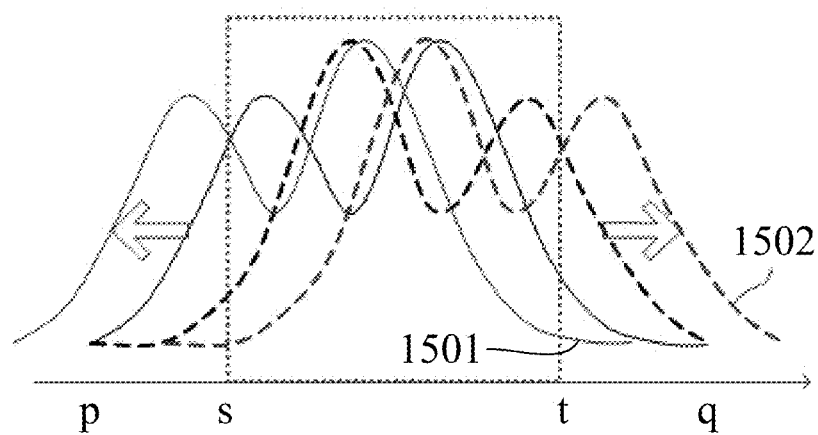
Figure 15C:
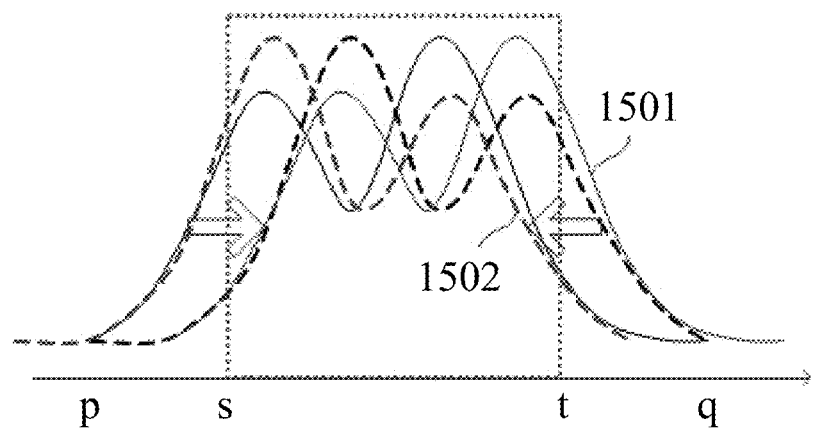

FIGS. 15A to 15C illustrate examples of a pair of image signals for AF acquired from the plurality of pixels included in the AF area 1402 illustrated in FIG. 14. A solid line 1501 indicates one A image for AF, and a dashed line 1502 indicates one B image for AF. FIG. 15A illustrates the A and B images for AF before the shift, and FIGS. 15B and 15C illustrate the A and B images for AF shifted in the positive and negative directions, respectively, from the state in FIG. 15A. In calculating the correlation amount between the pair of the A image 1501 and B image 1502 for AF, both of the A image 1501 and B image 1502 are shifted by one bit in an arrow direction.

Figure 16A:
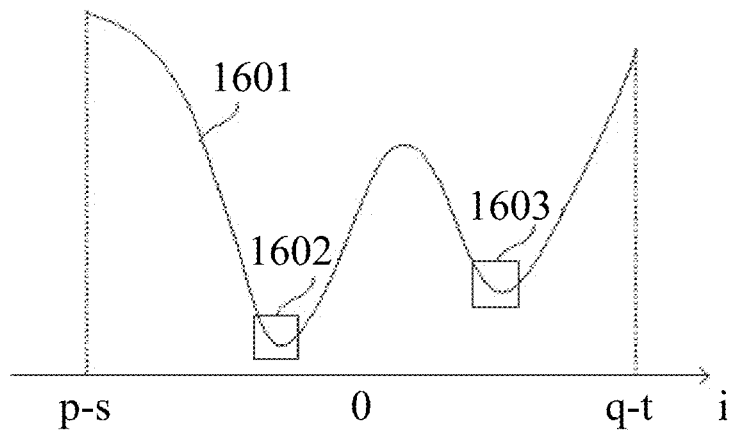
FIGS. 16A and 16B illustrate a relationship between a shift amount and a correlation amount of the pair of image signals illustrated in FIGS. 15A to 15C.

A description will now be given of a method for calculating the correlation amount. First, as illustrated in FIGS. 15B and 15C, the sum of absolute values of differences between the A image 1501 for AF and the B image 1502 for AF, respectively, is calculated by shifting the A image 1501 for AF and the B image 1502 for AF by one bit each. The correlation amount COR can be calculated by the following equation (1):

$$COR[i] = \sum_{k=x}^{y} |A[k+i] - B[k-i]| \qquad (1)$$

$$\{(p-s) < i < (q-t)\}$$

where i is a shift amount, p-s is a maximum shift amount in the negative direction, q-t is a maximum shift amount in the positive direction, x is a start coordinate of the AF area 1402, and y is an end coordinate of the AF area 1402, FIG. 16A illustrates an example relationship between the shift amount and the correlation amount COR. In FIG. 16A, the horizontal axis indicates the shift amount, and the vertical axis indicates the correlation amount COR. Among regions 1602 and 1603 near the extremes in the correlation amount 1601 which changes with the shift amount, the coincidence degree between the pair of A and B images for AF becomes maximum at a shift amount corresponding to a smaller correlation amount.

A description will now be given of a method for calculating the correlation change amount. A difference in the correlation amount for every shift in the waveform of the correlation amount 1601 illustrated in FIG. 16A is calculated as a correlation change amount. The correlation change amount ΔCOR can be calculated by the following equation (2):

$$\Delta COR[i] = COR[i-1] - COR[i+1] \quad (2)$$

$$\{(p-s+1) < i < (q-t-1)\}$$

where i is a shift amount, p-s is a maximum shift amount in the negative direction, and q-t is a maximum shift amount in the positive direction.

Figure 17A:
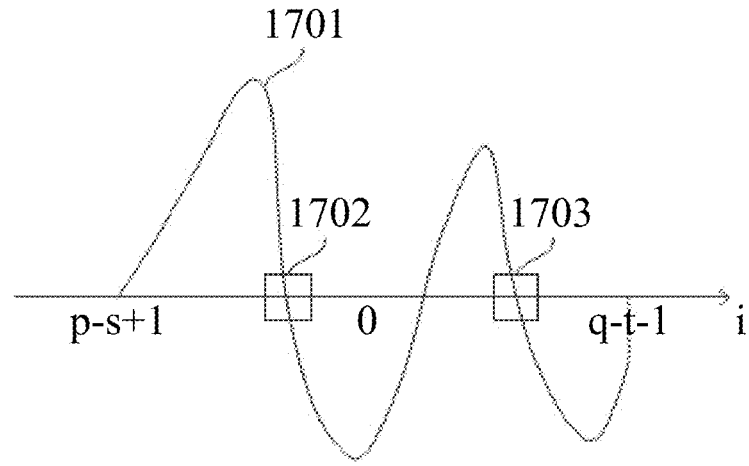
FIGS. 17A and 17B illustrate a relationship between a shift amount and a correlation change amount of the pair of image signals illustrated in FIGS. 15A to 15C.

FIG. 17A illustrates an example of a relationship between the shift amount and the correlation change amount ΔCOR. In FIG. 17A, the horizontal axis indicates the shift amount, and the vertical axis indicates the correlation change amount ΔCOR. The correlation change amount 1701 changes with the shift amount and its sign changes from positive to negative at portions 1702 and 1703. The state where the correlation change amount becomes 0 is called a zero cross point, and the coincidence degree between the pair of A and B images for AF becomes highest. Therefore, the shift amount that gives the zero cross is an image shift amount.

Figure 17B:
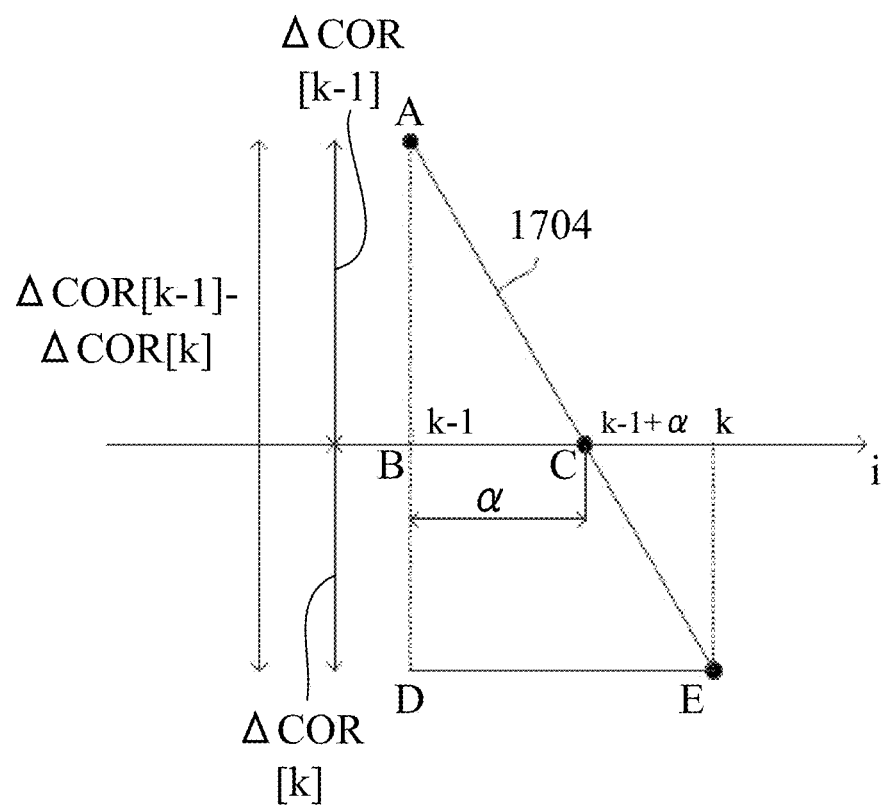

FIG. 17B illustrates an enlarged view of the portion 1702 in FIG. 17A. Reference numeral 1704 denotes a part of the correlation change amount 1701. A method for calculating an image shift amount will be described with reference to FIG. 17B.

The shift amount (k−1+α) that gives the zero cross is divided into an integer part β (=k−1) and a decimal part α. The decimal part α can be calculated from a similarity relationship between triangles ABC and ADE in FIG. 17B using the following equation (3):

$$AB:AD = BC:DE \quad (3)$$

$$\Delta COR[k-1]:\Delta COR[k-1] - \Delta COR[k] = \alpha:k - (k-1)$$

$$\alpha = \frac{\Delta COR[k-1]}{\Delta COR[k-1] - \Delta COR[k]}$$

The integer part β can be calculated from FIG. 17B using the following equation (4):

$$\beta = k - 1 \quad (4)$$

The image shift amount, that is, the prediction which is a correlation degree between the pair of image signals, can be detected from the sum of α and B.

As illustrated in FIG. 17A, in a case where there are a plurality of zero cross points of the correlation change ΔCOR, one with greater steepness of change in the correlation change ΔCOR around it is a first zero cross point. This steepness is an indicator of the ease of AF, and a higher value indicates a point at which it is easier to perform AF with good accuracy. The steepness maxder can be calculated by the following equation (5):

$$maxder = |\Delta COR[k-1]| + |\Delta COR[k]| \quad (5)$$

Thus, in this embodiment, in a case where there are a plurality of zero cross points in the correlation change amount, the first zero cross point is determined based on the steepness of the zero crossing, and the shift amount that gives the first zero cross point is set as the prediction.

A description will now be given of a method for calculating the reliability of an image shift amount. The reliability of the image shift amount can be defined by the coincidence degree (two-image coincidence degree) fnclvl between the pair of A and B images for AF and the steepness of the correlation change amount described above. The two-image coincidence degree is an index which indicates the accuracy of the image shift amount, and in the correlation calculating method in this embodiment, the smaller the value is, the better the accuracy is.

Figure 16B:
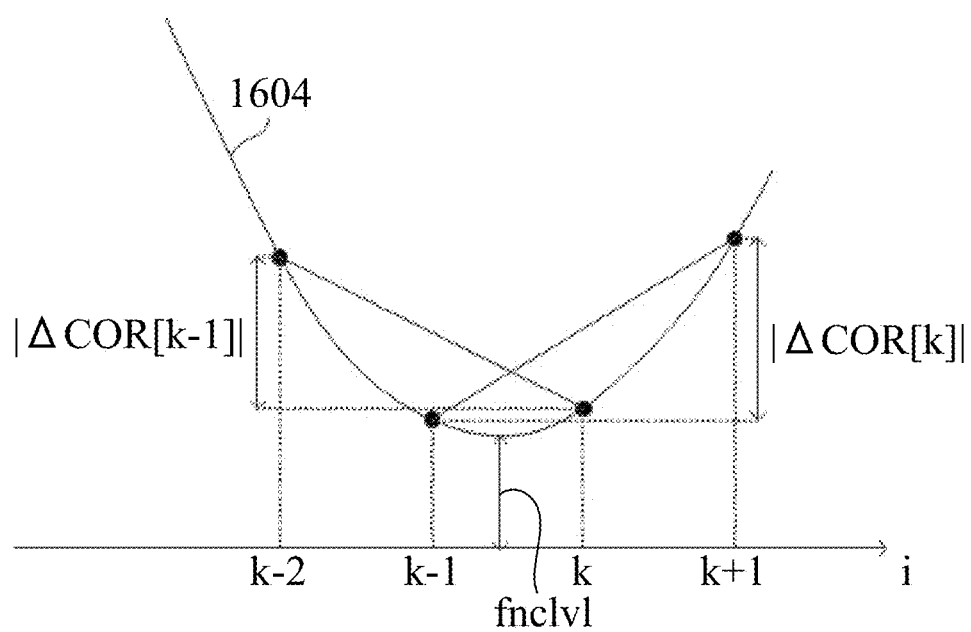

FIG. 16B is an enlarged view of the portion 1602 in FIG. 16A, and reference numeral 1604 denotes a portion of the correlation amount 1601. The two-image coincidence degree fnclvl can be calculated by the following equation (6):

$$\begin{aligned} &\text{(i) when } |\Delta COR[k-1]| \times 2 \leq maxder, \\ &fnclvl = COR[k-1] + \Delta COR[k-1]/4 \\ &\text{(ii) when } |\Delta COR[k-1]| \times 2 > maxder, \\ &fnclvl = COR[k] - \Delta COR[k]/4 \end{aligned} \quad (6)$$

Details of Various Processing Performed by Camera Unit 40

Figure 18:
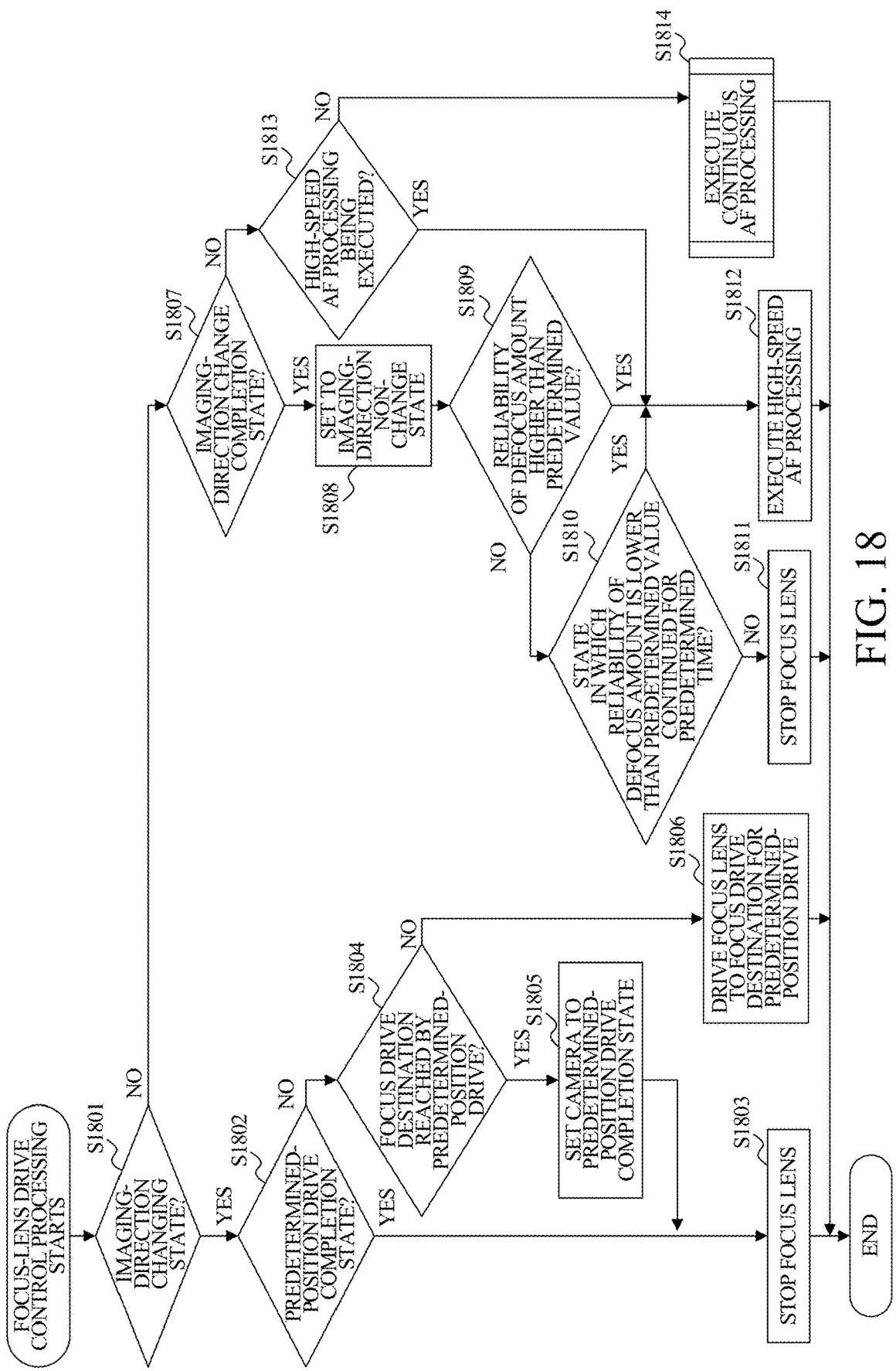
FIG. 18 is a flowchart illustrating focus-lens drive control processing according to the second embodiment.

In this embodiment, the focus-lens drive control processing in S406 in FIG. 4 implements processing of a flowchart illustrated in FIG. 18. FIG. 18 is the flowchart illustrating the focus-lens drive control processing. The processing from S1801 to S1808 and from S1812 to S1814 in FIG. 18 is similar to the processing from S701 to S708 and from S709 to S711 in FIG. 7, and thus a detailed description thereof will be omitted.

In S1809 in FIG. 18, the camera control unit 204 determines whether or not the reliability of the defocus amount is higher than a predetermined value. In a case where the reliability of the defocus amount is higher than the predetermined reliability, the flow proceeds to S1812, and high-speed AF processing is executed similarly to the processing of S709 in FIG. 7. On the other hand, in a case where the reliability of the defocus amount is not higher than the predetermined reliability, the flow proceeds to S1810. The reliability threshold (predetermined reliability) of the defocus amount set in S1809 may be set to the maximum value in a reliability range in which not only the calculated defocus amount but also the defocus direction is unreliable. The reliability of the defocus amount may be determined using both the two-image coincidence degree and the steepness of the image shift amount, or may be determined using only one of them. Another index such as a signal level may be used.

In S1810, the camera control unit 204 determines whether or not a state in which the reliability of the defocus amount is lower than the predetermined value has continued for a predetermined time. In a case where the state in which the reliability of the defocus amount is lower than the predetermined value has not continued for the predetermined time, the flow proceeds to S1811. In a case where the predetermined time has elapsed, the flow proceeds to S1812, where high-speed AF processing is executed. In S1811, the camera control unit 204 performs a control to stop the focus lens similarly to S1803, and ends the focus-lens drive control processing.

Unlike the configuration for the contrast focus detection described in the first embodiment, this embodiment can perform the imaging-surface phase-difference detection. Therefore, for AF, the in-focus position and direction can be determined even though the focus lens is not driven to search for increasing and decreasing directions of the integral evaluation value. On the other hand, in a case where the reliability of the defocus amount is so low that even the defocus direction is unreliable, careless execution of the AF may result in unnecessary focus lens driving, and it may take a long time to achieve an in-focus state. The reliability of the defocus amount may be insufficient, for example, when a difference in luminance of the object is significant before and after the imaging direction is switched, and thus an object becomes too dark/too bright after the imaging direction is switched, or when the object significantly moves and image degradation is generated.

In such a case, in S1809, it is determined whether or not the reliability of the defocus amount is higher than the predetermined value, and the high-speed AF processing is not immediately performed in S1812, but after the determination in S1810, the focus lens is controlled to be temporarily stopped in S1811. Thereafter, when the reliability of the defocus amount is improved, for example, by adjusting imaging exposure or reducing the object blur, and high-speed AF processing is executed in S1812 after it is determined in S1809 that the reliability of the defocus amount is higher than the predetermined value. This control can suppress unnecessary movement of the focus lens.

It is determined in S1810 whether or not the state in which the reliability of the defocus amount is lower than the predetermined value continues for the predetermined time. In a case where the state in which the reliability of the defocus amount is lower than the predetermined value continues, it is conceivable, for example, that the focus lens drive destination for the predetermined-position drive shifts from the in-focus position for the object after the imaging direction is switched, and defocus occurs. Therefore, in a case where the state in which the reliability of the defocus amount is lower than the predetermined value continues for the predetermined time in S1810, high-speed AF processing is executed in S1812, and a control is performed to search for the in-focus position of the focus lens. A threshold of the predetermined time set in S1810 may depend on which of a case where high-speed AF processing is performed after the reliability of the defocus amount described above becomes sufficient, and a case where image degradation occurs and it becomes necessary to search for the in-focus position using high-speed AF processing is to be prioritized.

Figure 19:
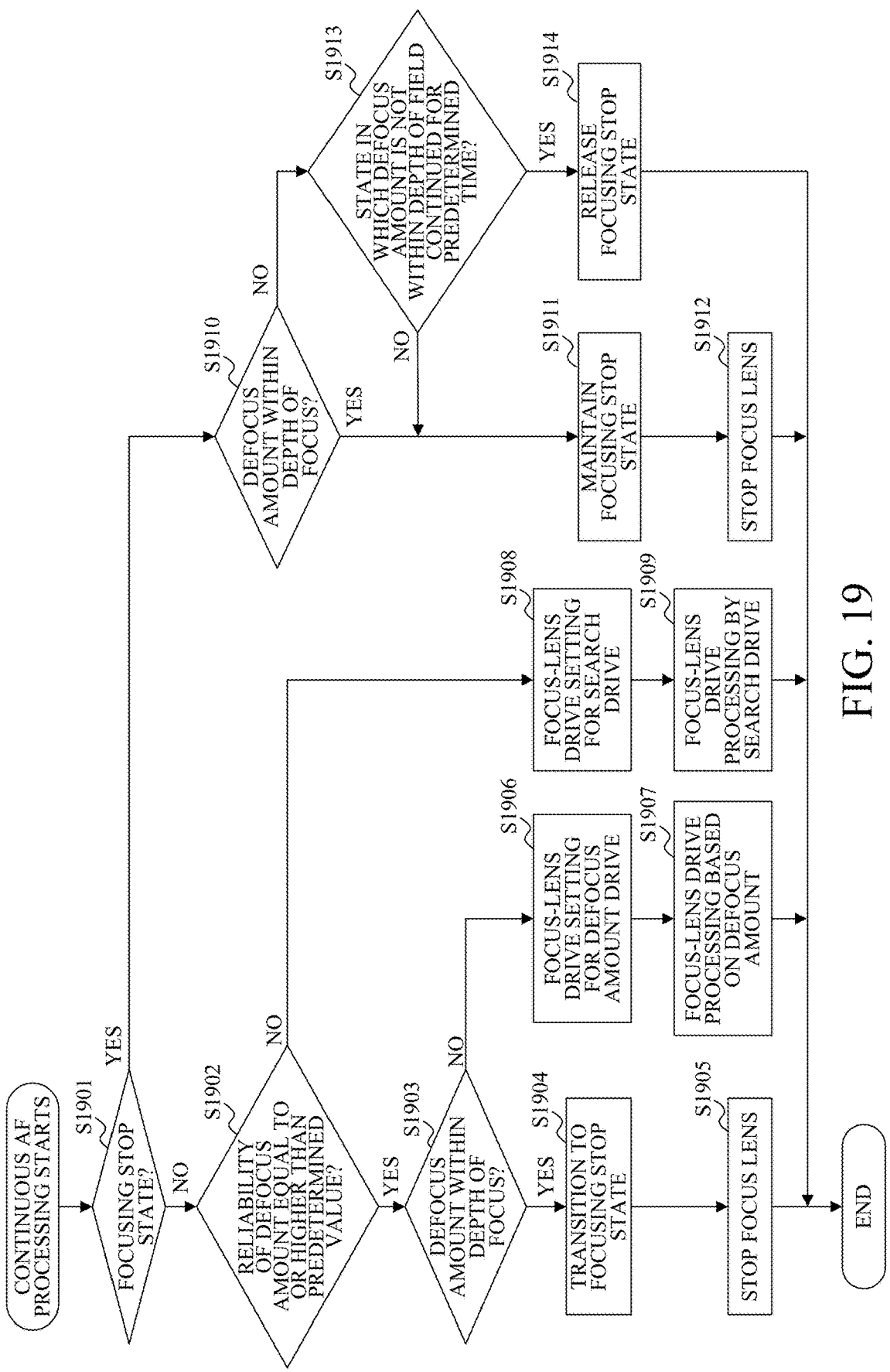
FIG. 19 is a flowchart illustrating continuous AF processing according to the second embodiment.

Referring now to FIG. 19, a description will be given of continuous AF processing performed by the camera control unit 204 in S1814 of FIG. 8. FIG. 19 is a flowchart illustrating the continuous AF processing. The processing of S1901, S1904, S1905, S1911, S1912, and S1914 in FIG. 19 is similar to the processing of S801, S803, S804, S807, S808, and S810 in FIG. 8, and a detailed description thereof will be omitted.

In S1902 in FIG. 19, the camera control unit 204 determines whether or not the reliability of the defocus amount is equal to or higher than a predetermined value. In a case where it is equal to or higher than the predetermined value, the flow proceeds to S1903, and in a case where it is not equal to or higher than the predetermined value, the flow proceeds to S1908. The reliability threshold (predetermined reliability) of the defocus amount set in S1902 may be set to the maximum value in a reliability range in which not only the calculated defocus amount but also the defocus direction is unreliable. The reliability of the defocus amount may be determined using both the two-image coincidence degree and the steepness of the image shift amount, or may be determined using only one of them. Another index such as a signal level may be used.

In S1902 in FIG. 19, the camera control unit 204 determines whether or not the reliability of the defocus amount is equal to or higher than a predetermined value. In a case where it is equal to or greater than the predetermined value, the flow proceeds to S1903, and in a case where it is not equal to or greater than the predetermined value, the flow proceeds to S1908. The reliability threshold of the defocus amount set in S1902 is preferably set as the predetermined reliability to the maximum value of a reliability range in which not only the calculated defocus amount but also the defocus direction is unreliable. The reliability of the defocus amount may be determined using both the two-image coincidence degree and the steepness of the image shift amount, or may be determined using only one of them. Also, other indices such as a signal level may be used.

In S1903, the camera control unit 204 determines whether or not the defocus amount is within a depth of focus. In a case where it is within the depth of focus, the flow proceeds to S1904. In a case where it is not within the depth of focus, the flow proceeds to S1906. In S1906, the camera control unit 204 determines that the in-focus state has not yet been obtained, and performs lens drive setting for driving the focus lens 104 based on the defocus amount. Then, the flow proceeds to S1907. In S1907, the camera control unit 204 sends a drive command for the focus lens 104 to the lens control unit 111 based on the defocus amount and lens drive setting information set in S1906, performs the focus lens drive, and ends the continuous AF processing.

In S1908, the camera control unit 204 cannot use the defocus amount to drive the focus lens 104 because the reliability of the defocus amount is low. Thus, the camera control unit 204 performs search drive to calculate a defocus amount while moving the focus lens 104 toward its movable end in order to detect a position of the focus lens 104 at which the defocus amount with high reliability can be obtained. First, the camera control unit 204 performs the lens drive setting for the search drive. The lens drive setting for the search drive includes settings for a drive speed of the focus lens 104, a direction in which the drive starts, and the like. In S1909, the camera control unit 204 sends a control command for the focus lens 104 to the lens control unit 111 based on the lens drive setting for the search drive set in S1908, performs the focus lens drive, and ends the continuous AF processing.

In S1910, the camera control unit 204 determines whether or not the defocus amount is within the depth of focus. In a case where it is within the depth of focus, the flow proceeds to S1911 and the focusing stop state is maintained. In a case where it is not within the depth of focus, the flow proceeds to S1913. In S1913, the camera control unit 204 determines whether or not a state in which the defocus amount is not within the depth of focus has continued for a predetermined time. If so, the flow proceeds to S1914 to release the focusing stop state. If not, the flow proceeds to S1911 to maintain the focusing stop state.

Third Embodiment

A description will now be given of a third embodiment according to the present disclosure. A description of a configuration similar to that of the first embodiment will be omitted.

Details of Various Processing Performed by Camera Unit 20

Figure 20:
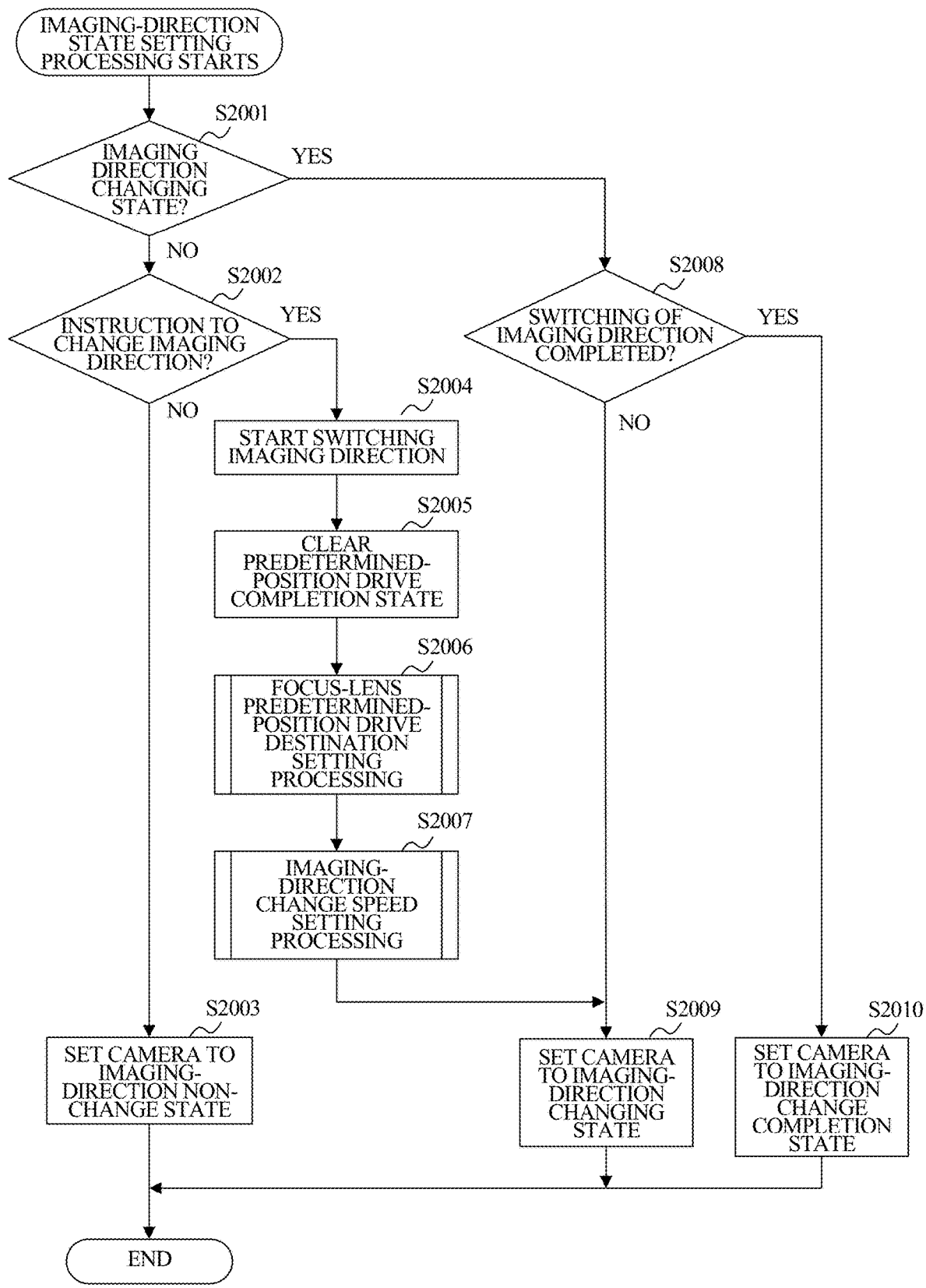
FIG. 20 is a flowchart illustrating the setting processing of the imaging direction state according to the third embodiment.

In this embodiment, the imaging-direction state setting processing in S403 of FIG. 4 follows a flowchart illustrated in FIG. 20. FIG. 20 is the flowchart illustrating the imaging-direction state setting processing. The processing from S2001 to S2006 and from S2008 to S2010 in FIG. 20 is similar to the processing from S501 to S506 and from S507 to S509 in FIG. 5, and a detailed description thereof will be omitted.

In S2007 in FIG. 20, the camera control unit 204 performs various processing when there is an instruction to switch the imaging direction in S2002, and then performs setting processing of an imaging-direction change speed. Then, the flow proceeds to S2009. The setting processing of the imaging-direction change speed will be described in detail later.

Figure 21:
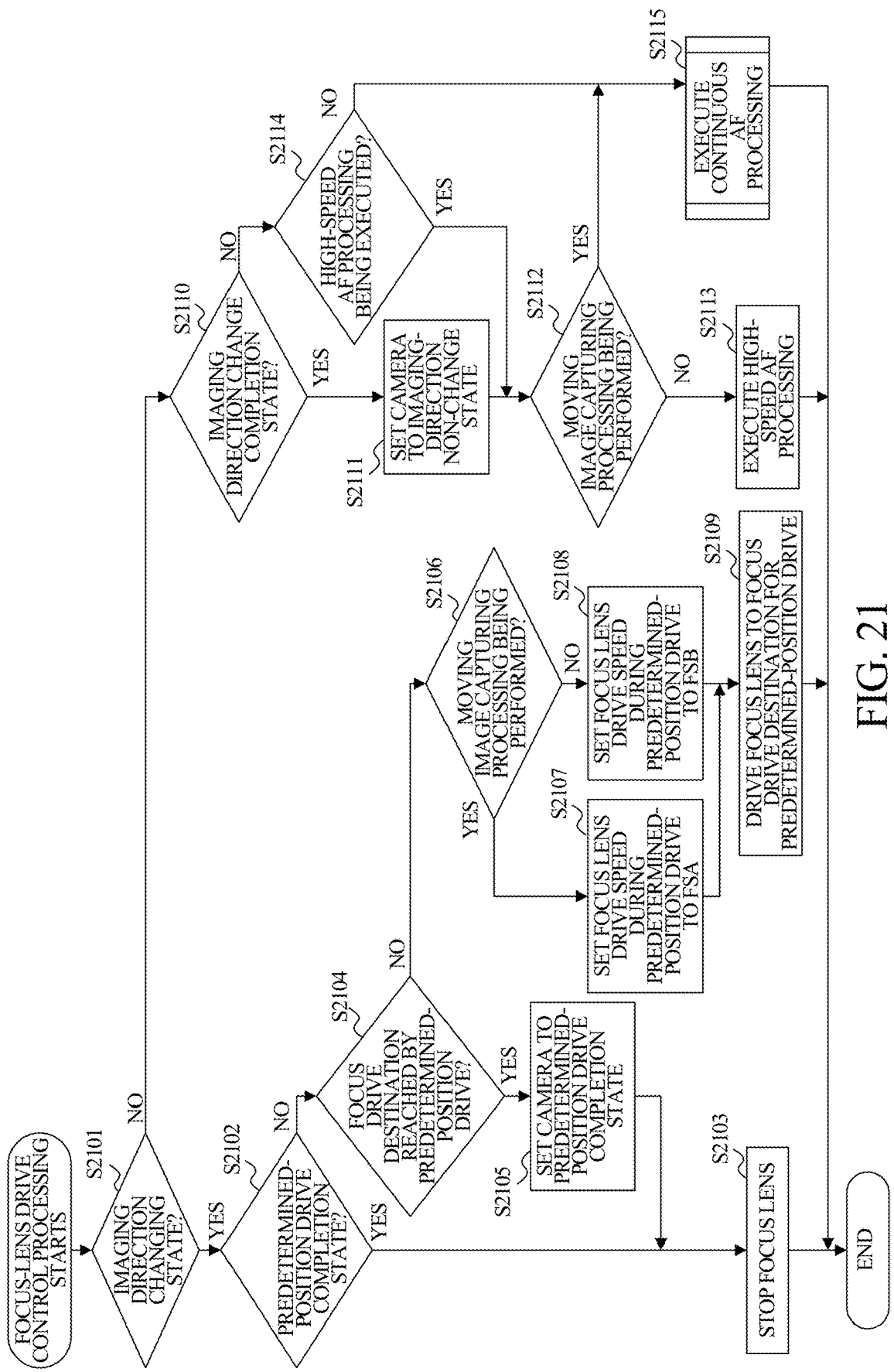
FIG. 21 is a flowchart illustrating focus-lens drive control processing according to the third embodiment.

Next, in this embodiment, the focus-lens drive control processing in S406 in FIG. 4 follows a flowchart illustrated in FIG. 21. FIG. 21 is the flowchart illustrating the focus-lens drive control processing. The processing from S2101 to S2105 and from S2109 to S2111 in FIG. 21 is similar to the processing from S701 to S705 and from S706 to S708 in FIG. 7, and a detailed description thereof will be omitted. Since the processing from S2113 to S2115 in FIG. 21 is similar to the processing from S709 to S711 in FIG. 7, a detailed description thereof will be omitted.

In S2106, after determining in S2104 that the focus drive by the predetermined-position drive is being performed, the camera control unit 204 determines whether or not moving image capturing processing is being performed. In a case where the moving image capturing processing is in progress, the flow proceeds to S2108, and in a case where the moving image capturing processing is not being performed, the flow proceeds to S2107. In S2107, the camera control unit 204 sets the focus lens drive speed during the predetermined-position drive to fsA, and the flow proceeds to S2109. In S2108, the camera control unit 204 sets the focus lens drive speed during the predetermined-position drive to fsB, and the flow proceeds to S2109.

Regarding the focus lens drive speed during the predetermined-position drive, fsA set in S2107 and fsB set in S2108 will be described in detail later, but fsA is set lower than fsB. That is, in a case where it is determined in S2106 that the moving image capturing processing is being performed, the focus lens drive speed during the predetermined-position drive is set to be lower. In S2112, the camera control unit 204 determines whether or not the moving image capturing processing is being performed, similarly to S2106. In a case where the moving image capturing processing is not being performed, the flow proceeds to S2113, and if the moving image capturing processing is being performed, the flow proceeds to S2115.

Figure 22A:
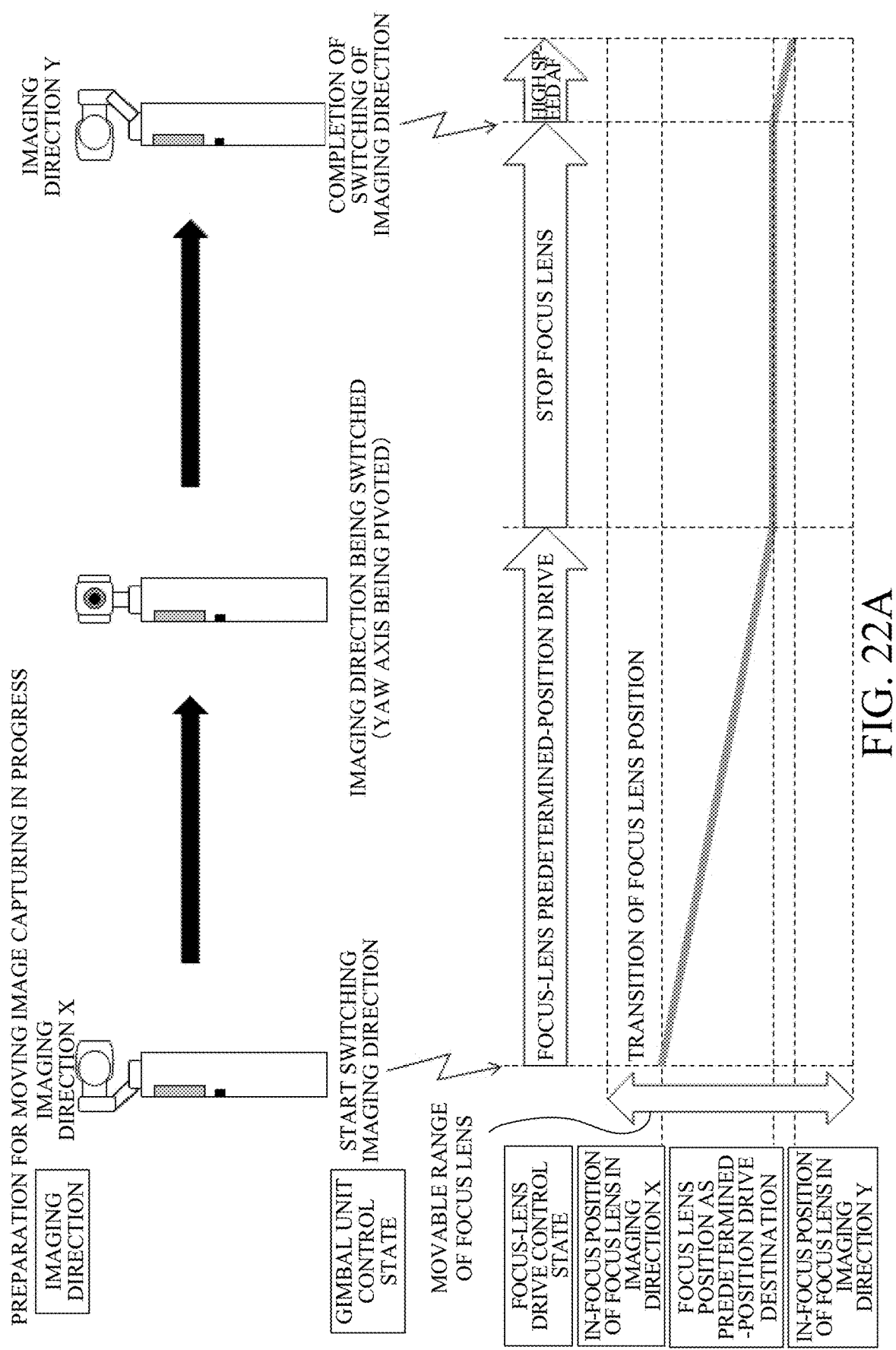
FIG. 22A illustrates time-series states when the imaging direction is changed according to the third embodiment.
Figure 22B:
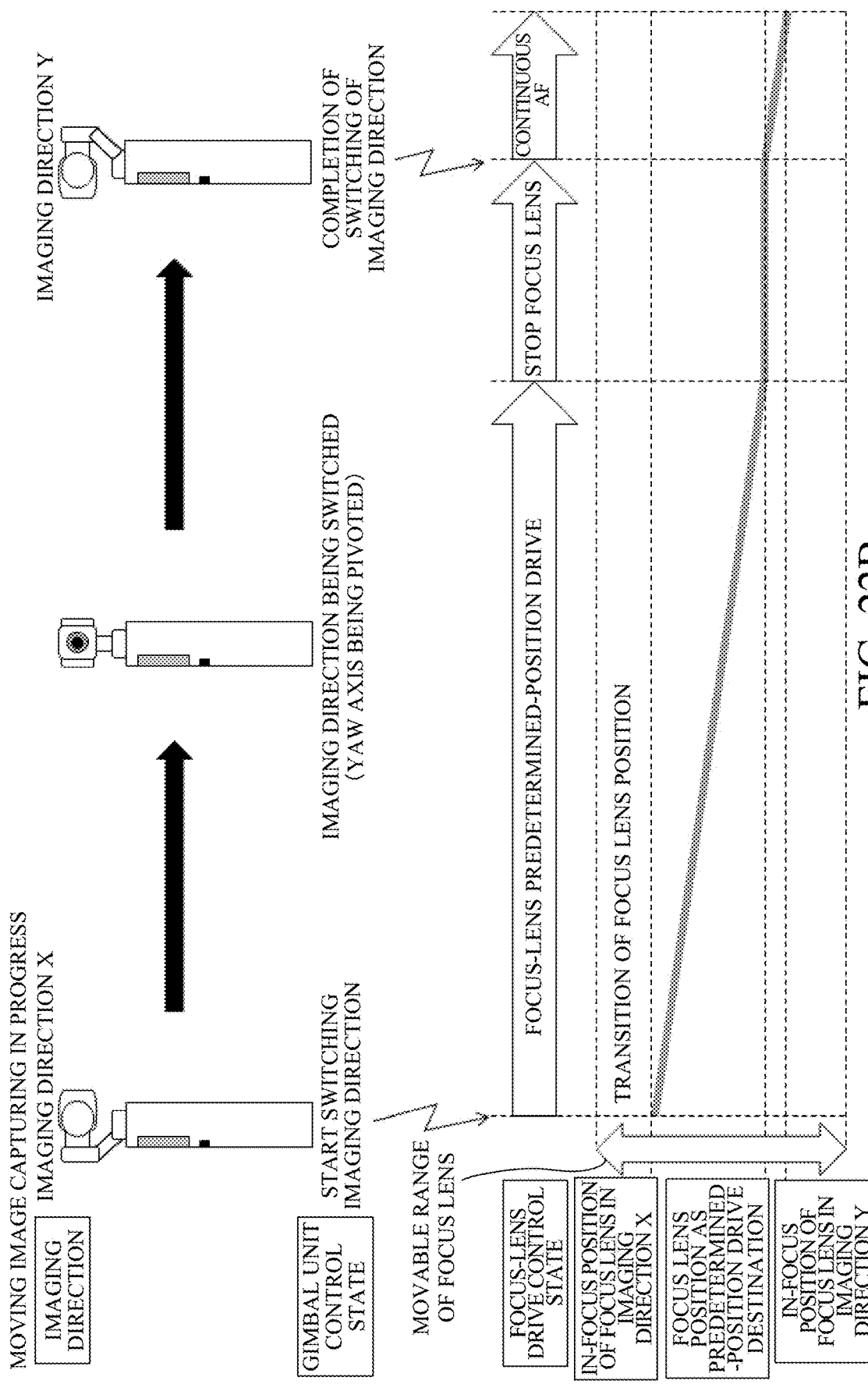
FIG. 22B illustrates time-series states when the imaging direction is changed according to the third embodiment.

FIGS. 22A and 22B illustrate time-series states when the imaging direction is switched in this embodiment. FIGS. 22A and 22B illustrate examples where a focus lens driving method is changed for each of the following situations based on the example in FIG. 10A: during preparation for moving image capturing in FIG. 22A, and during moving image capturing in FIG. 22B.

In FIG. 22A, during the preparation for the moving image capturing, after the determination in S2106, the focus lens drive speed during the predetermined-position drive is set to fsB in S2108. As described above, the focus lens drive speed fsB is higher than fsA. After it is determined in S2110 that the switching of the imaging direction has been completed, a control is performed to execute high-speed AF processing in S2113 via the determination in S2112. During the preparation for the moving image capturing, unlike during the moving image capturing, which will be described later, it is assumed that the state of the focus lens drive will not be recorded as a moving image (or video). Therefore, more importance is placed on achieving an in-focus state as quickly as possible, the focus lens drive speed during the predetermined-position drive is set higher, and the high-speed AF processing is also performed in the AF operation after the switching of the imaging direction is completed.

On the other hand, in FIG. 22B where the moving image capturing is being performed, after the determination in S2106, the focus lens drive speed during the predetermined-position drive is set to fsA in S2107. As described above, the focus lens drive speed fsA may be lower than fsB. After it is determined in S2110 that the switching of the imaging direction has been completed, a control is performed so that continuous AF processing is executed in S2115 after the determination in S2112. During the moving image capturing, it is assumed that the state of the focus lens drive will be recorded as a moving image. For example, in a case where the behavior of the focus lens is recorded, a moving image may not look good, if the focus lens being driven too fast, or the focus lens passing the in-focus position once and then returning to the focus position, or the like. In addition, the fast focus lens drive speed makes the focus lens drive noise louder, which may be recorded in a moving image. Therefore, a lower focus lens drive speed is set by emphasizing the drive quality of the focus lens rather than quick achieving an in-focus state. In addition, the AF operation after the switching of the imaging direction is completed is set to continuous AF processing that emphasizes the drive quality of the focus lens.

Figure 23:
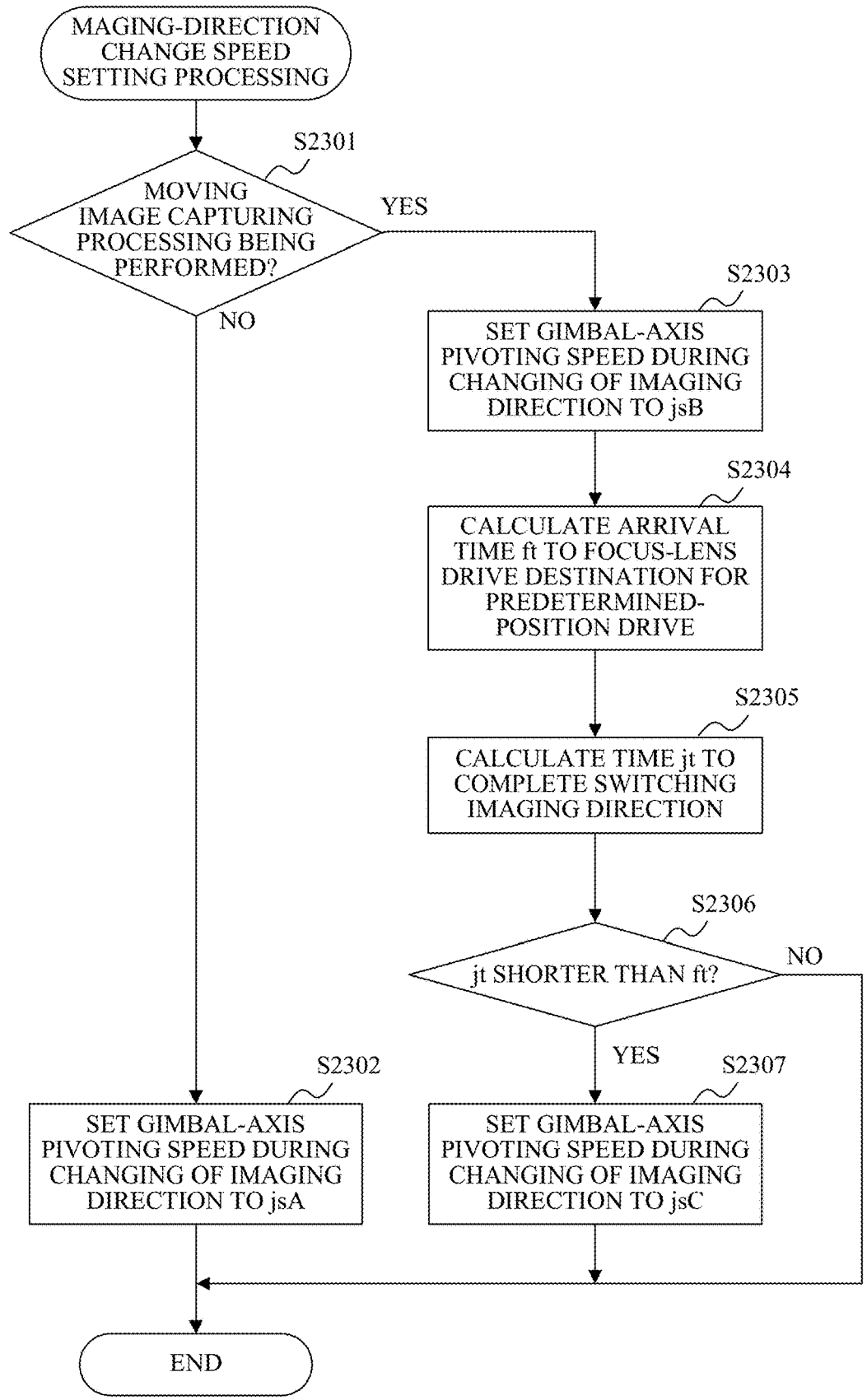
FIG. 23 is a flowchart illustrating setting processing of an imaging-direction change speed according to the third embodiment.

Referring now to FIG. 23, a description will be given of the setting processing of the imaging-direction change speed performed by the camera control unit 204 in S2007 in FIG. 20. FIG. 23 is a flowchart illustrating the setting processing of the imaging-direction change speed.

In S2301, the camera control unit 204 determines whether or not the moving image capturing processing is being performed. In a case where the moving image capturing processing is not being performed, the flow proceeds to S2301, and in a case where the moving image capturing processing is being performed, the flow proceeds to S2303.

In S2302, the camera control unit 204 sets, to the gimbal control unit 301, jsA as a pivoting speed of the gimbal axis when the imaging direction is switched. The gimbal control unit 301 sets the pivoting speed of the yaw-axis pivoting mechanism 306 in switching the imaging direction to jsA, and ends the imaging-direction change speed setting processing.

In S2303, the camera control unit 204 sets, to the gimbal control unit 301, jsB as a pivoting speed of the gimbal axis when the imaging direction is switched. The gimbal control unit 301 sets the pivoting speed of the yaw-axis pivoting mechanism 306 in switching the imaging direction to jsB, and the flow proceeds to S2304. In S2304, the camera control unit 204 calculates an arrival time ft to the focus lens drive destination for the predetermined-position drive, and the flow proceeds to S2305. In S2305, the camera control unit 204 calculates a time jt to complete the switching of the imaging direction, and the flow proceeds to S2306. At this time, jt is calculated based on the gimbal-axis pivoting speed jsB set in S2303.

In S2306, the camera control unit 204 determines whether or not jt is shorter than ft. In a case where jt is shorter than ft, this indicates that the switching of the imaging direction is completed earlier than the completion of the focus lens drive by the predetermined-position drive. In a case where jt is shorter than ft, the flow proceeds to S2307; otherwise, the gimbal-axis pivoting speed jsB set in S2303 is finalized and the imaging-direction change speed setting processing is terminated.

In S2307, the camera control unit 204 sets, to the gimbal control unit 301, jsC as a pivoting speed of the gimbal axis when the imaging direction is switched. The gimbal control unit 301 sets the pivoting speed of the yaw-axis pivoting mechanism 306 in switching the imaging direction to jsC, and ends the imaging-direction change speed setting processing. As described above, in the description of this embodiment, the imaging direction is basically switched by pivoting the yaw-axis pivoting mechanism 306, but the imaging direction may also be switched by pivoting the pitch-axis pivoting mechanism 307.

The gimbal-axis pivoting speed will be described in detail later, but in terms of the relationship between jsA and jsB, jsB is set to a speed lower than jsA. Based on ft calculated in S2304, jsC is controlled to determine the gimbal-axis pivoting speed so that the time to complete the switching of the imaging direction is equal to ft. In setting jsC in S2307, jsC is lower than jsB because the time jt to complete the switching of the imaging direction, calculated in S2305 based on the speed of jsB, is shorter than ft in S2306.

Figure 24A:
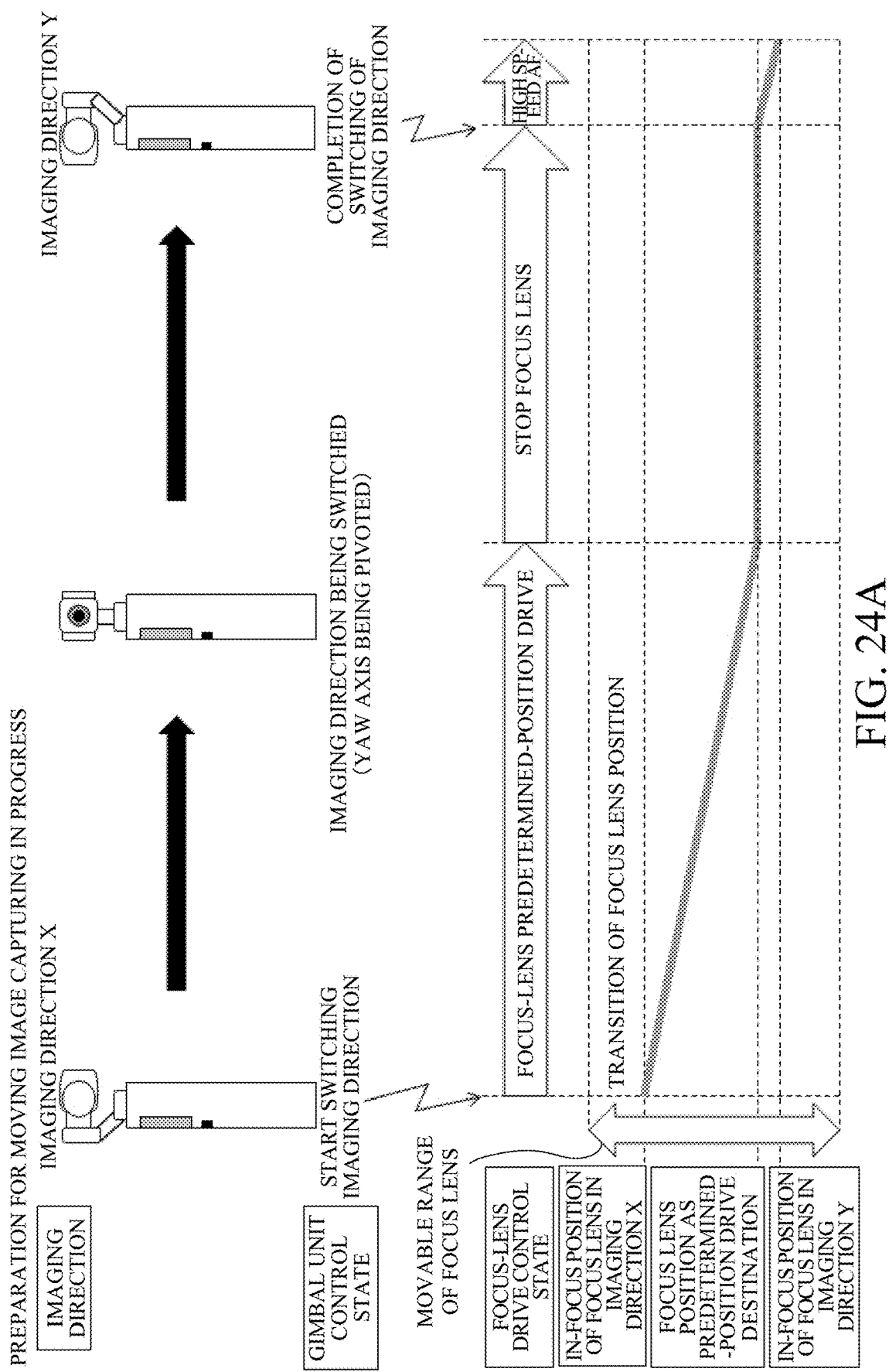
FIG. 24A illustrates time-series states when the imaging direction is changed according to the third embodiment.
Figure 24B:
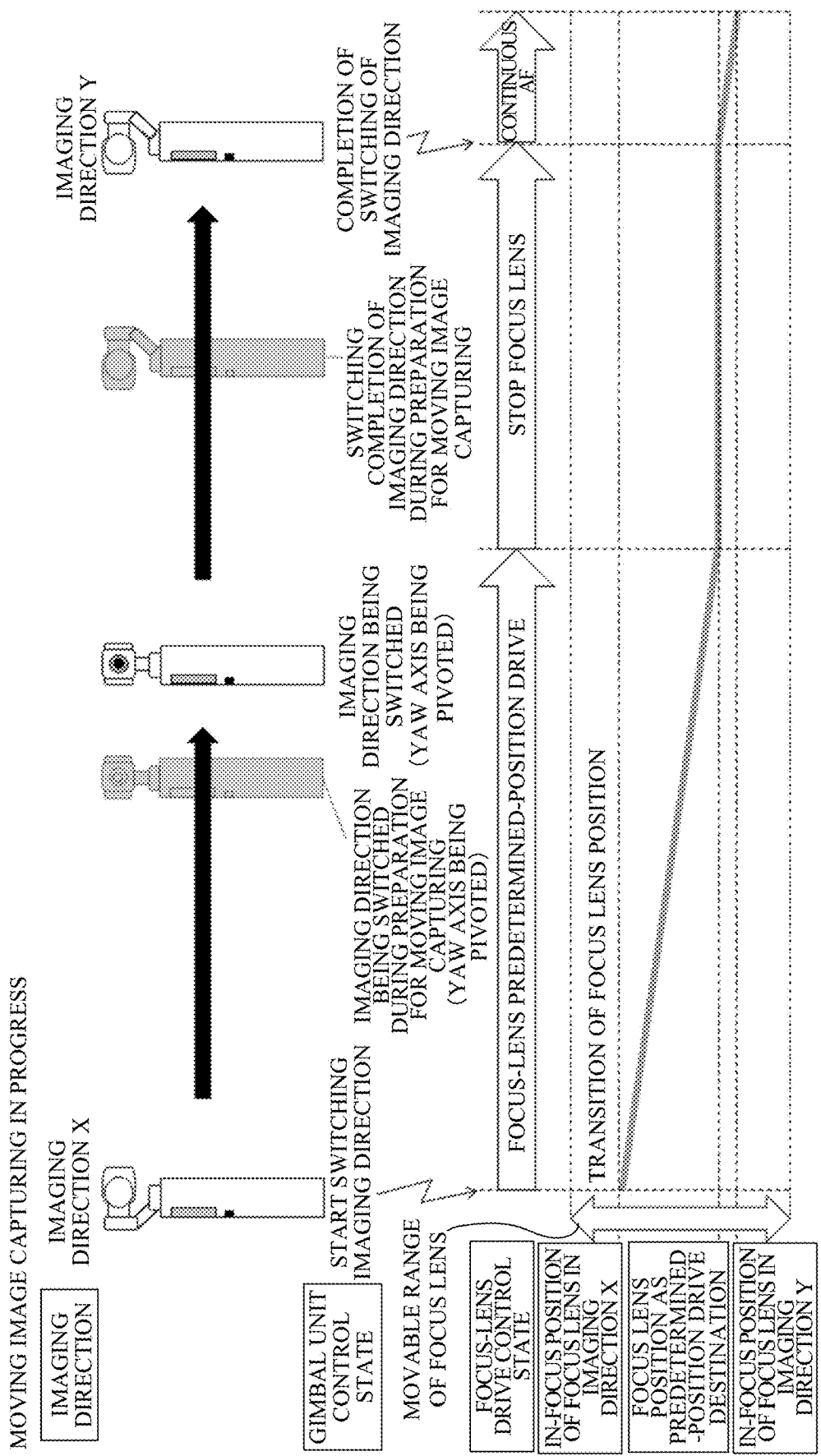
FIG. 24B illustrates time-series states when the imaging direction is changed according to the third embodiment.

FIGS. 24A and 24B illustrate time-series states when the imaging direction is switched in this embodiment. Similarly to FIGS. 22A and 22B, FIG. 24A illustrates an example during preparation for moving image capturing, and FIG. 24B illustrates an example during moving image capturing. However, unlike FIGS. 22A and 22B, FIGS. 24A and 24B changes the imaging-direction switching method.

In FIG. 24A, during the preparation for the moving image capturing, after the determination in S2301, the gimbal-axis pivoting speed is set to jsA in S2302. As described above, the gimbal-axis pivoting speed jsA is higher than jsB. During the preparation for the moving image capturing, unlike during the moving image capturing, which will be described later, it is assumed that the state of switching the imaging direction by pivoting the gimbal axis will not be recorded as a moving image (or video). Therefore, changing the imaging direction as quickly as possible is emphasized, and the gimbal-axis pivoting speed is set to be faster.

On the other hand, in FIG. 24B where the moving image capturing is being performed, after the determination in S2302, the gimbal-axis pivoting speed when the imaging direction is switched is set to jsB in S2303. As described above, the gimbal-axis pivoting speed jsB may be lower than the jsA. The example of FIG. 24B assumes a case where the focus-lens predetermined-position drive is completed earlier than the switching completion of the imaging direction, that is, the condition in S2306 is not met and the speed jsB is set. As mentioned above, during the moving image capturing, it is assumed that the state of switching the imaging direction by pivoting the gimbal axis is recorded as an moving image. In a case where pivoting of the gimbal axis is too fast in switching the imaging direction, the moving image may not look good. In addition, the fast pivoting speed of the gimbal axis makes the driving noise of the gimbal axis louder, which may be recorded in a moving image. Therefore, rather than quickly switching the imaging direction, a lower gimbal-axis pivoting speed is set with emphasis on the quality of changing an angle of view in switching the imaging direction and on suppressing the driving noise.

Figure 25A:
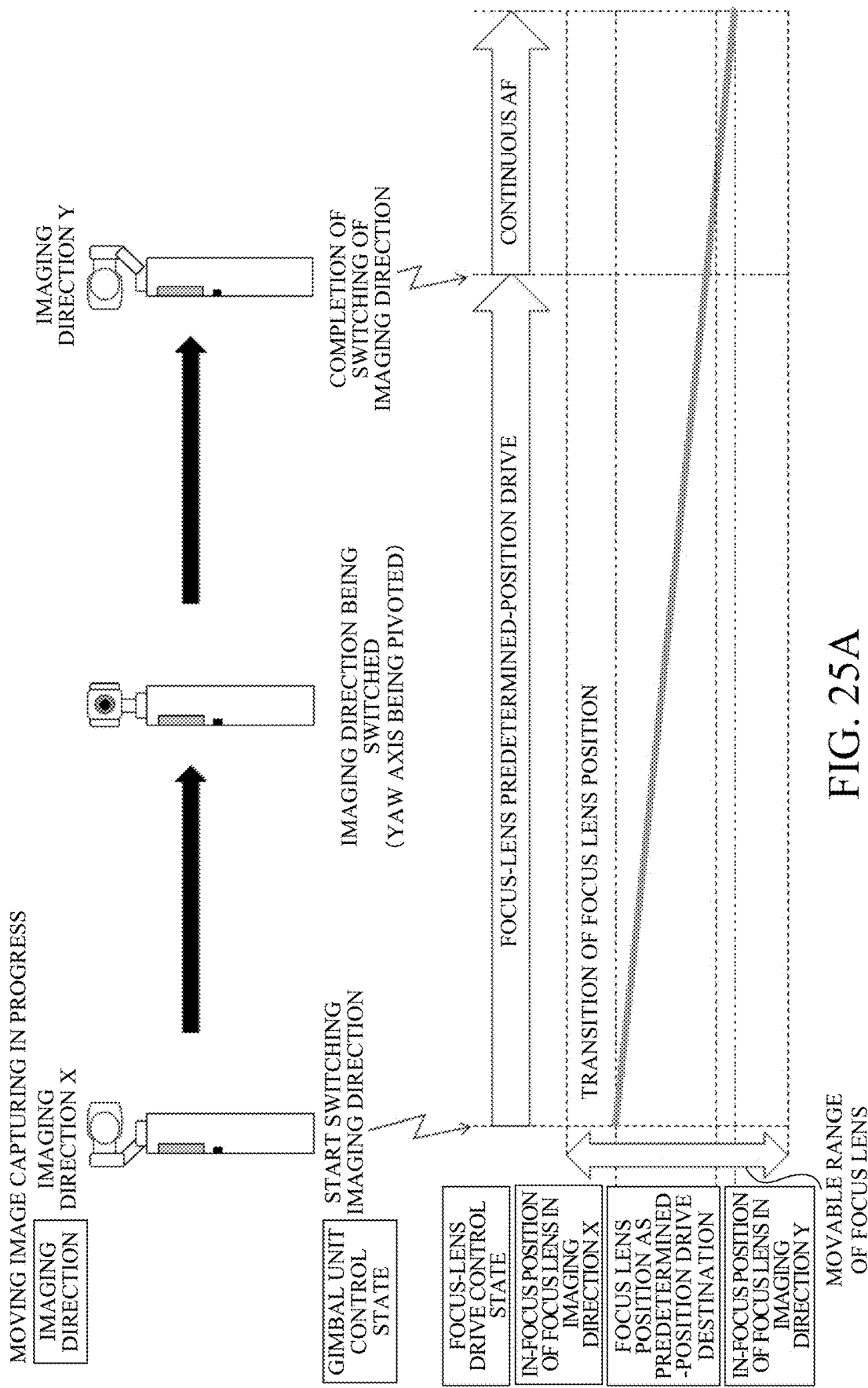
FIG. 25A illustrates time-series states when the imaging direction is changed according to the third embodiment.
Figure 25B:
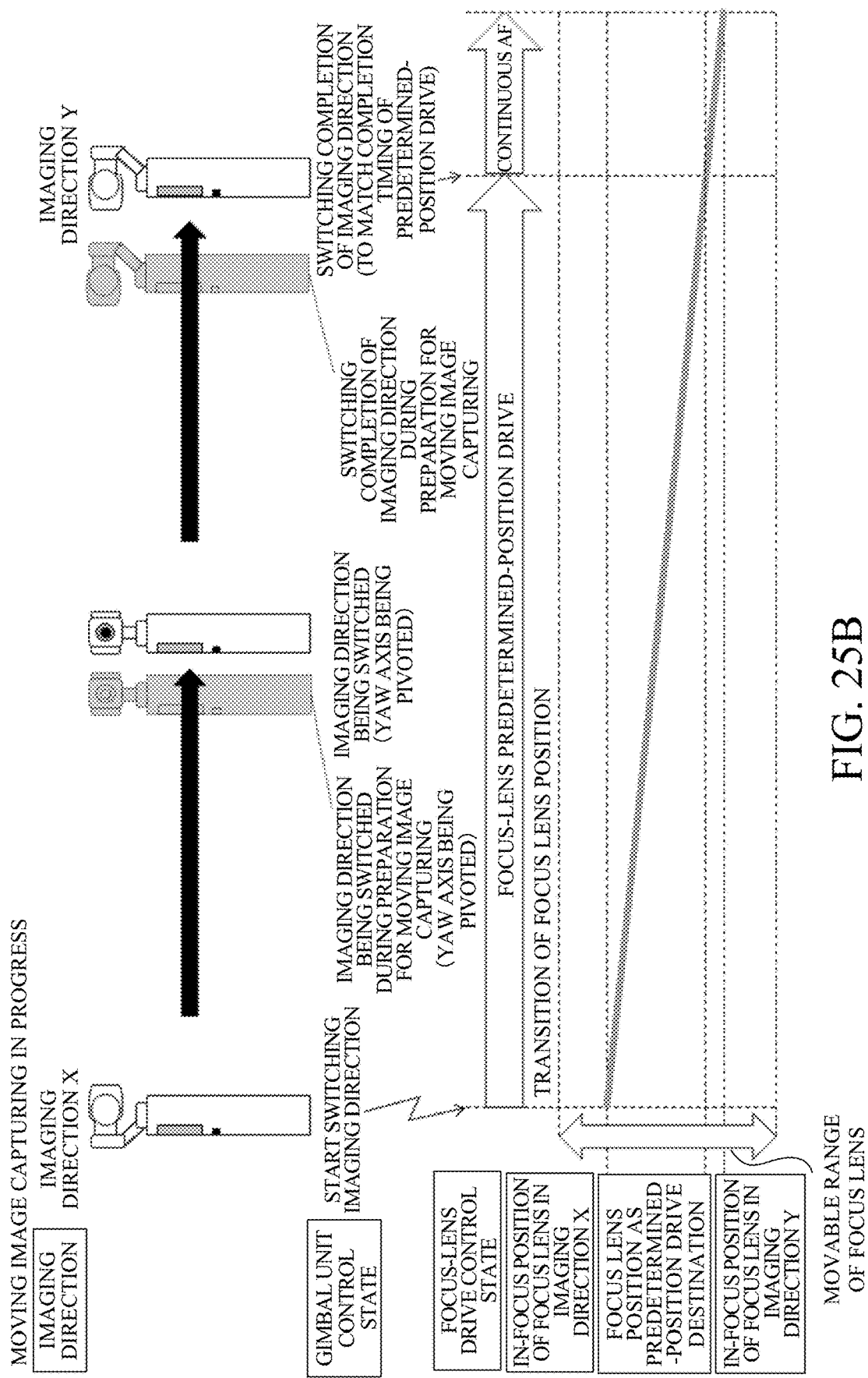
FIG. 25B illustrates time-series states when the imaging direction is changed according to the third embodiment.

FIGS. 25A and 25B illustrate time-series states when the imaging direction is switched. FIG. 25A illustrates a case where the processing of S2307 in FIG. 23 is not applied during moving image capturing, and FIG. 25B illustrates a case where it is applied.

FIG. 25A illustrates a case where, under a condition during moving image capturing, the focus-lens predetermined-position drive has not been completed when the switching of the imaging direction is completed. In such a case, as described above, the focus-lens predetermined-position drive is interrupted (stopped) and a control is performed so as to execute continuous AF. In FIG. 25B, the control of the flowchart in FIG. 23 is further added, and the camera is controlled to synchronize the time for switching the imaging direction with the completion time of the focus-lens predetermined-position drive during moving image capturing. In S2304, the arrival time ft to the focus lens drive destination for the predetermined-position drive is calculated, and the time jt to complete the switching of the imaging direction is calculated in S2305.

In FIG. 25B, it is previously determined in S2306 that jt is shorter than ft, that is, that the focus-lens predetermined-position drive has not been completed when the switching of the imaging direction is completed, and the gimbal-axis pivoting speed is set to jsC in S2307. As mentioned above, jsC is controlled to set the gimbal-axis pivoting speed in which the time required for switching completion of the imaging direction is adjusted so as to match the time required for completion of the focus-lens predetermined-position drive. Thereby, the gimbal-axis pivoting speed jsC lower than the gimbal-axis pivoting speed jsB set in S2303 can be set, and the quality of changing an angle of view can be further improved in switching the imaging direction and the driving noise can be further suppressed.

Fourth Embodiment

A description will now be given of a fourth embodiment according to the present disclosure. A description of a configuration similar to that of the first embodiment will be omitted.

Details of Various Processing Performed by Camera Unit 20

Figure 26:
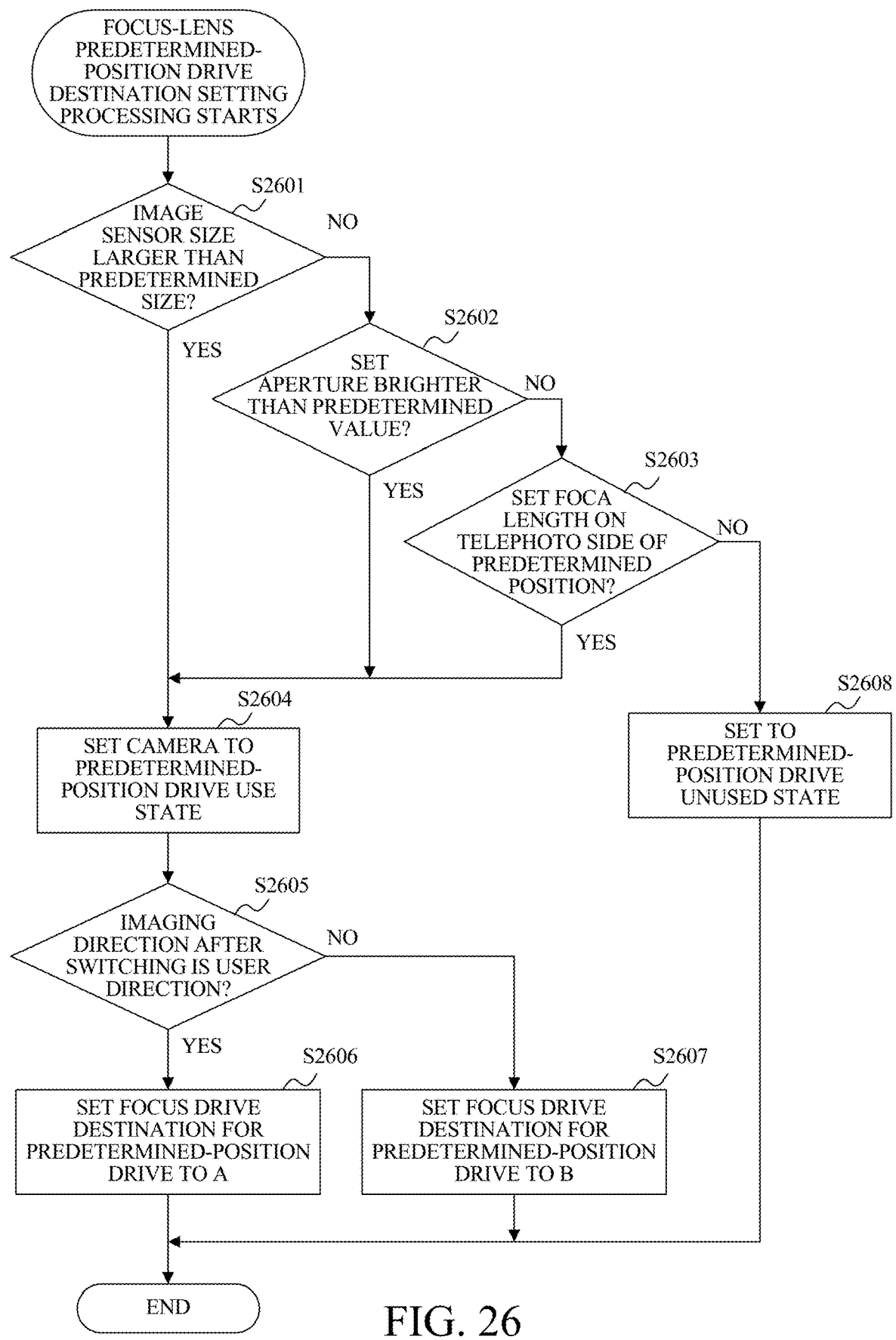
FIG. 26 is a flowchart illustrating setting processing of a focus-lens predetermined-position drive destination according to the fourth embodiment.

In this embodiment, the setting processing of the focus-lens predetermined-position drive destination in S506 in FIG. 5 follows a flowchart in FIG. 26. FIG. 26 is the flowchart illustrating the setting processing of the focus-lens predetermined-position drive destination. The processing of S2605 to S2607 in FIG. 26 is similar to the processing of S601 to S603 in FIG. 6, and a detailed description thereof will be omitted.

In S2601, the camera control unit 204 determines whether or not a size of the image sensor 201 is larger than a predetermined size (whether or not the image sensor size is larger than a predetermined size). In a case where the size of the image sensor 201 is larger than the predetermined size, the flow proceeds to S2604. In a case where the size of the image sensor 201 is not larger than the predetermined size, the flow proceeds to S2602. In S2602, the camera control unit 204 determines whether or not the set aperture as a state of the aperture stop 102 is brighter than a predetermined value. In a case where the set aperture (aperture value or F-number) is brighter than the predetermined value (predetermined aperture value or predetermined F-number), the flow proceeds to S2604, and in a case where the set aperture is not brighter than the predetermined value, the flow proceeds to S2603.

In S2603, the camera control unit 204 determines whether or not a focal length (set focal length) as a state of a lens unit is on a telephoto side of a predetermined position. In a case where the focal length is on the telephoto side of the predetermined position, the flow proceeds to S2604, and in a case where the focal length is not on the telephoto side of the predetermined position, the flow proceeds to S2608. In S2604, the camera control unit 204 sets the camera to a predetermined-position drive use state, and sets a predetermined-position drive destination for the focus-lens predetermined-position drive processing in S2605 to S2607. In S2608, the camera control unit 204 sets the camera to a predetermined-position drive unused state, and ends this processing without setting the focus-lens predetermined-position drive destination.

Figure 27:
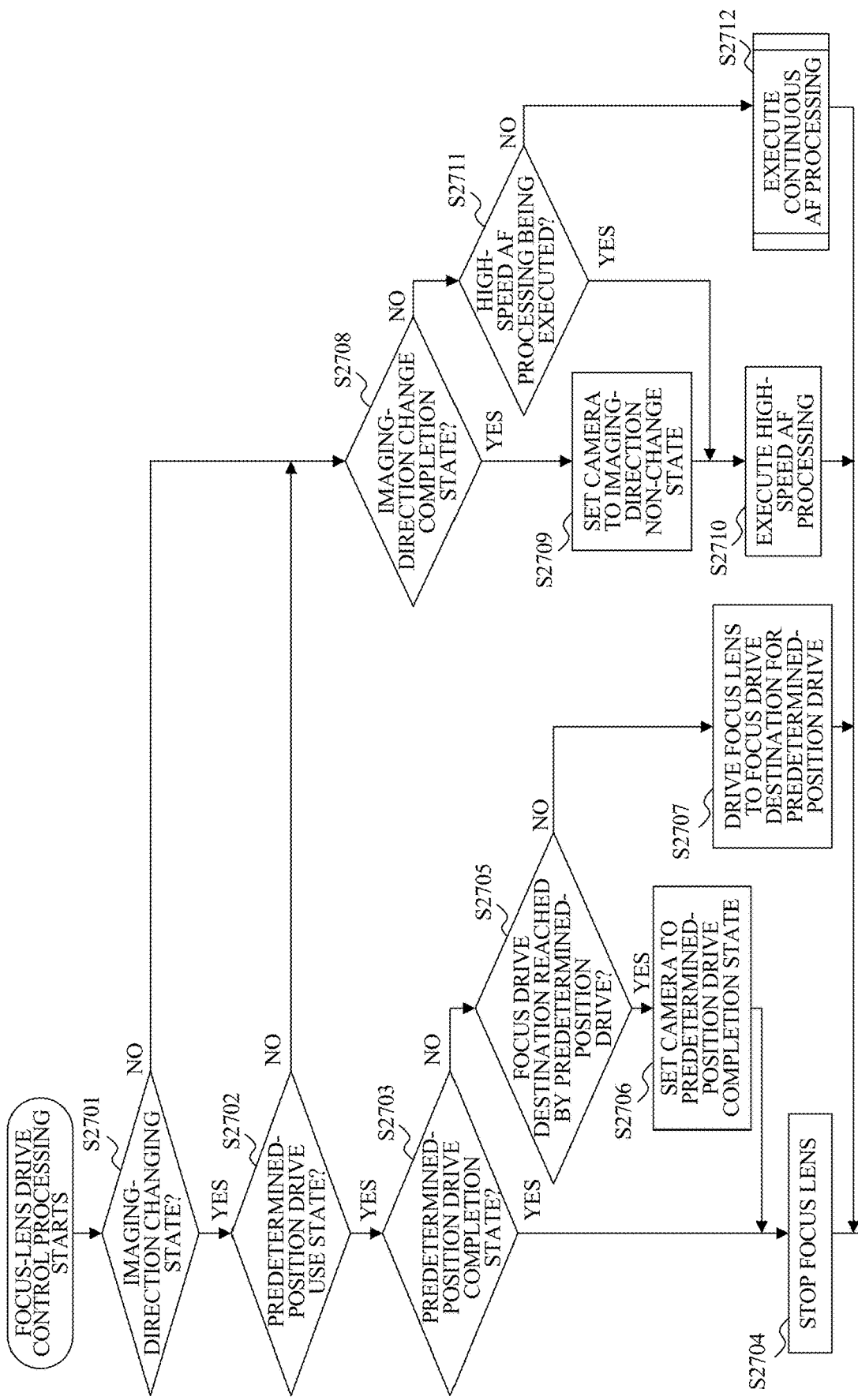
FIG. 27 is a flowchart which illustrates focus-lens drive control processing according to the fourth embodiment.

In this embodiment, the focus-lens drive control processing in S406 in FIG. 4 is based on a flowchart in FIG. 27. FIG. 27 is the flowchart illustrating the focus-lens drive control processing. Since the processing of S2701 and S2703 to S2712 in FIG. 27 is similar to the processing of S701 to S711 in FIG. 7, a detailed description thereof will be omitted.

In S2702, the camera control unit 204 determines whether or not the camera is in the predetermined-position drive use state. In a case where the camera is in the predetermined-position drive use state, the flow proceeds to S2703 to perform the processing relating to the predetermined-position drive. On the other hand, in a case where the camera is in the predetermined-position drive unused state, the flow proceeds to S2708, and even if it is determined in S2701 that the camera is in the imaging-direction changing state, a control is performed so that the processing relating to the predetermined-position drive is not performed. At this time, in a case where the camera is in the imaging-direction changing state, the determinations of S2708 and S2711 are made, and then continuous AF processing is executed in S2712.

Referring to FIGS. 3A and 3B, a description was given of a change in an object to be captured when the imaging direction is switched from the imaging direction A to the imaging direction B, or vice versa. In a case where a large change in object distance occurs at this time, unless the focus lens is moved in accordance with the change in the object distance, defocus may occur after the imaging direction is switched, as described above. On the other hand, the likelihood of defocus is small unless the optical system is in a state in which defocus stands out. In other words, as explained with reference to FIG. 26, it is assumed that the defocus degree caused by the change in object distance is small unless the condition is met such as a large image sensor size, set aperture brighter than the predetermined value, a set focal length on the telephoto side of the predetermined position. In such a case, due to the processing of S2608 in FIGS. 26 and S2702 in FIG. 27, the focus-lens predetermined-position drive may not be performed.

Fifth Embodiment

A description will now be given of a fifth embodiment according to the present disclosure. A description of a configuration similar to that of the first embodiment will be omitted.

Configuration of Image Pickup Apparatus

Figure 28:
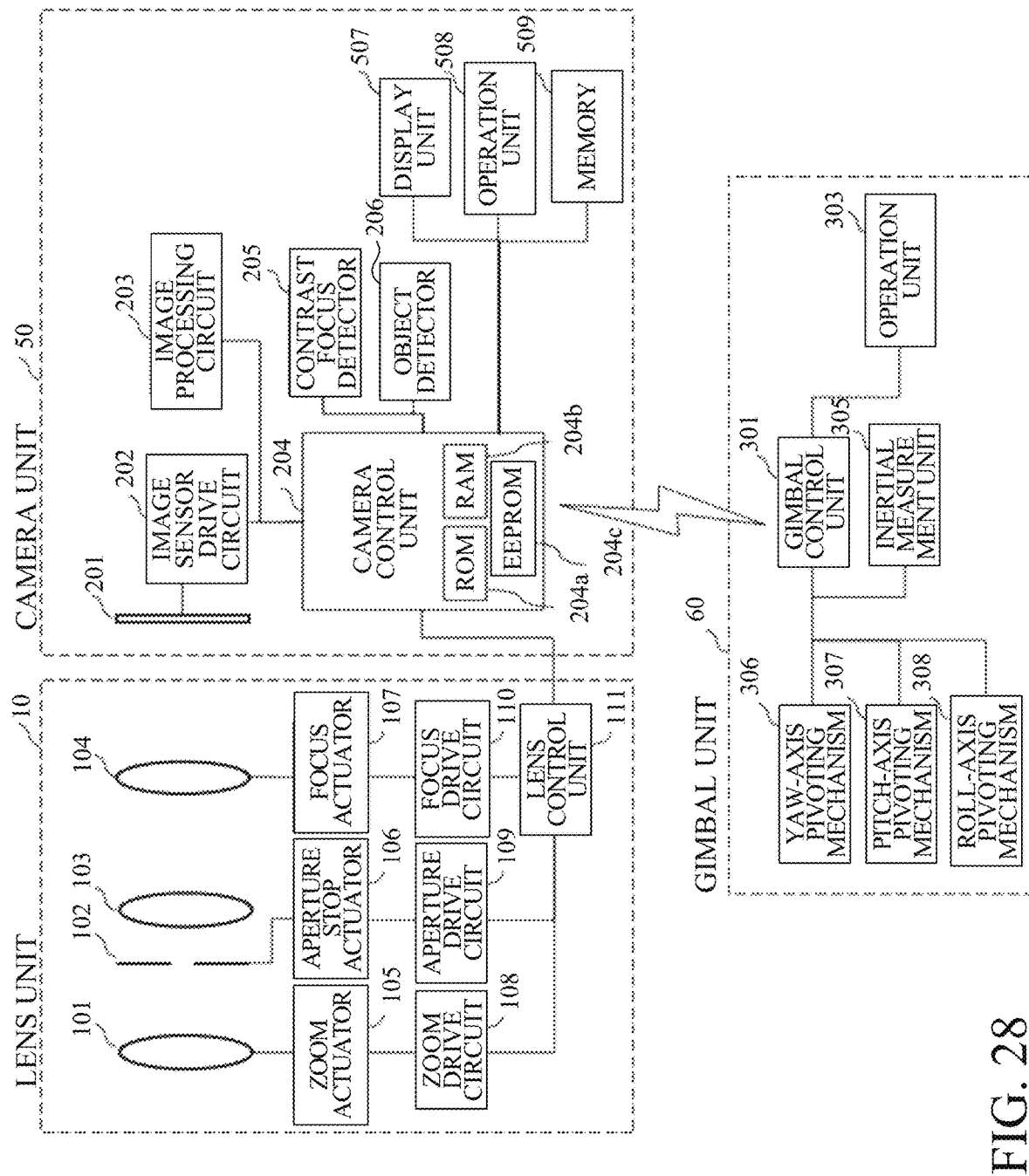
FIG. 28 is a block diagram of an image pickup apparatus according to the fifth embodiment.

FIG. 28 is a block diagram illustrating an example functional configuration of a gimbal and a digital camera as an example of an image pickup apparatus according to this embodiment. In this embodiment, a lens unit 10 and a camera unit 50 are separable (detachable) from a gimbal unit (pivoting driver) 60, and communicable with each other. The lens unit 10 and its internal configuration in FIG. 28 are similar to the lens unit 10 and its internal configuration in FIG. 1, so a detailed description thereof will be omitted. Reference numerals 201 to 203 and, 204a, 204b, 204c, 205, 206 in the camera unit 50 in FIG. 28 are similar to reference numerals 201 to 203 and 204a, 204b, 204c, 205, 206 in the camera unit 20 in FIG. 1, and a detailed description thereof will be omitted.

As described above, the gimbal unit 60 in FIG. 28 is separable from the lens unit 10 and the camera unit 50. Since reference numerals 303 and 305 to 308 of the gimbal unit 60 are similar to reference numerals 303 and 305 to 308 of the gimbal unit 30 in FIG. 1, a detailed description thereof will be omitted. The gimbal unit 60 in FIG. 28 does not have the display unit 302 or the memory 304 in the gimbal unit 30 in FIG. 1. Instead, the camera unit 50 in FIG. 28 has a display unit 507, an operation unit 508, and a memory 509. The display unit 507 and the memory 509 in the camera unit 50 in FIG. 28 have functions similar to those of the display unit 302 and the memory 304 in the gimbal unit 30 in FIG. 1, and a detailed description thereof will be omitted. The operation unit 508 in the camera unit 50 basically operates the lens unit 10 and the camera unit 50. The operation unit 303 in the gimbal unit 60 basically operates the entire gimbal unit 60.

The camera control unit 204 in the camera unit 50 and the gimbal control unit 301 in the gimbal unit 60 in FIG. 28 have functions of communicating with each other, and can communicate information similar to that communicated between the camera control unit 204 in the camera unit 20 and the gimbal control unit 301 in the gimbal unit 30 in FIG. 1. The communication method may be either wireless communication or wired communication.

Details of Various Processing Performed by Camera Unit 50

In this embodiment, the various processing performed by the camera unit 50 are similar to those described in detail as the various processing performed by the camera unit 20 in the first embodiment. However, this is not limited to the image pickup apparatus in which the camera unit and the gimbal unit are integrated as in the first embodiment, but is also applicable to a configuration in which the camera unit and the gimbal unit are separable from each other as in this embodiment.

Sixth Embodiment

A description will now be given of a sixth embodiment according to the present disclosure. A description of a configuration similar to that of the first embodiment will be omitted.

Details of Various Processing Performed by Camera Unit 20

Figure 29:
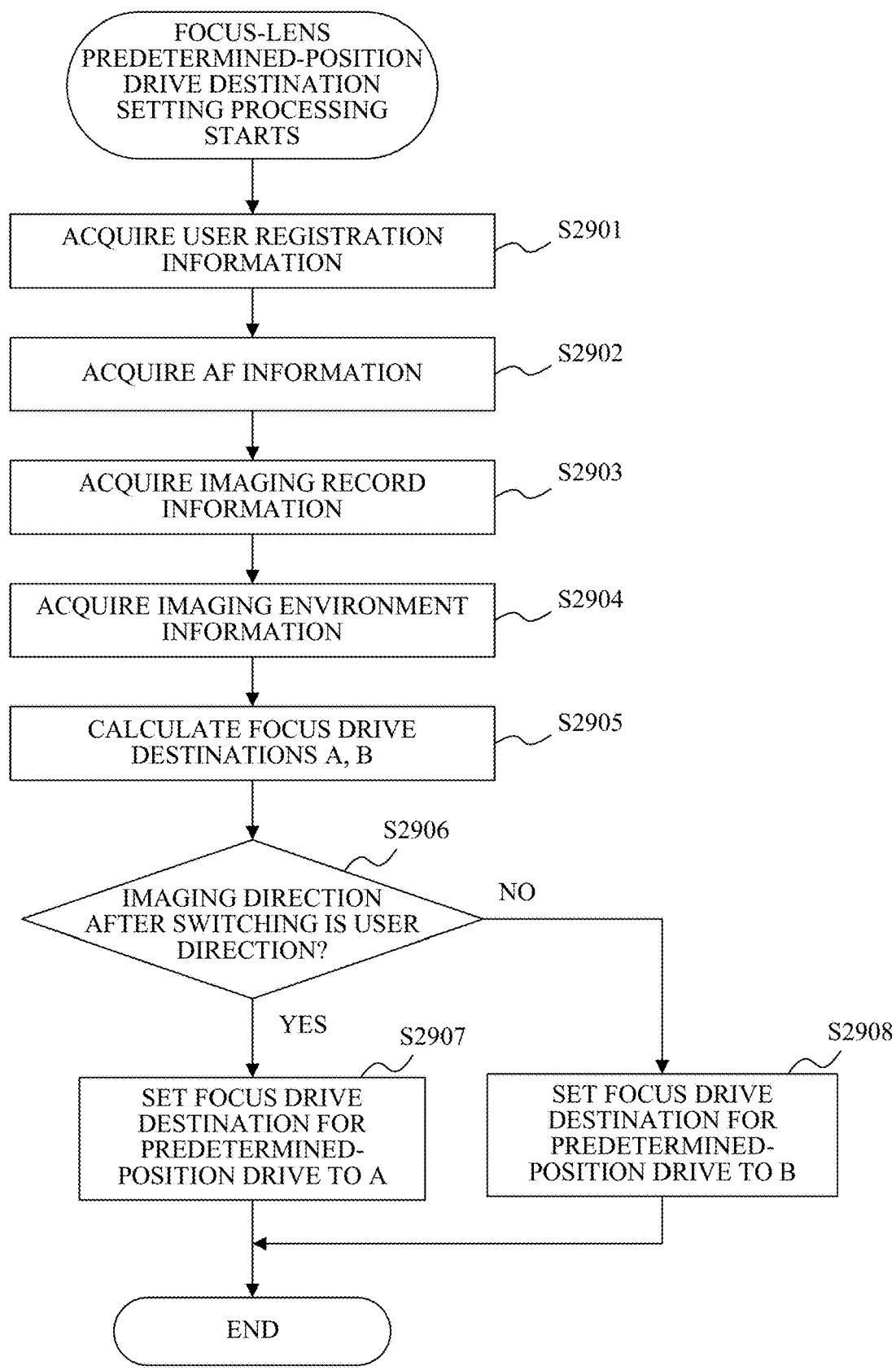
FIG. 29 is a flowchart illustrating focus-lens drive control processing according to the sixth embodiment.

In this embodiment, the setting processing of the focus-lens predetermined-position drive destination in S506 in FIG. 5 follows a flowchart in FIG. 29. FIG. 29 is the flowchart illustrating the setting processing of the focus-lens predetermined-position drive destination.

In S2901, the camera control unit 204 acquires user registration information stored in the EEPROM 204c. The user registration information stores focus lens predetermined-positions registered (set) by the user in the imaging directions A and B illustrated in FIGS. 3A and 3B. The user can register at least one predetermined focus lens predetermined-position during moving image capturing, for example. After the user registration information is required, the flow proceeds to S2902.

In S2902, the camera control unit 204 acquires AF information, which is a result of AF (past AF result) stored in the RAM 204b. The information stored as the AF information includes at least two focus lens predetermined-positions when AF was performed in each of the imaging directions A and B, together with AF time (Taf) when AF was performed. In a case where the AF information is used for the setting processing of focus-lens predetermined-position drive destination and a time difference Δt(t−Taf) between the current time (t) and the newest AF time (Taf1) stored is within a predetermined time, the newest AF time (Taf1) is referred to. The premise for referring to Taf1 is that power-off processing has not been performed during the time from Taf1 to t, for example, the power switch of the operation unit 303 has not been operated, or the camera has not been automatically powered off in the camera control unit 204.

In a case where it is determined that the time difference Δt is longer than the predetermined time and time has passed after AF, or in a case where the power-off processing described above has been performed, the camera control unit 204 uses at least two pieces of AF information stored in the RAM 204b. That is, in this case, the camera control unit 204 calculates and acquires the focus lens predetermined-positions for each of the imaging directions A and B using the at least two pieces of AF information. Here, the method of calculating the focus lens predetermined-position may use, for example, an average value (average position) of at least two pieces of AF information, a mode value (most frequent position), or a weighted arithmetic average according to Taf, but is not limited to these methods. After the AF information is acquired, the flow proceeds to S2903.

In S2903, the camera control unit 204 acquires imaging record information. The imaging record information is information obtained from recorded information such as a captured moving image and a plurality of (at least two) still images. The imaging record information is calculated using a calculation method such as an average value (average position), a mode value (most frequent position) of the focus lens predetermined-position information for each of the imaging directions A and B in the moving image (that is being captured), or a weighted arithmetic average of frames when a predetermined object is detected.

In a case where a length of the recorded moving image (continuous imaging time) is longer than a predetermined time, it is assumed that the moving image is being captured at a distance where the user can hold the camera steadily, or with the camera fixed to a tripod or the like. At this time, the camera control unit 204 calculates and acquires an average value (average position) as focus lens predetermined-position information for each of the imaging directions A and B. On the other hand, in a case where the length of the recorded moving image (continuous imaging time) is shorter than the predetermined time, it is assumed that the user performs spontaneous imaging at a distance different from normal imaging, and that there are many frames that include an object of interest. At this time, the camera control unit 204 calculates and acquires focus lens predetermined-position information for each of the imaging directions A and B by calculating a mode value (most frequent position). Furthermore, the focus lens predetermined-position information for each of the imaging directions A and B may be calculated using the above calculation method regardless of a length of a recorded moving image.

For still images, the focus lens predetermined-position information is calculated using the focus lens predetermined-position information for each of the imaging directions A and B in a plurality of captured still images, the above calculation method, or the like. This embodiment has described the above calculation methods, but the calculation methods are not limited to them. In a case where a predetermined number or more of recorded moving images or still images have been collected, it may be determined that these images have been captured with a composition or the like most frequently used by the user, and the most frequent distance may be used. After the imaging record information is acquired, the flow proceeds to S2904.

In S2904, the camera control unit 204 acquires imaging environment information. The imaging environment information is information such as the luminance (brightness) during imaging, and is acquired from recorded information (image data output from the image sensor 201) such as recorded moving images and still images. Alternatively, it may be obtained from measurement information on an unillustrated device configured to measure the environmental luminance. The following determination is made based on the luminance information during imaging, which was the acquired imaging environment information.

First, in a case where luminance during imaging is first luminance that is brighter than predetermined luminance, it is assumed that the imaging is mainly outdoor imaging in an in-focus state at infinity such as landscapes. Then, the camera control unit 204 acquires a first focus position of this embodiment as information on the predetermined position of the focus lens 104 (focus lens predetermined-position information). Next, in a case where the luminance during imaging is second luminance that is darker than the first luminance, it is assumed that the imaging is indoor imaging in an in-focus state on a distance closer than infinity, such as in portraiture. Then, the camera control unit 204 acquires a second focus position disposed on a close distance side of the first focus position, as the focus lens predetermined-position information.

In a case where the luminance during imaging is third luminance that is darker than the second luminance and a signal having a luminance value higher than a predetermined value exists in the imaging signal of the recorded information, it is assumed that the imaging is night scene imaging, etc., in which the angle of view range is entirely dark but the luminance value is high due to building lights, etc. Then, the camera control unit 204 acquires a third focus position as the focus lens predetermined-position information. In a case where the luminance during imaging is the third luminance that is darker than the second luminance and there is no signal in the imaging signal of the recorded information that has the luminance value higher than the predetermined value, it is assumed that the imaging is imaging of a landscape, a starry sky, or the like in a dark place, or an object disposed at a close distance. In order to avoid starting from a defocus position in a case where an object disposed at a close distance is assumed, the camera control unit 204 acquires a fourth focus position that is disposed on a closer distance side of the third focus position as the focus lens predetermined-position information. After the imaging environment information is acquired, the flow proceeds to S2905.

In S2905, the camera control unit 204 determines the focus drive destinations A and B to be used by a predetermined-position change unit in S2907 and S2908 described later, from the information acquired in S2901 to S2904. In a case where only one piece of information is acquired from S2901 to S2904, that piece of information is determined as the focus drive destination A or B. In a case where at least two pieces of information are acquired from S2901 to S2904, the camera unit 50 automatically makes the determination.

A priority of one piece of information selected from S2901 to S2904 is determined as follows: The first priority is given to the user registration information acquired in S2901 as determined by the user. The second priority is the AF information acquired in S2902, which is the last focus position information stored in the camera. The third priority is given to the imaging record information acquired in S2903, which is the focus position information obtained from the record information. Finally, the fourth priority is given to the imaging environment information acquired in S2904, which is information regarding imaging. In selecting from multiple pieces of information in S2901 to S2904, the focus drive destinations A and B are determined by using a calculation method such as a weighted arithmetic average value, an average value, or a mode value according to the priority described above. The calculation method is not limited to them. In a case where at least two pieces of information are acquired from S2901 to S2904, the user may set the priority. After the focus drive destinations A and B are calculated and determined, the flow proceeds to S2906. The processing from S2906 to S2908 is similar to the processing from S601 to S603 in FIG. 6, and a detailed description thereof will be omitted. This is the end of the setting processing of the focus-lens predetermined-position drive destination in FIG. 29.

This embodiment has discussed the setting of the focus-lens predetermined-position drive destination in a standby state before moving image recording or still image capturing. However, this can also be implemented in a case where the imaging directions A and B are switched during moving image recording. During moving image recording, a focus position is set to be slightly offset from a focus position in the standby state so as to prevent further image degradation. In a case where the focus position is set to the far side, it is offset slightly to the near side, and in a case where the focus position is set to the near side, it is offset slightly to the far side.

In this embodiment, the focus lens predetermined-position may be changed so that a focus-lens moving amount during moving image recording is smaller than that during non-moving image recording. In this embodiment, the focus lens predetermined-position may be changed so that the focus-lens moving amount becomes smaller as the aperture stop 102 is narrowed.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Each embodiment can provide an image pickup apparatus that can perform focusing quickly after switching of an imaging direction by pivoting a gimbal axis is completed for smooth transition to imaging.

This application claims priority to Japanese Patent Application No. 2023-150071, which was filed on Sep. 15, 2023, and which is hereby incorporated by reference herein in its entirety.

What is claimed is:

1. An image pickup apparatus comprising:
    an imaging unit configured to photoelectrically convert an optical image formed by an optical system including a focus lens and to output image data; and
    a processor configured to:
    control the focus lens,
    acquire information on a change start of an imaging direction from a pivoting driver configured to perform pivoting drive for at least one of a pan direction or a tilt direction,
    drive the focus lens to a predetermined position using the change start of the imaging direction as a trigger,
    acquire information on a change completion of the imaging direction from the pivoting driver,
    control the focus lens so as to perform autofocus using the image data, using the change completion of the imaging direction as a trigger, and
    in a case where drive of the focus lens to the predetermined position is not completed when the processor acquires the information on the change completion of the imaging direction, stop the drive of the focus lens, and control the focus lens so as to perform the autofocus.

2. The image pickup apparatus according to claim 1, wherein the processor is configured to make a drive speed of the focus lens during moving image recording lower than that during non-moving image recording.

3. The image pickup apparatus according to claim 1 wherein the pivoting driver, while the focus lens is being driven to the predetermined position, makes a pivoting speed during moving image recording lower than that during non-moving image recording.

4. The image pickup apparatus according to claim 1, wherein the pivoting driver:
    acquires time information on when drive of the focus lens to the predetermined position is completed, and
    in a case where it is determined, during moving image recording, using the time information, that a time until the pivoting drive is completed is shorter than a time until the drive is completed, makes a pivoting speed low so that the time until the pivoting drive is completed matches the time until the drive to the predetermined position is completed.

5. The image pickup apparatus according to claim 1, wherein in performing the autofocus based on phase difference information in the image data, in a case where a reliability of the phase difference information acquired after the change completion of the imaging direction is completed is lower than a predetermined reliability, the processor is configured not to perform the autofocus until a predetermined time has elapsed or the reliability becomes higher than the predetermined reliability.

6. The image pickup apparatus according to claim 1, wherein the processor is configured to drive the focus lens to the predetermined position in a case where an image sensor size of the imaging unit is larger than a predetermined size, an aperture value is brighter than a predetermined aperture value, or a focal length is longer than a predetermined focal length.

7. The image pickup apparatus according to claim 1, wherein the processor is configured to change the predetermined position.

8. The image pickup apparatus according to claim 7, wherein the processor is configured to change the predetermined position using past focus lens position information before the focus lens is driven to the predetermined position.

9. The image pickup apparatus according to claim 8, wherein the processor is configured to:
use an average position of positions of the focus lens while imaging is continuing as the past focus lens position information in a case where an imaging continuing time is longer than a predetermined time, and
use a most frequent position of the focus lens while imaging is continuing as the past focus lens position information in a case where the imaging continuing time is shorter than the predetermined time.

10. The image pickup apparatus according to claim 8, wherein the processor is configured to use, in a case where the number of recorded moving images or still images is equal to or larger than a predetermined number, a most frequent position relating to the recorded moving images or still images as the past focus lens position information.

11. The image pickup apparatus according to claim 7, wherein the processor is configured to change the predetermined position using luminance information obtained from past image data before the focus lens is driven to the predetermined position.

12. The image pickup apparatus according to claim 11, wherein the processor is configured to:
acquire a first focus position as the predetermined position in a case where the luminance information is information indicating first luminance, and
acquire a second focus position disposed on a close distance side of the first focus position as the predetermined position in a case where the luminance information is information indicating second luminance which is darker than the first luminance.

13. The image pickup apparatus according to claim 12, wherein in a case where the luminance information is information indicating a third luminance which is darker than the second luminance, the processor is configured to:
acquire a third focus position as the predetermined position in a case where the image data includes a signal with a luminance value higher than a predetermined luminance value, and
acquire a fourth focus position disposed on a close distance side of the third focus position as the predetermined position in a case where the image data does not include the signal with the luminance value higher than the predetermined luminance value.

14. The image pickup apparatus according to claim 7, wherein the processor is configured to change the predetermined position so that a moving amount of the focus lens during moving image recording is smaller than that during non-moving image recording.

15. The image pickup apparatus according to claim 7, wherein the processor is configured to change the predetermined position so that a moving amount of the focus lens is smaller as an aperture in an aperture stop is narrowed.

16. The image pickup apparatus according to claim 7, wherein the processor is configured to change the predetermined position to a focus position set by a user.

17. The image pickup apparatus according to claim 1, wherein the processor is configured to change the predetermined position using a past autofocus result before the focus lens is driven to the predetermined position.

18. The image pickup apparatus according to claim 17, wherein the processor is configured to:
use a last autofocus result as the past autofocus result within a predetermined time after the autofocus is performed or in a case where the image pickup apparatus is not powered off, and
use at least two or more past autofocus results as the past autofocus result in a case where the predetermined time has elapsed after the autofocus is performed and in a case where the image pickup apparatus is powered off.

19. The image pickup apparatus according to claim 1, wherein the image pickup apparatus is integrated with the pivoting driver.

20. The image pickup apparatus according to claim 1, wherein the image pickup apparatus is attachable to and detachable from the pivoting driver.

21. A control method of an image pickup apparatus, the control method comprising:
an imaging step of photoelectrically converting an optical image formed by an optical system including a focus lens and of outputting image data; and
a control step of controlling the focus lens,
wherein the control step:
acquires information on a change start of an imaging direction from a pivoting driver configured to perform pivot drive for at least one of a pan direction or a tilt direction,
drives the focus lens to a predetermined position using the change start of the imaging direction as a trigger,
acquires information on a change completion of the imaging direction from the pivoting driver,
controls the focus lens so as to perform autofocus using the image data, using the change completion of the imaging direction as a trigger, and
in a case where drive of the focus lens to the predetermined position is not completed when the information is acquired on the change completion of the imaging direction, stops the drive of the focus lens, and controls the focus lens so as to perform the autofocus.

22. A non-transitory computer-readable storage medium for storing a computer program to cause a computer to execute the control method according to claim 21.

* * * * *